United States Patent
Iso et al.

(10) Patent No.: US 7,265,080 B2
(45) Date of Patent: Sep. 4, 2007

(54) ROLLING BEARING, ROLLING BEARING FOR FUEL CELL, COMPRESSOR FOR FUEL CELL SYSTEM AND FUEL CELL SYSTEM

(75) Inventors: Kenichi Iso, Kanagawa (JP); Hirotoshi Miyajima, Kanagawa (JP); Katsuaki Denpou, Kanagawa (JP); Yujiro Toda, Kanagawa (JP); Masahiko Yamazaki, Kanagawa (JP); Michiharu Naka, Kanagawa (JP); Yasunobu Fujita, Kanagawa (JP)

(73) Assignee: NSK Ltd., Tokyo (JP)

( * ) Notice: Subject to any disclaimer, the term of this patent is extended or adjusted under 35 U.S.C. 154(b) by 672 days.

(21) Appl. No.: 10/441,131

(22) Filed: May 20, 2003

(65) Prior Publication Data

US 2005/0261141 A1 Nov. 24, 2005

(30) Foreign Application Priority Data

| | | | |
|---|---|---|---|
| Jun. 12, 2002 | (JP) | ............... | P. 2002-171522 |
| Jul. 11, 2002 | (JP) | ............... | P. 2002-202823 |
| Jul. 11, 2002 | (JP) | ............... | P. 2002-202824 |
| Jul. 11, 2002 | (JP) | ............... | P. 2002-202826 |
| Aug. 8, 2002 | (JP) | ............... | P. 2002-231713 |
| Oct. 21, 2002 | (JP) | ............... | P. 2002-306048 |
| Oct. 21, 2002 | (JP) | ............... | P. 2002-306050 |
| Dec. 6, 2002 | (JP) | ............... | P. 2002-355356 |
| Jan. 24, 2003 | (JP) | ............... | P. 2003-016300 |
| Feb. 17, 2003 | (JP) | ............... | P. 2003-038292 |
| Mar. 11, 2003 | (JP) | ............... | P. 2003-065533 |
| Mar. 17, 2003 | (JP) | ............... | P. 2003-071940 |
| Mar. 25, 2003 | (JP) | ............... | P. 2003-082952 |

(51) Int. Cl.
*C10M 119/22* (2006.01)
*C10M 107/34* (2006.01)
*F16C 33/66* (2006.01)

(52) U.S. Cl. ............ 508/182; 508/181; 508/275; 508/280; 508/363; 508/371; 508/582; 384/13; 384/462

(58) Field of Classification Search ............ 508/181, 508/182, 582
See application file for complete search history.

(56) References Cited

U.S. PATENT DOCUMENTS

| | | | | |
|---|---|---|---|---|
| 4,324,673 | A * | 4/1982 | Christian et al. | 508/182 |
| 4,472,290 | A * | 9/1984 | Caporiccio et al. | 508/181 |
| 4,985,161 | A * | 1/1991 | Tohzuka et al. | 508/182 |
| 6,025,307 | A * | 2/2000 | Chittofrati et al. | 508/182 |
| 6,329,326 | B1 * | 12/2001 | Iso et al. | 508/182 |
| 6,420,321 | B1 * | 7/2002 | Akiyama et al. | 508/259 |
| 6,432,887 | B1 * | 8/2002 | Yamamoto et al. | 508/138 |

(Continued)

FOREIGN PATENT DOCUMENTS

JP 3-26717 B2 4/1991

(Continued)

*Primary Examiner*—Ellen M. McAvoy
(74) *Attorney, Agent, or Firm*—Sughrue Mion, PLLC

(57) ABSTRACT

The rolling bearing of the invention to be incorporated in the compressor for fuel cell system comprises a fluorine-based grease containing a fluororesin and a fluorine-based oil, a urea grease containing a urea compound and a synthetic oil or a lithium complex grease containing a lithium complex and a synthetic oil encapsulated therein. In this arrangement, the grease deterioration of the rolling bearing incorporated in the compressor for force-feeding various fluids between machines can be prevented, making it possible to provide a fuel cell system which can maintain stable operation over an extended period of time.

24 Claims, 27 Drawing Sheets

U.S. PATENT DOCUMENTS

| | | | |
|---|---|---|---|
| 6,432,888 B1 * | 8/2002 | Komiya et al. | 508/364 |
| 6,548,454 B1 * | 4/2003 | Yamamoto et al. | 508/138 |
| 6,723,684 B2 * | 4/2004 | Akiyama et al. | 508/182 |
| 6,946,429 B2 * | 9/2005 | Akiyama | 508/182 |

FOREIGN PATENT DOCUMENTS

| | | |
|---|---|---|
| JP | 2878749 B2 | 1/1999 |
| JP | 11-307112 A | 11/1999 |
| JP | 2000-002192 A | 1/2000 |
| JP | 2000-273478 A | 10/2000 |
| JP | 2000-303088 A | 10/2000 |
| JP | 2002-070762 A | 3/2002 |
| JP | 2002-070764 A | 3/2002 |
| JP | 2002-231294 A | 8/2002 |

* cited by examiner

US 7,265,080 B2

ROLLING BEARING, ROLLING BEARING FOR FUEL CELL, COMPRESSOR FOR FUEL CELL SYSTEM AND FUEL CELL SYSTEM

BACKGROUND OF THE INVENTION

1. Technical Field

The present invention relates to a rolling bearing, a rolling bearing for fuel cell, a compressor for fuel cell system and a fuel cell system. The present invention relates to a fuel cell system which operates to gasify a fuel such as methanol and water, modify the gas in a modifier, remove CO from the gas in a CO remover, and then supply the fuel into a stack of fuel cells (fuel cell main body) where electricity is generated, a fuel cell system which operates to supply hydrogen as a fuel from a hydrogen storage unit such as hydrogen tank and hydrogen storage alloy into a stack of fuel cells where electricity is generated, a fuel cell system which operates to withdraw hydrogen from a hydrogen-containing compound such as methanol and water in a modifier, remove impurities from the fuel in an impurity remover such as CO remover, and then supply hydrogen into a stack of fuel cells where electricity is generated, a compressor for fuel cell system for force-feeding various fluids between various machines in these fuel cell systems, and a rolling bearing for fuel cell system to be incorporated in this compressor. The present invention further relates to a rolling bearing for fuel cell to be incorporated in, e.g., solid polymer electrolyte type fuel cell system.

2. Background Art

A fuel cell allowing exhaustion of clean exhaust gas and high energy efficiency has been noted over the issue of energy supply and environmental problems such as air pollution by emission form automobile and global warming by carbon monoxide. A fuel cell undergoes electrochemical reaction of hydrogen or hydrogen-rich modified gas with an oxidizer such as oxygen (air) to convert chemical energy to electrical energy. Examples of the electrolyte to be incorporated in the fuel cell include solid polymer, aqueous solution of phosphoric acid, molten carbonate, and aqueous alkaline solution. In particular, a solid polymer electrolyte type fuel cell is useful particularly as a power source for transporting body such as automobile, ship and spaceship because it is advantageous in that it can generate electricity at a relatively low temperature (not higher than 100° C.), exhibits a high output density, operates at low temperatures, shows little deterioration of constituents and can be easily started. Various fuel cell systems have been proposed (see JP-A-11-307112).

A solid polymer electrolyte type fuel cell essentially comprises a stack of fuel cells obtained by laminating cells with a separator provided interposed therebetween, said cells each having two gas diffusion electrodes, i.e., porous cathode (oxygen electrode) and anode (fuel electrode) comprising a noble metal such as platinum as a catalyst laminated on each other with a solid polymer electrolyte membrane interposed therebetween. These separators each have a gas passage formed on both surfaces thereof. An oxidizer gas is supplied and discharged through the gas passage on the cathode side. A fuel gas is supplied and discharged through the gas passage on the anode side. Further, since the fuel cell undergoes exothermic reaction, a cooling portion is normally provided each for several cells.

Such a fuel cell system comprising a solid polymer electrolyte type fuel cell employs a compressor to force-feed hydrogen, a hydrogen-rich modified gas and a large amount of air as an oxidizer. Various compressors having improvements for stable force-feeding have been proposed (see JP-A-2002-70762). A compressor comprises a rolling bearing incorporated therein to support the rotary shaft. The rolling bearing has a grease encapsulated therein for lubrication. However, the volatile component can be scattered and attached to the stack of fuel cells to act as a catalyst poison. Compressors which are designed to prevent the scattering and leakage of volatile components have been proposed (see JP-A-2000-2192 and JP-A-2002-70764).

ESSENCE OF THE INVENTION

A rolling bearing comprises a grease encapsulated therein for lubrication. Heretofore, a lithium soap-mineral oil-based grease has been normally used (see JP-B-3-26717). Since a compressor for force-feeding a fuel gas modified in a modifier to a stack of fuel cells or a compressor for force-feeding vapor from a vaporizer to a modifier is used in a high temperature water vapor, the heat resistance of the grease, too, is an important factor. However, the lithium soap-mineral oil-based grease is subject to deterioration at high temperatures and thus can deteriorate the life of the compressor and even the entire system. Further, when the grease has much volatile content, the volatile content can be a catalyst poison to the stack of fuel cells to disadvantage.

In a hydrogen tank process fuel cell system, too, the ejector compressor has similar problems.

The invention has been worked out under these circumstances. It is an aim of the invention to prevent the grease deterioration of the rolling bearing to be incorporated in the compressor for force-feeding various fluids between machines and thus provide a fuel cell system which can operate in a stable manner over an extended period of time.

As a grease there has heretofore been widely used a grease comprising a metal soap as a thickening agent and various additives for enhancing lubricating properties, etc. However, such a grease contains various metal ions derived from the metal soap and additives. Since some of these metal ions can act as a catalyst poison to the stack of fuel cells, it is likely that the reaction efficiency of the fuel cell can be deteriorated when the grease is scattered and attached to the stack of fuel cells.

The invention has been worked out under these circumstances. It is an aim of the invention to provide a rolling bearing for fuel cell which causes the grease to be scattered little and, if any scattered, gives no adverse effect on the stack of fuel cells and thus allows the fuel cell system to operate in a stable manner over an extended period of time.

As the grease to be encapsulated in the rolling bearing there is normally a urea-synthetic oil-based grease comprising a synthetic oil as a base oil and a urea compound as a thickening agent incorporated therein as well. This urea-synthetic oil-based grease exhibits a prolonged bearing lubrication life and thus can be used without any problem at temperatures of up to 170° C. to 180° C. However, since the working conditions have become recently severer, this urea-synthetic oil-based grease leaves something to be desired in heat resistance. In an attempt to improve the heat resistance of the grease, it has been proposed to encapsulate a fluorine-based grease in the bearing (see JP-A-2000-273478, JP-A-2000-303088).

In order to allow a fuel cell system to make stable electricity generation, it is necessary that the concentration of hydrogen, water vapor and oxygen be closely controlled. This requires stable transportation of various fluids by a compressor. To this end, the rolling bearing to be incorporated in the compressor, too, requires that the bearing material and the grease be resistant to hydrogen and water content. In the case where a hydrogen fuel is recycled for reuse, the bearing material and the grease need to be resistant also to acid or alkali liberated from the electrolyte.

However, the related art synthetic oil-urea-based grease and fluorine-based grease leave much to be desired in comprehensive durability against hydrogen, water content, acid, alkali, etc.

The invention has been worked out under these circumstances. It is an aim of the invention to improve the grease to be encapsulated in the rolling bearing to be incorporated in the compressor for fuel cell system and thus enhance the heat resistance and water resistance of the rolling bearing. It is an aim of the invention to enhance the durability of the compressor and even the fuel cell system by incorporating this rolling bearing therein.

In general, a grease causes more dusting as it softens. Therefore, as the operation of the rolling bearing continues, the dust from the grease can be easily attached to the stack of fuel cells. In some cases, this dust attached to the stack can act as a catalyst poison. To date, paying much attention to lubricating properties, etc., greases having an initial worked penetration of from 250 to 295 at 25° C. have been normally used. However, these greases having a worked penetration falling within this range have a great degree of softening and thus leave something to be desired in the reliability of stack of fuel cells.

The invention has been worked out under these circumstances. It is an aim of the invention to inhibit dusting from the rolling bearing to be incorporated in the compressor for fuel cell system.

When a rolling bearing is lubricated with a lubricant, dusting becomes remarkable particularly due to evaporation of base oil at high temperatures. In some cases, it is apprehended that this dust can be attached to the stack of fuel cells to act as a catalyst poison (see JP-A-2000-2192).

As a countermeasure against this problem, it has been proposed to improve the shape of the retainer in which a grease-lubricated rolling bearing is received, preventing the leakage of the grease, etc. (see JP-A-2002-70764). However, this proposal is to cope with the leakage of the grease but is not intended to inhibit dusting from the grease.

In a hydrogen tank process fuel cell system, too, the rolling bearing to be incorporated in an ejector compressor can cause similar problems.

The invention has been worked out under these circumstances. It is an aim of the invention to inhibit dusting from the rolling bearing by improving the grease to be encapsulated in the rolling bearing to be incorporated in the compressor for fuel cell system.

The compressor for force-feeding a fuel gas modified in a modifier to a stack of fuel cells or the compressor for force-feeding vapor from a vaporizer to a modifier can be subject to penetration of water vapor into the rolling bearing incorporated therein because it is used in a high temperature water vapor. When water or water vapor penetrates into the interior of the rolling bearing, white structure flaking can occur in the bearing constituents due to hydrogen as often seen in automobile electrical parts, reducing the life of the compressor and even the entire system.

Most grease compositions comprise a rust preventive incorporated therein to inhibit the occurrence of rust due to water or water vapor. However, sulfonates which are widely used because of its excellent rust preventing effect can easily cause white structure flaking attributed to hydrogen analogous to the aforementioned inner starting point flaking as described in Japanese Patent No. 2878749.

The invention has been worked out under these circumstances. It is an aim of the invention to provide a rolling bearing for fuel cell to be incorporated in the compressor for force-feeding various fluids between machines in a fuel cell system which is little subject to inner starting point flaking accompanying the white structure change by the hydrogen brittleness of the rolling bearing hydrogen and thus exhibits an enhanced durability.

In a fuel cell system, a tendency is that the transported amount of various gases increases to enhance the generation of electricity or the efficiency of electricity generation and the compressor operates a higher speed to enhance the transporting capacity. With this tendency, the rolling bearing incorporated in the compressor is rotated at a considerably high speed under a high load, requiring that the grease encapsulated therein be excellent in heat resistance and load resistance. Further, the grease to be encapsulated in the rolling bearing is also essentially required that it have a low volatility because when the evaporation content of the base oil is transported with a gas, it is then attached to the stack of fuel cells in particulate form to reduce the electricity generation efficiency.

A fuel cell system can be usefully applied to automobile. An automobile is required to operate and run in a stable manner regardless of working atmosphere. For example, in a cold district, unusual noise can easily occur due to drop of fluidity at low temperatures. Since an automobile having a fuel cell system on board generates a drastically reduced noise as compared with gasoline engine cars, any other noises can be perceived far more easily than in the gasoline engine cars. Further, an automobile must run on a rough road, the fuel cell system on board also needs to be resistant to vibration.

Thus, the compressor and rolling bearing for fuel cell system have various requirements. These requirements need to be satisfied at the same time. Further, it is inevitable that these requirements will be growing. It is therefore an aim of the invention to provide a rolling bearing particularly suitable for compressor for fuel cell system which shows little evaporation of base oil, operates in a stable manner over an extended period of time even under severe working conditions such as high temperature, high speed, high load and violent vibration and generates little unusual noise even at low temperatures. It is an aim of the invention to provide a compressor for fuel cell system comprising this rolling bearing which can operate in a stable manner over an extended period of time and a fuel cell system comprising this compressor which can make stable electricity generation over an extended period of time. In a fuel cell system, since water is produced during the chemical reaction for electricity generation, the gas transported by the compressor contains much water content. Further, as the electrolyte constituting the components of the stack of fuel cells in a solid polymer electrolyte type fuel cell there is normally used a fluororesin-based polymer membrane. In order to maintain the electrical conductivity of hydrogen ion and avoid direct reaction of hydrogen with oxygen causing the destruction of the membrane, this fluororesin-based polymer membrane must be kept moistened. To this end, the fuel cell system comprising a solid polymer electrolyte fuel cell has a humidifier provided interposed between the compressor and the stack of fuel cells.

Thus, in a fuel cell system, the rolling bearing incorporated in the compressor is subject to rusting or corrosion due to contact with water content. Therefore, the rolling bearing for fuel cell system is required to be excellent in rustproofness and corrosion resistance. A rolling bearing normally comprises a grease encapsulated therein for lubrication. When water content in gas penetrates in the grease, the grease then softens and thus can leak out. Thus, water content in gas is an important factor from this standpoint of view as well. In order to meet these requirements, it has been normally proposed to provide the rolling bearing to be incorporated in the compressor with a sealed structure preventing contact with water content or form the rolling bearing by a rust-proofing material. However, it has never been practiced to render the encapsulation grease rust-proof or corrosion-resistant.

In order to enhance the capacity of transporting gas, the compressor operates at a high speed. Thus, the rolling bearing incorporated in the compressor, too, is rotated at a considerably high speed under a high load. In order to a void abrasion due to rotation at high speed under high load, it is practiced to use a grease comprising an extreme pressure agent such as MoDTC (molybdenum dithiocarbamate). However, the added amount of such an extreme pressure agent is limited because it gives an adverse effect on lubricating properties and, when released and attached to the stack of fuel cells in the form of particles containing metal ions, it can act as a catalyst poison. Thus, the improvement of abrasion resistance by the single use of an extreme pressure agent is limited.

The invention has been worked out under these circumstances. It is an aim of the invention to provide a grease composition suitably particularly for rolling bearing to be incorporated in the compressor for fuel cell system which exhibits excellent rustproofness, corrosion resistance and abrasion resistance. It is an aim of the invention to provide a rolling bearing comprising the aforementioned grease composition encapsulated therein suitable particularly for compressor for fuel cell system which exhibits excellent rustproofness, corrosion resistance and abrasion resistance and a prolonged life. It is an aim of the invention to provide a compressor for fuel cell system comprising this rolling bearing which can operate in a stable manner over an extended period of time and a fuel cell system comprising this compressor which can make stable electricity generation over an extended period of time.

In a fuel cell system, electricity generation is accompanied by heat generation, and a tendency is that the amount of fuel gas transported by the compressor increases to raise the electricity generation. Thus, the rolling bearing to be incorporated in the fuel cell system is also required to have heat resistance. To this end, it has heretofore been practiced to encapsulate in the rolling bearing a grease composition comprising a urea compound or lithium complex soap as a thickening agent, a polyester-based synthetic oil or alkyl diphenylether oil as a base oil and various additives incorporated therein taking into account heat resistance. However, such a grease composition is disadvantageous in that it normally exhibits a high vapor pressure and some of these additives contain a component that can act as a catalyst poison to the stack of fuel cells and thus can be a source of catalyst poison.

The invention has been worked out under these circumstances. It is an aim of the invention to provide a rolling bearing for fuel cell which exhibits excellent heat resistance and rustproofness and a prolonged life. It is an aim of the invention to provide a compressor for fuel cell system comprising this rolling bearing which can operate in a stable manner over an extended period of time and a fuel cell system comprising this compressor which can make stable electricity generation over an extended period of time.

Further, in a fuel cell system which allows recycling of hydrogen fuel for reuse, an acid or alkali is liberated from the electrolyte. Thus, the compressor and even the rolling bearing and the grease composition are required to be resistant to acid or alkali. Moreover, in a fuel cell system using a modified gas such as methanol and methyl ether, carbon monoxide or carbon dioxide which has been secondarily produced must be removed. Thus, the compressor, rolling bearing and grease composition for this fuel cell system are required to have acid resistance.

Thus, in a fuel cell system, the rolling bearing incorporated in the compressor is subject to rusting or corrosion due to contact with water content or acidic matter. Accordingly, the rolling bearing is required to have an excellent rustproofness in addition to lubricating properties.

Further, in order to meet the demand for increase of electricity generation, the compressor is required to have a higher speed and higher performance. Since the rolling bearing, too, is rotated at a high speed under a high load, the rolling bearing is required to have heat resistance as well. Thus, most rolling bearings to be incorporated in the compressor have a grease composition comprising a urea compound having an excellent heat resistance incorporated therein as a thickening agent, a fluorine-based grease having an excellent heat resistance or a silicone-based grease encapsulated therein. However, the grease composition comprising a urea compound incorporated therein as a thickening agent has a lower basicity than the grease composition comprising a metal soap incorporated therein as a thickening agent. Thus, when used in an atmosphere having the aforementioned acidic matter present therein, the grease composition can easily deteriorate. Moreover, since the race and the surface of the rolling elements have a higher affinity for water than the fluorine-based lubricant or silicone-based lubricant which is a base oil, water content which has entered in the bearing is adsorbed to the race or the surface of the rolling elements to cause the leakage of grease. Further, it can be proposed to incorporate a rust preventive in the fluorine-based grease or silicone-based grease to render the grease rust-proof. However, since sulfonates or succinic acid derivatives having an excellent rustproofness can be difficultly dissolved in the fluorine-based lubricant or silicone-based lubricant which is a base oil, the content of these components cannot be great, making it impossible to render the grease composition fully rustproof.

The invention has been worked out under these circumstances. It is an aim of the invention to provide a grease composition having excellent lubricating properties and water resistance suitable particularly for use in an atmosphere having an acidic matter present therein. It is an aim of the invention to provide a rolling bearing comprising the aforementioned grease composition encapsulated therein suitable for use requiring acid resistance in addition to lubricating properties and water resistance as in rolling bearing to be incorporated in the compressor particularly for fuel cell system. It is a further aim of the invention to provide a rolling bearing excellent in rustproofness as well as in seizing resistance suitable for use in an atmosphere having an acidic matter present therein. It is a further aim of the invention to provide a compressor for fuel cell system comprising this rolling bearing which can operate in a stable manner over an extended period of time and a fuel cell system comprising this compressor which can make stable electricity generation over an extended period of time.

As a result of extensive studies, the inventors found that the incorporation of a rolling bearing comprising the following grease encapsulated therein makes it possible to obtain a fuel cell system having a prolonged life and a higher reliability.

As a result of extensive studies, the inventors also found that the incorporation of a perfluoroalkylether as a base oil and a polytetrafluoroethylene as a thickening agent in the grease to be encapsulated in the rolling bearing makes it possible to enhance the heat resistance of the grease and lower the volatility of the grease and the incorporation of magnesium oxide or a vapor phase inhibitor in the grease makes it possible to improve rustproofness. The invention has been worked out on the basis of this knowledge.

As a result of extensive studies, the inventors further found that the incorporation of a fluorine-based surface active agent in a fluorine-based grease composition makes it possible to form a good film of fluorine-based lubricant between the race and the surface of rolling elements even if water content enters in the rolling bearing and incorporate in the grease composition various additives which have heretofore been not able to be used in fluorine-based grease composition and a rolling bearing comprising such a fluorine-based grease composition encapsulated therein exhibits an enhanced rustproofness and thus is suitable for use in an atmosphere having an acidic matter present therein.

As a result of extensive studies, the inventors further found that the use of a fluorine-based grease having an excellent heat resistance and a grease other than fluorine-based grease in admixture as a grease to be encapsulated in the rolling bearing makes it possible to enhance the heat resistance as well as the water resistance of the rolling bearing.

As a result of extensive studies, the inventors further found that the use of a low volatility lubricant as a base oil for the grease to be encapsulated in the rolling bearing makes it possible to effectively inhibit dusting.

As a result of extensive studies, the inventors further found that an alkyl-substituted diphenylsulfide has a low volatility and a rolling bearing comprising a grease containing a predetermined amount of this compound encapsulated therein exhibits both excellent heat resistance and load resistance, generates no unusual noise at low temperatures and exhibits a prolonged life. The invention has been worked out on the basis of this knowledge.

As a result of extensive studies, the inventors further found that the encapsulation of a grease composition containing an electrically-conductive material or a grease composition substantially free of sulfonate in the rolling bearing makes it possible to effectively inhibit white structure flaking by hydrogen brittleness.

As a result of extensive studies, the inventors further found that the encapsulation of a grease freed of metal ion sources as much as possible in the rolling bearing makes it possible to prevent the drop of reaction efficiency of fuel cell even if the grease is scattered and attached to the stack of fuel cells and hence allow the continuance of stable operation thereof.

As a result of extensive studies, the inventors further found that the predetermination of the worked penetration of the grease to be encapsulated in the rolling bearing makes it possible to effectively inhibit dusting.

As a result of extensive studies, the inventors further found that the combined use of a specific nitrogen-containing heterocyclic compound and a metal dithiocarbamate or metal dithiophosphate makes it possible to drastically improve the rustproofness, corrosion resistance and abrasion resistance of the rolling bearing comprising a grease composition containing these components encapsulated therein.

As a result of extensive studies, the inventors further found that a grease composition which comprises an alkaline material incorporated therein and thus is capable of neutralizing an acidic material is suitable for use in an atmosphere having an acidic material present therein while maintaining its excellent lubricating properties and heat resistance.

The invention has been worked out on the basis of this knowledge.

In other words, in order to accomplish the aforementioned aims, the invention has the following constitutions:

(1) A rolling bearing having a fluorine-based grease containing a fluororesin and a fluorine-based oil, a urea grease containing a urea compound and a synthetic oil or a lithium complex grease containing a lithium complex and a synthetic oil encapsulated therein.

(2) The rolling bearing as defined in Clause (1), wherein the fluorine-based grease is a grease composition comprising a perfluoroalkylether as a base oil, a polytetrafluoroethylene as a thickening agent and at least one of a magnesium compound and a vapor phase inhibitor as a rust preventive.

(3) The rolling bearing as defined in Clause (2), wherein the content of the magnesium compound in the grease composition is from 0.5 to 3.0% by weight based on the total amount of the grease.

(4) The rolling bearing as defined in Clause (2), wherein the content of the vapor phase inhibitor in the grease composition is from 0.05 to 1.0% by weight based on the total amount of the grease.

(5) The rolling bearing as defined in Clause (1), wherein the fluorine-based grease is a grease composition comprising a fluorine-based thickening agent and a fluorine-based surface active agent incorporated in a fluorine-based lubricant.

(6) The rolling bearing as defined in Clause (5), wherein the grease composition comprises a perfluoropolyether oil as a base oil and a polytetrafluoroethylene as a thickening agent and the fluorine-based surface active agent contains carbon atoms and fluorine atoms in its molecule at a ratio of 1:2 to 2:1 and is incorporated in an amount of from 0.2 to 10% by weight based on the total amount of the grease.

(7) The rolling bearing as defined in Clause (5), which is used in an atmosphere having an acidic material present therein.

(8) The rolling bearing as defined in Clause (1), wherein the fluorine-based grease is a fluorine-based grease comprising a fluorine-based oil as a base oil and a fluororesin as a thickening agent and a mixture of the fluorine-based grease and a grease other than the fluorine-based grease is encapsulated therein.

(9) The rolling bearing as defined in Clause (8), wherein the grease other than the fluorine-based grease in the mixed grease is at least one of a metal complex soap-based grease and a urea-based grease, the mixing ratio (by weight) of at least one of the metal complex soap-based grease and the urea-based grease to the fluorine-based grease is from 30 to 70:80 to 20 and the thickening agent is incorporated in a total amount of from 15 to 35% by weight based on the total amount of the mixed grease.

(10) The rolling bearing as defined in Clause (8), wherein the kinetic viscosity of the fluorine-based oil at 40° C. is from 20 mm$^2$/s to 400 mm$^2$/s and the kinetic viscosity of the grease other than the fluorine-based grease at 40° C. is from 10 mm$^2$/s to 400 mm$^2$/s.

(11) The rolling bearing as defined in Clause (8), wherein the mixed grease comprises additives incorporated therein in an amount of not greater than 20% by weight based on the total amount of the mixed grease.

(12) The rolling bearing as defined in Clause (1), wherein there is encapsulated a grease having a vapor pressure of not higher than $1.3 \times 10^{-1}$ Pa at 25° C. as a base oil.

(13) The rolling bearing as defined in Clause (12), wherein the base oil is an alkyl chain-derived polyphenylether oil, an alkyl chain-derived naphthalene oil, a paraffin-based hydrocarbon oil, a fluorine-based oil, an alkylcyclopentane or a mixture oil thereof.

(14) The rolling bearing as defined in Clause (12), wherein the base oil is an alkylcyclopentane or a mixture oil thereof.

(15) The rolling bearing as defined in Clause (1), wherein the urea grease comprises an alkyl-substituted diphenyl sulfide incorporated therein as a base oil of the urea grease in an amount of not smaller than 30% by weight based on the total amount of the base oil and comprises a urea compound incorporated therein as a thickening agent.

(16) The rolling bearing as defined in Clause (15), wherein the percent oil separation of the urea grease is not greater than 1.0% by weight.

(17) The rolling bearing as defined in Clause (1), wherein there is encapsulated a grease composition comprising an electrically-conductive material incorporated therein in an amount of from 0.1 to 10% by weight or a grease composition substantially free of sulfonate.

(18) The rolling bearing as defined in Clause (17), wherein the electrically-conductive material is carbon black.

(19) The rolling bearing as defined in Clause (17), wherein the electrically-conductive material is carbon nanotube.

(20) The rolling bearing as defined in Clause (18), wherein the amount of the thickening agent based on the total amount of the grease composition is from 5 to 40% by weight as calculated in terms of total amount, including that of carbon black.

(21) The rolling bearing as defined in Clause (17), wherein the grease composition comprises a urea compound incorporated therein as a thickening agent and comprises at least one rust preventive selected from the group consisting of naphthenate and succinate incorporated therein in an amount of from 0.1 to 10% by weight based on the total amount of the grease.

(22) The rolling bearing as defined in Clause (17), wherein the grease composition comprises a urea compound incorporated therein as a thickening agent and comprises an organic metal salt incorporated therein in an amount of from 0.1 to 10% by weight based on the total amount of the grease.

(23) The rolling bearing as defined in Clause (1), wherein the urea grease comprises at least one selected from the group consisting of synthetic hydrocarbon oil, ether-based synthetic oil and ester-based synthetic oil incorporated therein as a base oil and comprises a urea compound incorporated therein as a thickening agent and additives free of metal elements other than metal elements which are unavoidable impurities in an amount of from 8 to 40% by weight and from 0.1 to 4% by weight based on the total amount of the grease, respectively.

(24) The rolling bearing as defined in Clause (23), wherein the content of the additives is from 0.1 to 1% by weight based on the total amount of the grease.

(25) The rolling bearing as defined in Clause (23), wherein the total content of the metal elements as unavoidable impurities in the additives is not greater than 0.1 ppm based on the total amount of the grease.

(26) The rolling bearing as defined in Clause (1), wherein there is encapsulated a grease having an initial worked penetration of from 150 to 240 at 25° C.

(27) The rolling bearing as defined in Clause (26), wherein the thickening agent incorporated in the grease is made of a metal complex soap and accounts for from 20 to 30% by weight of the total amount of the grease.

(28) The rolling bearing as defined in Clause (26), wherein the thickening agent incorporated in the grease is made of a urea compound and accounts for from 15 to 40% by weight of the total amount of the grease.

(29) The rolling bearing as defined in Clause (1), wherein the grease comprises at least one selected from the group consisting of benzotriazole or derivative thereof, indazole or derivative thereof, benzothiazole or derivative thereof, benzoxazole or derivative thereof, benzimidazole or derivative thereof and thiadiazole or derivative thereof and at least one selected from the group consisting of metal dithiophosphate and metal dithiocarbamate incorporated therein in an amount of from 0.2 to 2% by weight and from 1 to 10% by weight based on the total amount of the grease, respectively.

(30) The rolling bearing as defined in Clause (1), wherein the grease comprises a base oil and a thickening agent incorporated therein and comprises at least one selected from the group consisting of basic alkylamine compound, organic metal salt and metal salt of organic acid incorporated therein in an amount of from 0.1 to 10% by weight based on the total amount of the grease.

(31) The rolling bearing as defined in Clause (30), which is used in an atmosphere having an acidic material present therein.

(32) The rolling bearing as defined in Clause (30), wherein as the thickening agent there is incorporated a urea compound in an amount of from 3 to 35% by weight based on the total amount of the grease.

(33) The rolling bearing as defined in Clause (1), wherein a plurality of rolling elements are rollably retained interposed between the inner ring and the outer ring.

(34) The rolling bearing as defined in Clause (1), wherein a plurality of rolling elements are rollably retained between the inner ring and the outer ring with a retainer provided interposed therebetween.

(35) The rolling bearing as defined in Clause (1), wherein is provided with a seal or shield.

(36) A rolling bearing for fuel cell as defined in Clause (1) which is adapted to be incorporated in a fuel cell system comprising at least a stack of fuel cells and a compressor for transporting various fluids at the compressor.

(37) The rolling bearing for fuel cell as defined in Clause (36), wherein the fuel cell system comprises at least a fuel tank, a fuel evaporator, a modifying device, a CO remover, a stack of fuel cells and a compressor for transporting various fluids.

(38) The rolling bearing for fuel cell as defined in Clause (36), which is adapted to be incorporated in an impeller type compressor, a scroll type compressor, a swash plate compressor or a screw type compressor.

(39) A compressor for fuel cell system provided with a rolling bearing for fuel cell as defined in Clause (36).

(40) A fuel cell system comprising a compressor as defined in Clause (39) as a compressor for transporting various fluids.

(41) The fuel cell system as defined in Clause (40), which is provided with at least a stack of fuel cells.

(42) The fuel cell system as defined in Clause (41), which is further provided with at least a fuel tank, a fuel evaporator, a modifier and a CO remover.

(43) The fuel cell system as defined in Clause (40), which is adapted for driving automobile.

DETAILED DESCRIPTION OF PREFERRED EMBODIMENTS

Figure 1:
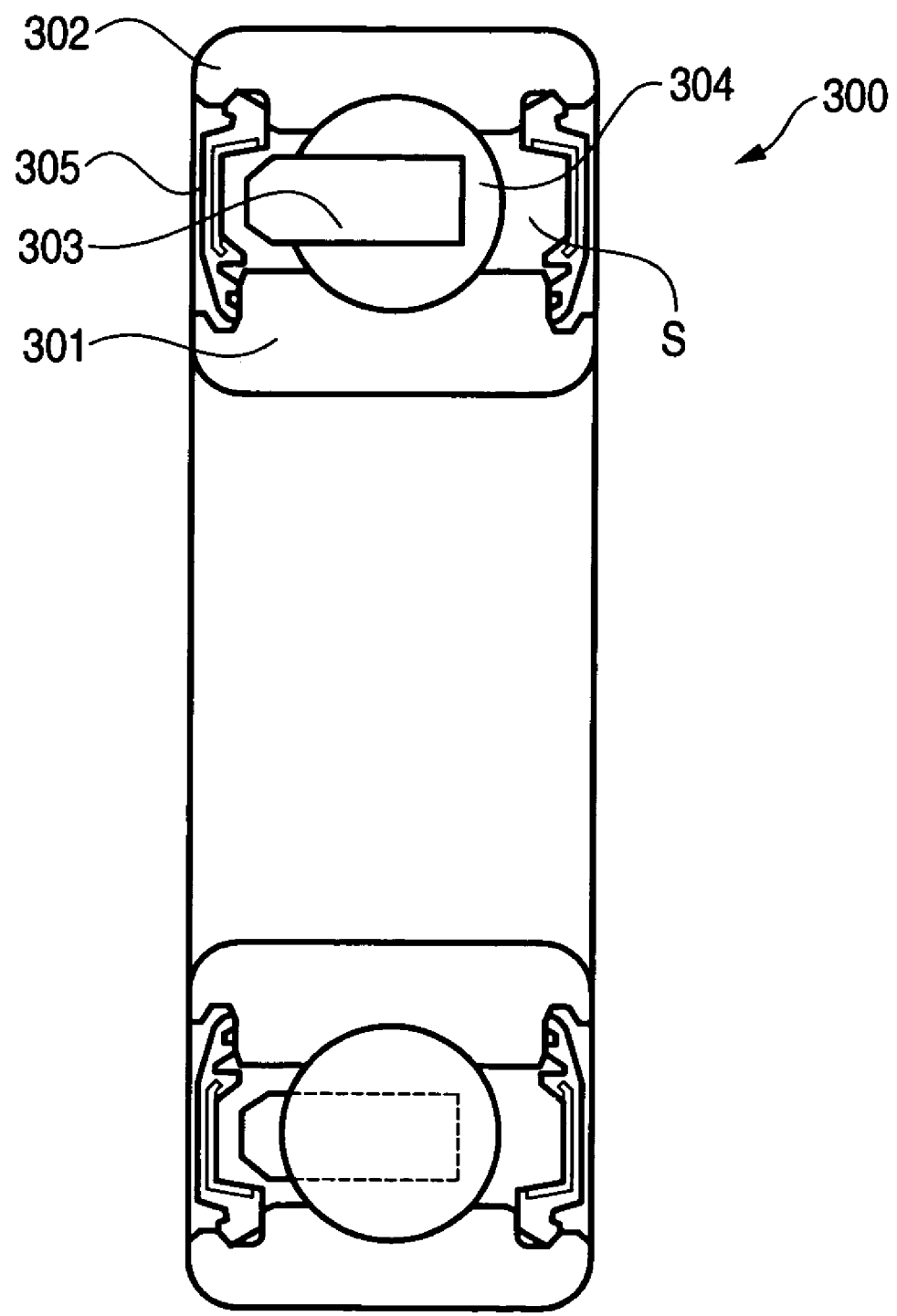
FIG. 1 is a sectional view illustrating an example (ball bearing) of the rolling bearing of the invention.

The invention will be further described hereinafter.

(Rolling Bearing)

In the invention, the configuration of the rolling bearing is not limited itself. For example, a ball bearing 300 shown in FIG. 1 can be exemplified. The ball bearing 300 shown comprises a plurality of balls 304 as rolling elements rollably retained at almost equal interval between an inner ring 301 and an outer ring 302 with a retainer 303 interposed therebetween. In the invention, the ball bearing 300 further comprises the grease described later (not shown) encapsulated in a space S defined by the inner ring 301, the outer ring 302 and the ball 304 in a predetermined amount. The grease is sealed by a sealing member 305. The encapsulated amount of the grease is from 5% to 50% by weight of the volume of space in the bearing as usual and is predetermined depending on the working conditions.

Figure 2:
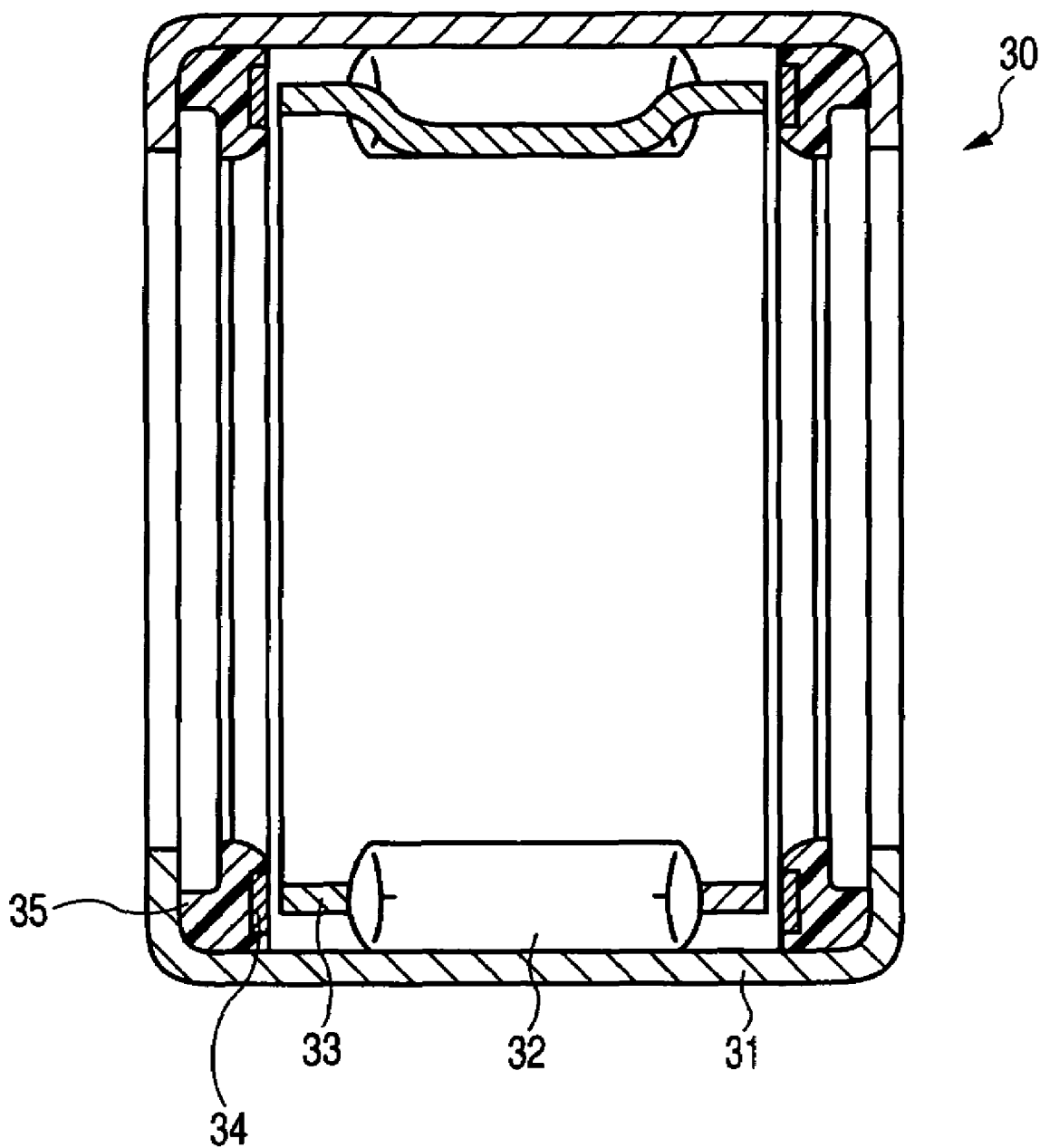
FIG. 2 is a sectional view illustrating an example (shell type) of the needle roller bearing according to an embodiment of implementation of the invention.
Figure 3:
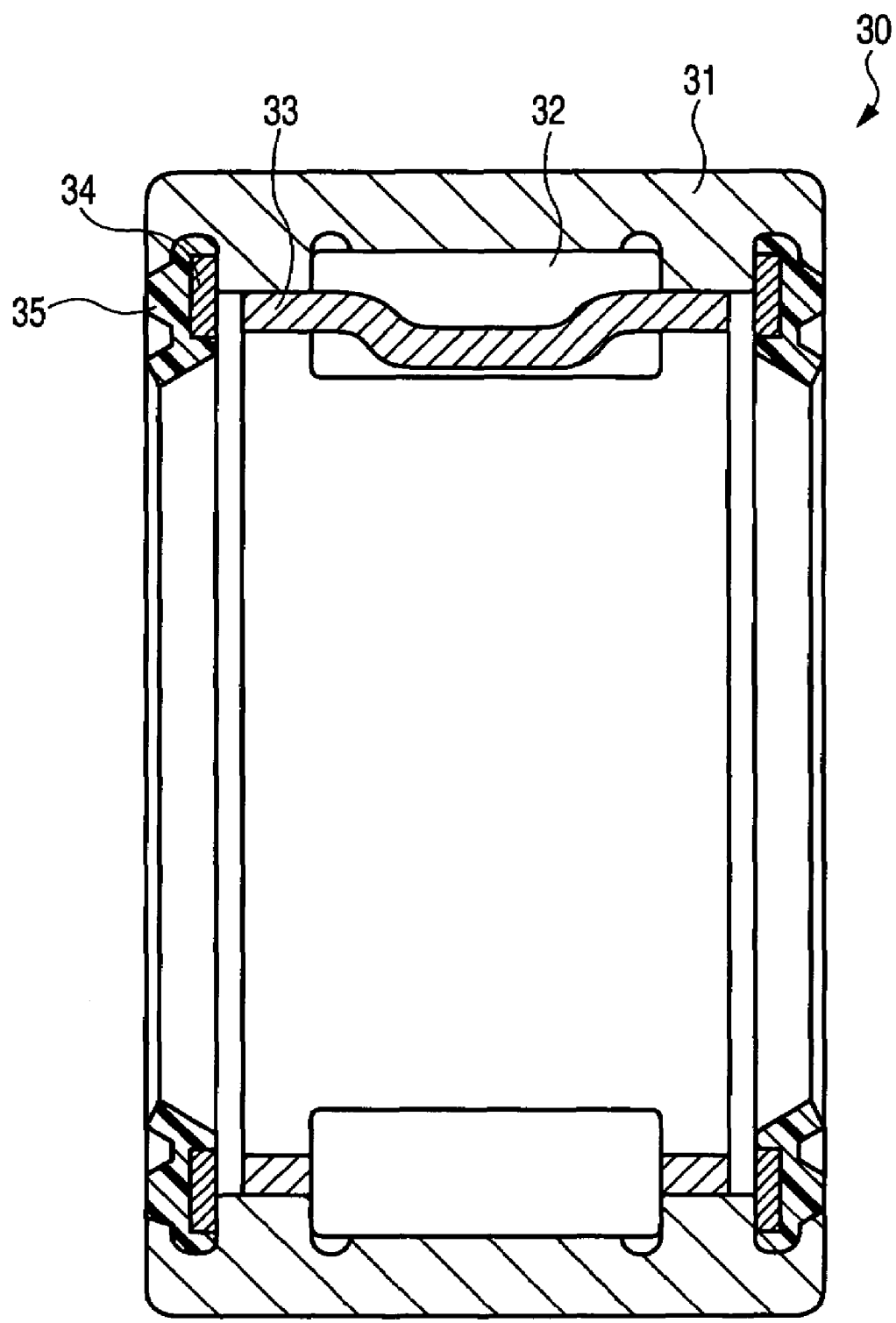
FIG. 3 is a sectional view illustrating an example (solid type) of the needle roller bearing according to an embodiment of implementation of the invention.

As a rolling bearing there may be exemplified a shell type needle roller bearing shown by sectional view in FIG. 2 or a solid type needle roller bearing shown by sectional view in FIG. 3. The shell type needle roller bearing 30 shown in FIG. 2 comprises a cylindrical shell-shaped outer ring 31 formed by deep-drawing a thin steel sheet, a plurality of needle rollers 32 disposed inside the shell-shaped outer ring 31, a retainer 33 for retaining these needle rollers 32, and a sealing device 35 mounted on the curved inner wall of the shell-shaped outer ring 31. The solid type needle roller 30 shown in FIG. 3 comprises an outer ring 31 formed by cutting a steel material, a plurality of needle rollers 32 disposed inside the outer ring 31, a retainer 33 for retaining these needle rollers 32, and a sealing device 35 mounted on the curved inner wall of the shell-shaped outer ring 31.

Taking into account the use with compressor for fuel cell system, the aforementioned ball bearing 300 and various needle roller bearings 30 preferably comprise their outer ring, retainer and needle roller made of stainless steel having an excellent corrosion resistance such as austenite stainless steel, e.g., SUS304, SUS316, ferrite stainless steel, e.g., SUS430, martensite stainless steel, e.g., SUS410, titanium, ordinary bearing steel or stainless steel mentioned above plated with a corrosion-resistant metal such as chromium-nickel and nickel-tungsten. In order to enhance its abrasion resistance, these bearings may further be subjected to carburizing or nitriding. Alternatively, the retainer may be made of a synthetic resin such as fiber-reinforced polyphenylene sulfide in addition to these materials taking into account seizing resistance during high speed rotation.

The aforementioned ball bearing 300 and various needle roller bearings 30 further comprise a grease described later encapsulated therein for lubrication.

As the grease to be used in the rolling bearing according to an embodiment of implementation of the invention there may be used a grease having an excellent water resistance and heat resistance such as fluorine-based grease containing a fluororesin and a fluorine-based oil, urea grease containing a urea compound and a synthetic oil and lithium complex grease containing a lithium complex and a synthetic oil. A grease comprising a simple metal soap-based thickening agent such as lithium soap is disadvantageous in that it exhibits water absorption properties as compared with grease comprising a urea-based or fluorine-based thickening agent and thus can easily absorb water, causing the occurrence of rust on the bearing or causing itself to flow out. In order to cope with ordinary leakage during use with bearing, a complex soap, urea-based grease or fluororesin-based grease, which has an excellent shear stability, is used to advantage.

Specific examples of the fluororesin employable herein as thickening agent include finely divided powders of ethylene tetrafluoride (PTFE resin), ethylene tetrafluoride-perfluoro-ethylene alkyl vinyl ether copolymer (PFA resin), ethylene tetrafluoride-ethylene copolymer (FEP resin), and vinylidene fluoride (PVDF). Examples of the lithium complex soap include one obtained by saponifying a mixture of azelaic acid and sebasic acid with lithium hydroxide. Examples of the urea compound include diurea, triurea, tetraurea, and polyurea.

Any grease preferably comprises a thickening agent incorporated therein in an amount of from 5% to 50% by weight based on the total amount of the grease. When the content of the thickening agent falls within the above defined range, the leakage of grease can be effectively prevented. When the content of the thickening agent falls below 5% by weight, a good form of grease cannot be obtained. On the contrary, when the content of the thickening agent exceeds 50% by weight, the resulting grease hardens to disadvantage.

On the other hand, as the fluorine-based oil there may be used a perfluoropolyether oil, chloroperfluoroether oil or the like. Preferred examples of the synthetic oil include ether oil, ester oil, synthetic hydrocarbon oil, and silicone oil. Specific examples of the synthetic oil include synthetic hydrocarbon oil such as poly-α-olefin oil, ether oil such as dialkyl diphenyl ether oil, alkyl triphenyl ether oil and alkyl tetraphenyl ether oil, ester oil such as diester oil, polyester oil and complex ester oil thereof, aromatic ester oil, methyl silicone oil, phenyl methyl silicone oil, and fluorosilicone oil. These synthetic oils may be used singly or in admixture. In particular, taking into account the lubricating properties and lubrication life at high temperatures and speeds, the base oil preferably comprises ester oil or ether oil incorporated therein. If necessary, the base oil may comprise mineral oil incorporated therein. Examples of the mineral oil include paraffin-based mineral oil, and naphthenic mineral oil.

These greases preferably comprise various rust preventives incorporated therein for providing proper rustproofness. Though not specifically limited, the base oil other than fluorine-based oil preferably comprises an ester-based rust preventive, an amine-based rust preventive, a rust preventive made of metal salt of sulfonic or carboxylic acid or a surface active agent-based rust preventive incorporated therein.

These greases may further comprise a solid lubricant such as molybdenum disulfide and graphite incorporated therein. These greases may further comprise various additives described below incorporated therein.

[Oxidation Inhibitor]

As an oxidation inhibitor there may be properly use done selected from the group consisting of antidegradant for rubber, plastic and lubricant, ozone deterioration inhibitor, and oxidation inhibitor. Examples of these oxidation inhibitors employable herein include amine-based compounds such as phenyl-1-naphthylamine, phenyl-2-naphthylamine, diphenyl-p-phenylenediamine, dipyridylamine, phenothiazine, N-methylphenothiazine, N-ethylphenothiazine, 3,7-dioctylphenothiazine, p,p'-dioctyldiphenylamine, N,N'-diisopropyl-p-phenylenediamine and N,N'-di-sec-butyl-p-phenylenediamine, and phenol-based compounds such as 2,6-di-tert-dibutylphenol.

[Rust Preventive/Metal Deactivator]

As a rust preventive there may be used any of the following compounds. Examples of the compounds employable as rust preventives herein include organic sulfonic acid ammonium salts, organic sulfonic acid and carboxylic acid salts, phenate and phosphonate of alkaline metal and alkaline earth metal such as barium, zinc, calcium and magnesium, alkyl and alkenylsuccinic acid derivatives such as alkylsuccinic acid ester and alkenylsuccinic acid ester, partial ester of polyvalent alcohol such as sorbitan monooleate, hydroxyaliphatic acids such as oleoylsarcosine, mercaptoaliphatic acids such as 1-mercaptostearic acid or metal salts thereof, higher aliphatic acids such as stearic acid, higher alcohols such as isostearyl alcohol, esters of higher alcohol with higher aliphatic acid, thiazoles such as 2,5-dimercapto-1,3,4-thiadiazole and 2-mercaptothiazole, imidazole-based compounds such as 2-(decyldithio)-benzoimidazole and benzimidazole, disulfide-based compounds such as 2,5-bis(dodecyldithio)benzimidazole, phosphoric acid esters such as trisnonylphenyl phosphite, and thiocarboxylic aci dester-based compounds such as dilaurylthiopropionate. Further, nitrites may be used. As metal deactivators there may be used triazole-based compounds such as benzotriazole and tolyl triazole.

[Oiliness Agent]

As an oiliness agent there may be used any of the following compounds. Specific examples of the compounds employ able asoiliness agents herein include aliphatic acids such as oleic acid and stearic acid, aliphatic acid alcohols such as oleyl alcohol, aliphatic acid esters such as polyoxyethylenestearic acid ester and polyglyceryloleic acid ester, phosphoric acid, and phosphoric acid esters such as tricresyl phosphate, lauric acid ester and polyoxyethylene oleyl ether phosphate. In the case where the base oil is a fluorine-based oil, an inorganic rust preventive such as magnesium oxide and titanium oxide or triazole-based rust preventive such as benzotriazole is preferably used.

[Extreme Pressure Agent, Abrasion Inhibitor]

For example, known extreme pressure agents such as combination of dithiocarbamate of tellurium and phosphoric acid ester and combination of dithiocarbaminate of molybdenum and dithiocarbaminate of zinc can be used singly or in combination to further improve the load resistance or extreme pressure properties of the grease. Specific examples of organic metal-based compounds employable herein include organic molybdenum compounds such as molybdenum dithiophosphate, organic zinc compounds such as zinc dithiophosphate and zinc phenate, organic antimony compounds such as antimony dithiocarbaminate and antimony dithiophosphate, organic selenium compounds such as selenium dithiocarbaminate, organic bismuth compounds such as bismuth naphthenate and bismuth dithiocarbaminate, organic iron compounds such as iron dithiocarbaminate and iron octylate, organic copper compounds such as copper dithiocarbaminate and copper napthenate, organic lead compounds such as leadnaphthenate and lead dithiocarbaminate, organic tin compounds such as tin maleate and dibutyltin sulfide, organic sulfonates, phenates and phosphonates of alkaline metal and alkaline earth metal, and organic compounds of metal such as gold, silver, titanium and cadmium. Examples of sulfur-based compounds employable herein include sulfides or polysulfides such as dibenzyl disulfide, sulfated oils, ash-free carbaminate compounds, thiourea-based compounds, and thiocarbonates. Alternatively, a halogen-based extreme pressure agent such as chlorinated paraffin or a solid lubricant such as molybdenumdisulfide, tungsten disulfide, graphite, PRFE, antimony sulfide and boron compound (e.g., boron nitride) may be used.

Among these additives, the oxidation inhibitor is preferably used in combination with the base oil other than fluorine-based oil taking into account the exposure to relatively high temperatures. These additives may be added in an amount which is normally used for grease.

The rolling bearing comprising the aforementioned specific grease encapsulated therein exhibits a prolonged life and a high reliability and thus can be used as a rolling bearing for fuel cell to be incorporated in the compressor for fuel cell system.

In an embodiment of implementation of the invention, the fluorine-based grease may be a grease composition comprising a perfluoroalkylether as a base oil, a polytetrafluoroethylene as a thickening agent and at least one of a magnesium compound and a vapor phase inhibitor as a rust preventive (hereinafter referred to as "mode 1"). The perfluoroalkylether preferably exhibits a kinetic viscosity of from 20 to 400 mm$^2$/s, more preferably from 30 to 300 mm$^2$/S, particularly from 65 to 200 mm$^2$/sat 40° C. to avoid the occurrence of unusual noise during low temperature starting due to lack of low temperature fluidity or the occurrence of seizing due to difficulty in forming oil film at high temperature. From the standpoint of fluidity of grease composition, the mixing ratio of perfluoroalkylether and polytetrafluoroethylene is preferably predetermined such that the grease composition exhibits a worked penetration of from Nos. 1 to 2 as defined in NLGI.

The magnesium compound is an inorganic magnesium compound. Examples of such an inorganic magnesium compound include oxide, chloride, fluoride, boride, nitride and sulfide of magnesium. Specific examples of these inorganic magnesium compounds include magnesium oxide, magnesium molybdate, magnesium stanate, magnesium titanate, magnesium tungstate, magnesium zirconate, magnesium aluminate, anhydrous magnesium chloride, anhydrous magnesium fluoride, magnesium boride, magnesium nitride, and magnesium sulfide. Alternatively, oxide of mixture of magnesium with other elements such as magnesium-iron oxide (e.g., magnesium ferrite) and dolomite (MgCO$_3$.CaCO$_3$), chloride of mixture of magnesium with other elements, fluoride of mixture of magnesium with other elements, boride of mixture of magnesium with other elements, nitride of mixture of magnesium with other elements or sulfide of mixture of magnesium with other elements may be used. Particularly preferred among these magnesium compounds are magnesium oxide and magnesium zirconate from the standpoint of rustproofness. The content of the magnesium compound is preferably from 0.5% to 3.0% by weight, particularly from 0.7% to 1.5% by weight based on the total amount of the grease. When the content of the magnesium compound falls below 0.5% by weight, the resulting rust-preventing effect is not sufficient. On the contrary, when the content of the magnesium compound exceeds 3.0% by weight, the enhancement of the rust preventing effect exerted by the increase of the amount of the magnesium compound cannot be observed, making it impossible to take an economic advantage. Further, the lubricating properties (e.g., acoustic properties) are adversely affected to disadvantage.

Examples of the vapor phase inhibitor employable herein include benzotriazole, methylbenzotriazole, dicyclohexyl ammonium nitrite (DICHAN), cyclohexylamine carbamate (CHC), diisopropyl ammonium nitrite (DIPAN), nitronaphthalineammonium nitrite (NITAN), dicyclohexylammonium caprylate, and cyclohexylammonium laurate. Particularly preferred among these vapor phase inhibitors are triazole-based compounds such as benzotriazole and methylbenzotriazole, and dicyclohexylammonium nitrite. The content of the vapor phase inhibitor is preferably from 0.05% to 1.0% by weight, particularly from 0.1% to 0.5% by weight based on the total amount of the grease. When the content of the vapor phase inhibitor falls below 0.05% by weight, the resulting rust preventing effect is insufficient. On the contrary, when the content of the vapor phase inhibitor exceeds 1.0% by weight, the enhancement of the rust preventing effect exerted by the increase of the amount of the vapor phase inhibitor cannot be observed, making it impossible to take an economic advantage. Further, the lubricating properties (e.g., acoustic properties) are adversely affected to disadvantage.

The magnesium compound and the vapor phase inhibitor may be used singly but may be used in combination to obtain a further rust preventing effect. Referring to the mixing ratio of the magnesium compound and the vapor phase inhibitor, the proportion of the magnesium compound is preferably greater than that of the vapor phase inhibitor because it is thought that the rust preventing effect is substantially exerted by a corrosion-resistant film made of a magnesium compound and the vapor phase inhibitor exerts an effect of reinforcing the corrosion-resistance film more than its effect of preventing rust.

The grease composition may further comprise other additives incorporated therein as necessary to further enhance lubricating properties. However, since additives containing metal elements can act as catalyst poisons when the grease is scattered and attached to the stack of fuel cells, additives free of metal elements are used in the present mode. Further, the additive containing metal elements have a high polarity and thus are expected to have a high interaction with the aforementioned surface active agent. Even additives free of metal elements are synthesized in the presence of a metal catalyst and thus can have the metal catalyst left therein as an unavoidable impurity. In the present mode, the incorporation of metal elements as unavoidable impurities is tolerated. The total content of metal elements is preferably not greater than 0.1 ppm based on the total amount of the grease.

Exemplifying these additives free of metal elements by their kind, there are amine-based or phenol-based oxidation inhibitors, long-chain aliphatic acid-based oiliness agents, and sulfur-based or phosphorus-based ash-free extreme pressure agents.

The total content of the additives free of metal elements is preferably from 0.1% to 4% by weight based on the total amount of the grease. When the content of the additives free of metal elements falls below 0.1% by weight, the effect of the additives cannot be exerted. On the contrary, when the content of the additives free of metal elements exceeds 4% by weight, the scattered amount of the additives is extremely great and the relative amount of the base oil is reduced, causing the deterioration of lubricating properties, particularly when the content of the thickening agent is small. In order to reduce as much as possible the scattered amount of the additives also when the content of the thickening agent is at the lower limit, the content of the additives free of metal elements is preferably from 0.1% to 1% by weight based on the total amount of the grease.

In accordance with the rolling bearing comprising the grease according to the mode 1, the grease encapsulated therein exhibits an excellent heat resistance and a low volatility as well as excellent rustproofness and corrosion resistance and thus has a prolonged life. Thus, the rolling bearing of the invention can be used as a rolling bearing for fuel cell to be incorporated in the compressor for fuel cell system.

The fluorine-based grease may also be a grease composition containing a fluorine-based lubricant as a base oil, a fluorine-based thickening agent and a fluorine-based surface active agent (herein after referred to as "mode 2"). The fluorine-based lubricant is not limited. Any fluorine-based lubricant which has been heretofore used for fluorine-based grease may be used. In practice, however, a perfluoropolyether oil, a fluorosilicone oil, chloroperfluoroether oil or a fluorophosphazene oil is preferably used. In particular, the perfluoropolyether oil is preferably used because of its excellent lubricating properties and heat resistance. In order to avoid the occurrence of unusual noise during low temperature starting due to lack of low temperature fluidity or the occurrence of seizing due to difficulty in forming oil film at high temperature, the fluorine-based lubricant preferably has a kinetic viscosity of from 10 to 2,000 mm$^2$/s at 20° C.

As the fluorine-based thickening agent, too, there may be used any fluorine-based thickening agent which has heretofore been used for fluorine-based grease. Preferred examples of the fluorine-based thickening agent employable herein include perfluoro-based fluororesins such as polytetrafluoroethylene (PTFE), tetrafluoroethylene-perfluoroalkylvinylether copolymer (PFA) and tetrafluoroethylene-hexafluoropropylene copolymer (FEP). In particular, polytetrafluoroethylene (PTFE) is preferably used because it exhibits an excellent high temperature stability or chemical resistance. The added amount of the fluorine-based thickening agent is not specifically limited but is properly from 5% to 35% by weight based on the total amount of the grease as in ordinary fluorine-based greases. The fluorine-based thickening agent preferably exhibits a worked penetration of from 200 to 350.

Preferred examples of the fluorine-based surface active agent employable herein include fluoroalcohol represented by Rf-OH, fluoroester represented by Rf-COO—R or Rf-COO-Rf, fluoroacrylate represented by Rf-OCO—R or Rf-OCO-Rf, fluorocarboxylic acid represented by Rf-COOH, and fluoroamine represented by Rf-NH$_2$. In these general formulae, Rf represents a hydrocarbon group containing fluorine atom, and R represents a hydrocarbon group. Rf and R may have oxygen, nitrogen and sulfur atoms (so-called ether bond or amide bond) in its molecular chain.

In particular, a fluorine-based surface active agent containing carbon atom and fluorine atom in its molecule at a ratio of 1:2 to 2:1 is preferred. Particularly preferred examples of the fluorine-based surface active agent employable herein include 3-hydroxy-2-(trifluoromethyl)propionic acid (HOCH$_2$CH(CF$_3$) COOH; boiling point: 97° C./2.5 mmHg)), α-trifluoromethylacrylic acid (CF$_3$C(COOH)=CH$_2$: boiling point: 86° C./35 mg)), perfluoro-n-pentanoic acid (n-C$_4$F$_9$COOH; boiling point: 82° C./85 mmHg)), (perfluoro-n-butyl)methanol (n-C$_4$F$_9$CH$_2$OH; boiling point: 77° C./173 mmHg), 2-(perfluoro-n-butyl) ethanol (n-C$_4$F$_9$CH$_2$CH$_2$OH; boiling point: 142° C.), (perfluoro-n-hexyl)methanol (n-C$_6$F$_{13}$CH$_2$OH; boiling point: 67° C./29 mmHg), 3-(perfluoro-n-butyl)propyl-2-enol (n-C$_4$F$_9$CH=CHCH$_2$OH; boiling point: 77° C./30 mmHg), perfluoro-n-heptanoic acid (n-C$_6$F$_{13}$COOH; 89° C./30 mmHg), perfluoro-n-nonanoic acid (n-C$_8$F$_{17}$COOH; 103° C./17 mmHg), (perfluoro-n-octyl)methanol (n-C$_8$F$_{17}$CH$_2$OH; boiling point: 84° C./16 mmHg), and 3-(perfluoro-n-hexyl) propyl-2-ethanol (n-C$_6$F$_{13}$CH=CHCH$_2$OH; boiling point: 77° C./10 mmHg). When the proportion of carbon atom in the molecule is great, the resulting fluorine-based surface active agent exhibits a raised affinity for the fluorine-based lubricant. On the contrary, when the proportion of fluorine atom in the molecule is great, the penetrating water content can easily form a film on the surface of race or rolling elements, deteriorating the lubricating properties.

More preferably, a fluorine-based surface active agent having a boiling point of not lower than 80° C. represented by Rf-R—COOH is used. Particularly preferred among the above exemplified examples is 3-(perfluoro-n-octyl) propanoic acid (n-C$_8$F$_{17}$CH$_2$CH$_2$COOH).

The added amount of the fluorine-based surface active agent is preferably from 0.2% to 10% by weight, more preferably from 1% to 8% by weight, particularly from 1% to 5% by weight based on the total amount of the grease. A fluorine-based surface active agent enhances the affinity of the fluorine-based lubricant for the surface of race or rolling elements, making it more likely that a film of fluorine-based lubricant can be formed between the surface of race and the surface of rolling elements. Even when water content further penetrates, the film of fluorine-based lubricant is maintained. As a result, an effect of enhancing or seizing resistance can be exerted. Therefore, when the added amount of the fluorine-based surface active agent falls below 0.2% by weight, such an effect cannot be expected. On the contrary, when the added amount of the fluorine-based surface active agent exceeds 10% by weight, the relative proportion of the base oil and the thickening agent is reduced, deteriorating the lubricating properties and hence the seizing resistance.

The grease composition may further comprise various additives incorporated therein as necessary. The action of the fluorine-based surface active agent makes it possible to use additives which have never been used for fluorine-based greases, not to mention additives which have heretofore been used for fluorine-based greases, and drastically increase the added amount of additives which have been able to be added in only a slight amount.

For example, sulfonic acid metal salts or succinic acid esters having excellent rustproofness can be added in the same manner as other greases to further enhance the rustproofness. Further, an extreme pressure agent or abrasion inhibitor such as zinc dithiocarbaminate, molybdenum dithiocarbaminate, tellurium dithiocarbaminate, antimony dithiocarbaminate, selenium dithiocarbaminate, iron dithiocarbaminate, copper dithiocarbaminate, zinc dithiophosphate, molybdenum dithiophosphate, antimony dithiophosphate, iron octylate, copper naphthenate, dibutyltin sulfide, phenate and phosphate may be added in the same amount as other greases.

However, since metal elements can be catalyst poisons against a stack of fuel cells, it is preferred that additives free of metal elements be added particularly when the rolling bearing is used in a site where the grease can be easily scattered.

In accordance with the rolling bearing comprising the grease composition according to the mode 2, the grease composition encapsulated therein exhibits excellent rustproofness and seizing resistance due to the action of a fluorine-based surface active agent. Accordingly, the rolling bearing of the mode 2 can be used in an atmosphere having an acidic material present therein and thus can be used as a rolling bearing for fuel cell to be incorporated in the compressor for fuel cell system.

The fluorine-based grease may be a mixture of a fluorine-based grease and a grease other than fluorine-based grease (hereinafter referred to as "mode 3"). These greases will be each further described hereinafter.

[Fluorine-based Grease]

The base oil of the fluorine-based grease is a fluorine-based oil. Specific examples of the fluorine-based oil employable herein include perfluoropolyether oil, and chloroper fluoroether oil. These fluorine-based oils may be used singly or in admixture. In order to avoid the occurrence of unusual noise during low temperature starting due to lack of low temperature fluidity or the occurrence of seizing due to difficulty in forming oil film at high temperature, the fluorine-based oil preferably exhibits a kinetic viscosity of from 20 to 400 mm$^2$/s, particularly from 30 to 200 mm$^2$/s at 40° C.

The thickening agent for the fluorine-based grease is a fluororesin. Specific examples of the fluororesin include finely divided powders of ethylene tetrafluoride (PTFE), ethylene tetrafluoride-perfluoroethylene alkyl vinyl ether copolymer (PFA esin), ethylene tetrafluoride-ethylene copolymer (FEP resin) and vinylidene fluoride (PVDF). The finely divided powder may be spherical or polyhedral (cubic or rectangular parallelopiped) or may be acicular in an extreme case. These fluororesins may be used singly or in admixture.

The content of the fluororesin in the fluorine-based grease is from 10% to 45% by weight, preferably from 15% to 35% by weight. When the content of the fluororesin falls below 10% by weight, the resulting grease is not stable and leaves something to be desired in heat resistance. On the contrary, when the content of the fluororesin exceeds 45% by weight, the resulting grease is too hard.

[Grease Other Than Fluorine-based Grease]

As the grease other than fluorine-based grease there is preferably used a metal complex soap-based grease or urea-based grease.

As a base oil to be incorporated in the metal complex soap-based grease or urea-based grease there is preferably used a synthetic hydrocarbon oil, ester oil, ether oil or silicone oil. Examples of the hydrocarbon-based oil include poly-α-olefins such as normal paraffin, isoparaffin, polybutene, polyisobutylene, 1-decene oligomer, 1-decene and ethylene cooligomer, and hydrogenation product thereof. Examples of the ester-based oil include diester oils such as dibutyl sebacate, di-2-ethylhexyl sebacate, dioctyl adipate, diisodecyl adipate, ditridecyl adipate, ditridecyl glutarate and methyl acetyl sinolate, aromatic ester oils such as trioctyl trimellitate, tridecyl trimellitate and tetraoctyl pyromellitate, polyol ester oils such as trimethylolpropane caprylate, trimethylolpropane peralgonate, pentaerythritol-2-ethylhexanoate and pentaerythritol peralgonate, and complex ester oils which are oligo esters of mixed aliphatic acid comprising dibasic acid and monobasic acid with polyvalent alcohol. Examples of the ether-based oil include polyglycols such as polyethylene glycol, polypropylene glycol, polyethylene glycol monoether and polypropylene glycol monoether, and phenyl ether oils such as monoalkyl triphenyl ether, alkyl diphenyl ether, dialkyl diphenyl ether, pentaphenyl ether, tetraphenyl ether, monoalkyl tetraphenyl ether and dialkyl tetraphenyl ether. Examples of the silicone oil include methyl silicone oil, phenyl methyl silicone oil, and phenyl fluorosilicone oil. These base oils may be used singly or in admixture. A mineral oil may be incorporated in the grease as necessary. However, a mineral oil contains impurities that can be evaporated to contaminate the exterior. Therefore, the mineral oil is preferably subjected to vacuum distillation, solvent deasphalting, solvent extraction, hydrogenation decomposition, solvent dewaxing, sulfuric acid washing, clay purification, hydrogenation purification, etc. in proper combination before use. Preferred among these base oils are ester-based oils and ether-based oils taking into account the lubricating properties or lubrication life under working conditions at high temperature and high speed. These ester-based oils and ether-based oils are also advantageous in that they have a relatively high affinity for fluorine-based oil which is a base oil for fluorine-based grease. In the case where the atmosphere has a high water content, the grease preferably contains a poly-α-olefinic synthetic hydrocarbon oil having a high water repellent effect.

In order to avoid the occurrence of unusual noise during low temperature starting due to lack of low temperature fluidity or the occurrence of seizing due to difficulty in forming oil film at high temperature, the base preferably exhibits a kinetic viscosity of from 10 to 400 mm$^2$/sec, more preferably from 20 to 250 mm$^2$/sec, even more preferably from 40 to 150 mm$^2$/sec at 40° C.

Examples of thickening agent for metal complex soap-based grease include soap of complex of metal selected from the group consisting of Li, Na, Ba and Ca, and mixture thereof. A simple metal soap-based thickening agent such as lithium soap has a water absorption that causes the grease to contain water content, making it likely that the bearing can be rusted or the grease can become liquid and flow out. On the other hand, examples of the thickening agent for urea-based grease include diurea compound, triurea compound, tetraurea compound, polyurea compound, and mixture thereof. These thickening agents may be used singly or in admixture.

The amount of the thickening agent for the metal complex soap-based grease and the urea-based grease each are from 5% to 40% by weight, preferably from 10% to 30% by weight. When the amount of the thickening agent falls below 5% by weight, the desired grease cannot be formed. On the contrary, when the amount of the thickening agent exceeds 40% by weight, the resulting grease is too hard.

Either or both of the aforementioned metal complex soap-based grease and the urea-based grease may be used as necessary. Taking into account the heat resistance and acoustic properties of the grease thus obtained, the urea-based grease is preferably used. In the case where both the two greases are used in combination, the mixing proportion of the metal complex soap-based grease and the urea-based grease can be properly and arbitrarily predetermined as necessary.

[Additives]

The aforementioned fluorine-based grease and the grease other than the fluorine-based grease each may comprise various additives incorporated therein to further enhance the properties thereof. In particular, the additives as described later are preferably used. When the added amount of these additives is too great, the relative content of the base oil and the thickening agent is reduced, deteriorating the lubricating properties of the grease. Thus, the added amount of these additives is preferably not greater than 20% by weight based on the total amount of the mixed grease.

(Rust Preventive/Metal Deactivator)

The grease other than fluorine-based grease may comprise as a rust preventive organic sulfonic acid ammonium salts, organic sulfonic acid and carboxylic acid salts, phenate and phosphonate of alkaline metal and alkaline earth metal such as barium, zinc, calcium and magnesium, alkyl and alkenyl-succinic acid derivatives such as alkylsuccinic acid ester and alkenylsuccinic acid ester, partial ester of polyvalent alcohol such as sorbitan monooleate, hydroxyaliphatic acids such as oleoylsarcosine, mercaptoaliphatic acids such as 1-mercaptostearic acid or metal salts thereof, higher aliphatic acids such as stearic acid, higher alcohols such as isostearyl alcohol, esters thereof, thiazoles such as 2,5-dimercapto-1,3,4-thiadiazole, imidazoles such as benzimidazole, sulfide-based compounds, phosphoric acid esters such as tris-nonylphenyl phosphite, thiocarboxylic acid ester-based compounds such as dilauryl thiopropionate, nitrites, etc. incorporated therein. As the metal deactivator there may be used a triazole-based compound such as benzotriazole.

The fluorine-based grease may comprise a fluorine-based rust preventive having a perfluoroalkyl, perfluoroether or perfluoropolyether structure terminated by an alcohol-modified, carboxyl-modified or isocyanate-modified functional group incorporated therein besides inorganic compounds such as magnesium oxide and titanium chloride or benzotriazole-based compounds.

(Oiliness Agent)

The grease other than fluorine-based grease may comprise an aliphatic acid such as oleic acid and stearic acid, an aliphatic acid alcohol such as oleyl alcohol, an aliphatic acid ester such as polyoxyethylenestearic acid ester, phosphoric acid ester such as tricresyl phosphate, lauric acid ester and polyoxyethyleneoleyletherphosphoric acid, etc. incorporated therein.

(Extreme Pressure Agent/Abrasion Inhibitor)

The grease other than fluorine-based grease may comprise a dithiocarbaminate of zinc, molybdenum, tellurium, antimony, selenium, iron, copper, etc., a dithiophosphate of zinc, molybdenum, antimony, etc., an organic metal compound such as iron octylate, dibutyltin sulfide, phenate and phosphate, a sulfur-based compound such as dibenzyl disulfide, polysulfide, sulfated oil and fat, thiourea and thiocarbonate, a halogen-based extreme pressure agent such as chlorinated paraffin, a solid lubricant such as molybdenum disulfide, tungstendisulfide, graphite, PTFE, antimony sulfide and boron nitride, etc. incorporated therein.

[Formulation of Mixed Grease]

The mixed grease to be used in the present mode is a mixture of the aforementioned fluorine-based grease and the grease other than the fluorine-based grease. The mixing ratio of the fluorine-based grease and the grease other than the fluorine-based grease can be properly predetermined taking into account the desired heat resistance, water resistance and rustproofness. However, in the case where as the grease other than the fluorine-based grease there is used at least one of metal complex soap-based grease and urea-based grease, the mixing ratio of at least one of metal complex soap-based grease and urea-based grease to fluorine-based grease by weight is preferably from 30:70 to 80:20. When the fluorine-based grease is incorporated in an amount of greater than 70% by weight, the amount of the metal complex soap-based grease and the urea-based grease is too small. As a result, the mixing proportion of the mineral oil or synthetic oil as a base oil in these greases is reduced, making it impossible to add a rust preventive in an effective amount and hence obtain sufficient rustproofness. Further, the increase of the amount of the fluorine-based grease gives a tendency that the material cost of the mixed grease can be as high as the fluorine-based grease. On the contrary, when the amount of the fluorine-based grease falls below 20% by weight, the resulting mixed grease can be difficultly provided with a sufficient heat resistance, giving a tendency that the seizing life can be reduced.

The total amount of the thickening agents, i.e., metal soap, urea compound and fluororesin in the mixed grease is from 15% to 35% by weight. When the total amount of the thickening agents in the mixed grease falls below 15% by weight, it is disadvantageous in that the resulting mixed grease shows much oil separation and deteriorated shear stability and thus can leak, reducing the seizing life. On the contrary, when the total amount of the thickening agents in the mixed grease exceeds 35% by weight, the mixed grease exhibits a raised fluidity and thus cannot reach the running surface of the bearing outer ring and inner ring, giving problems with seizing life and low temperature properties.

[Worked Penetration of Mixed Grease]

Referring to the worked penetration of the mixed grease, the mixture of the fluorine-based grease and the grease other than fluorine-based grease which has just been prepared preferably exhibits a worked penetration of from 180 to 360 (25° C.). When the worked penetration of the mixed grease falls below 180, the resulting mixed grease is too hard to show a sufficient fluidity. On the contrary, when the worked penetration of the mixed grease exceeds 360, the resulting mixed grease exhibits too great a fluidity and thus can flow out with much water content.

[Method for Preparation of Mixed Grease]

Neither the fluorine-based grease nor the grease other than fluorine-based grease is limited in its preparation. Both the two greases can be obtained by reacting a thickening agent in a base oil. The fluorine-based grease is obtained by mixing a fluorine-based oil with a finely divided fluororesin thoroughly, and then kneading the mixture using a three-stage roll mill or the like. The grease other than fluorine-based grease, if it is a urea-based grease, is obtained by reacting a half amount of a base with an isocyanate in a first vessel while reacting the rest half amount of a base with an amine in a second vessel, and then transferring the content of the second vessel to the first vessel where the mixture is then thoroughly stirred.

Thereafter, the fluorine-based grease and the grease other than fluorine-based grease are mixed at a predetermined ratio, and then thoroughly stirred and kneaded using an agitating/kneading unit such as kneader and roll mill so that they are uniformly dispersed with each other to obtain a mixed grease. During this procedure, heating is effected to advantage.

The rolling bearing comprising the grease according to the mode 3 has the aforementioned specific grease encapsulated therein and thus exhibits excellent heat resistance, waterproofness and rustproofness and a prolonged life, not to mention good lubricating properties. Therefore, the rolling bearing of the invention can be used as, e.g., a rolling bearing for fuel cell to be incorporated in the compressor for fuel cell system.

In the embodiment of implementation of the invention, the base to be incorporated in the grease preferably exhibits a vapor pressure of not higher than $1.3 \times 10^{-1}$ Pa at 25° C. (hereinafter referred to as "mode 4"). The mode 4 will be further described hereinafter.

[Base Oil]

The base oil to be incorporated in the grease is not specifically limited so far as it exhibits a vapor pressure of not higher than $1.3 \times 10^{-1}$ Pa at 25° C. Various lubricants may be used. However, existing lubricants having a vapor pressure of lower than $10^{-12}$ Pa at 25° C. are disadvantageous in that they have too high a kinetic viscosity and thus cause much increase of torque or much heat generation. Preferably, lubricants having a vapor pressure of from $10^{-10}$ to $10^{-2}$ Pa at 25° C. are used.

Preferred among lubricants are synthetic lubricants, particularly alkyl chain-derived polyphenylether oil, alkyl chain-derived naphthalene oil, paraffin-based hydrocarbon oil, fluorine-based oil and alkylcyclopentane. Specific examples of the alkyl chain-derived polyphenyl ether oil include monoalkyl triphenyl ether, alkyl diphenyl ether, dialkyl diphenyl ether, pentaphenyl ether, tetraphenyl ether, monoalkyl tetraphenyl ether, and dialkyl tetraphenyl ether. Specific examples of the alkyl chain-derived naphthalene oil include monoalkyl naphthalene, dialkyl naphthalene, and polyalkyl naphthalene. Specific examples of the paraffin-based hydrocarbon oil include poly-α-olefin such as normal paraffin, isoparaffin, polybutene, polyisobutylene, 1-decene oligomer, copolymer of 1-decene and ethylene oligomer, and hydrogenation product thereof. Specific examples of the fluorine-based oil include perfluoroether oil, fluorosilicone oil, and fluorophsphazene. Specific example of the alkylcyclopentane include tris(2-octyldodecyl)cyclopentane. These lubricants may be mixed such that the mixture exhibits a vapor pressure of not higher than $1.3 \times 10^{-1}$ Pa at 25° C. before use.

Further, the base oil comprising these lubricants preferably exhibits a kinetic viscosity of from 20 to 400 mm²/sec at 40° C. When the kinetic viscosity of the base oil falls below 20 mm²/sec at 40° C., it is difficult to form an oil film. On the contrary, when the kinetic viscosity of the base oil exceeds 400 mm²/sec at 40° C., much torque or heat generation occurs to disadvantage.

Among the aforementioned lubricants, tris(2-octyldodecyl)cyclopentane has as low a volatility as $2.5 \times 10^{-10}$ Pa as calculated in terms of vapor pressure at 25° C. and a kinetic viscosity of 112 mm²/s at 40° C. and thus is particularly preferred.

[Thickening Agent]

The thickening agent to be used in the invention is not specifically limited so far as it is capable of retaining a base oil in the gel structure. In practice, however, metal soaps, metal complex soaps and urea compounds are preferred.

Examples of the metal soaps employable herein include soap of metal such as Li and Na. Examples of the metal complex soaps employable herein include metal complex soap made of metal such as Li, Na, Ba and Ca. Examples of the urea compound employable herein include diurea compound, triurea compound, tetraurea compound, polyurea compound, urea urethane compound, diuretane compound, and mixture thereof. Particularly preferred among these urea compounds is diurea compound. As the fluorine-based oil to be used as a base there may be used a fluororesin such as polytetrafluoroethylene.

The content of the thickening agent is preferably from 5% to 40% by weight based on the total amount of the grease. When the content of the thickening agent falls below 5% by weight, a sufficient thickening effect cannot be obtained, causing the leakage of the grease and hence making it impossible to realize a low dusting. On the contrary, when the content of the thickening agent exceeds 40% by weight, the resulting grease exhibits poor fluidity and thus can cause seizing. Since the enhancement of the worked penetration of the grease prevents the scattering of the grease, the thickening agent is preferably incorporated in an amount as great as possible within the aforementioned range, more preferably from 15% to 40% by weight based on the total amount of the grease.

[Additives]

In order to further enhance the lubricating properties, etc. of the grease, the grease may comprise various additives such as oxidation inhibitor, rust preventive, metal deactivator, oiliness agent, extreme pressure agent and abrasion inhibitor incorporated therein singly or in proper combination as necessary. However, since additives containing metal elements can be a dusting source, additives free of metal elements are preferably selected except those containing metal elements as unavoidable impurities. The total added amount of these additives is preferably not greater than 0.1 to 4% by weight based on the total amount of the grease.

[Preparation Method]

The method for the preparation of the aforementioned grease is not specifically limited. In practice, however, the grease is obtained by reacting a thickening agent in a base oil. The kneading of these components can be carried out using a kneader, roll mill or the like. The additives may be added during kneading.

The rolling bearing comprising the grease according to the mode 4 can cause less dusting and thus can be used as, e.g., rolling bearing for fuel cell to be incorporated in the compressor for fuel cell system.

In the embodiment of implementation of the invention, the urea grease comprises an alkyl-substituted diphenyl sulfide represented by the following general formula (I) or (II) incorporated therein as an alkyl-substituted diphenyl sulfide in an amount of not smaller than 30% by weight (hereinafter referred to as "mode 5").

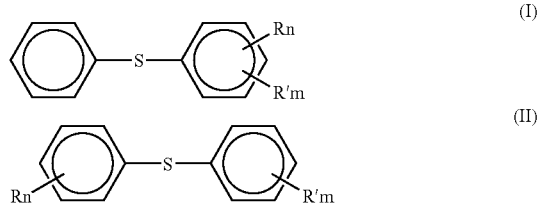

In the foregoing general formulae, R and R' may be the same or different and each represent a $C_{10}$-$C_{20}$ hydrocarbon group; and m and n each represent an integer of not smaller than 0 satisfying the relationship $1 \leq m+n \leq 4$. Preferred among these compounds are diphenyl sulfides of hydrocarbon group wherein both R and R' have 12 and 14 carbon atoms.

As lubricants having an excellent heat resistance there are known polyphenyl ether oil, silicone oil, fluorine-based oil, etc. However, the polyphenyl ether oil and fluorine-based oil are disadvantageous in that they are expensive. The silicone oil normally exhibits poor lubricating properties. On the contrary, the alkyl-substituted diphenyl sulfide is advantageous in that it is inexpensive but exhibits excellent lubricating properties as well as excellent heat resistance, oxidation resistance and abrasion resistance. Accordingly, the alkyl-substituted diphenyl sulfide is preferably incorporated in the base in an amount of not smaller than 30% by weight. The greater the content of the alkyl-substituted diphenyl sulfide is, the better are lubricating proper, heat resistance, oxidation resistance and abrasion resistance. In the case where seizing life is regarded important, as the base there is preferably used the alkyl-substituted diphenyl sulfide alone. Taking into account the cost, however, the alkyl-substituted diphenyl sulfide is preferably incorporated in an amount of from 50% to 75% by weight based on the total amount of the base oil.

However, the greater the content of the alkyl-substituted diphenyl sulfide is, the poorer is the fluidity of the grease. Thus, in the case where the occurrence of unusual noise at low temperatures needs to be inhibited, other lubricants may be used in admixture with the alkyl-substituted diphenyl sulfide to lower the pour point of the base oil, making it possible to improve the low temperature fluidity of the grease. In some detail, the base preferably exhibits a kinetic viscosity of from 20 to 200 mm²/s, particularly from 40 to 150 mm²/s at 40° C. The alkyl-substituted diphenyl sulfide is mixed with other lubricants such that the resulting kinetic viscosity falls within the above defined range to prepare the desired base oil.

As the lubricant to be used in combination with the alkyl-substituted diphenyl sulfide there is preferably used one excellent in heat resistance, oxidation inhibitor, load resistance, etc. Preferred among these lubricants are synthetic hydrocarbon oil, ether oil, and ester oil. Examples of the synthetic oil include poly-α-olefin oil. Examples of the ether oil include dialkyl diphenyl ether oil, alkyl triphenyl ether oil, and alkyl tetraphenyl ether oil. Examples of the ester oil include dieter oil, neopentyl type polyol ester oil, complex ester oil thereof, and aromatic ester oil. These lubricants may be used singly or in proper combination. In particular, taking into account heat resistance for enhancement of lubricating properties and seizing life allowing the use under severe conditions such as high temperature, high speed, high load and vibration, low temperature fluidity for inhibiting the occurrence of unusual noise at low temperatures, etc., a polyol ester oil such as pentaerythritol ester and dipentaerythritol ester, an aromatic ester oil and a synthetic hydrocarbon oil are preferably used in admixture.

The aforementioned base oil comprises a urea compound incorporated therein as a thickening agent. A metal soap-based thickening agent has a poor heat resistance. Thus, a urea compound is used as a thickening agent in the present embodiment of implementation of the invention. As thickening agents having an excellent heat resistance there are known sodium terephthalamate, fluororesin, clay mineral, etc. However, sodium terephthalamate exhibits much oil separation. The fluororesin is expensive. The clay mineral exhibits poor acoustic properties. On the contrary, the urea compound is inexpensive and exhibits well-balanced heat resistance, acoustic properties, etc. The incorporation of the urea compound makes it possible to suppress the percent oil separation to not greater than 1.0% by weight with respect to base oil and prolong the lubricating life. Unlike the metal soap-based thickening agent, the urea compound contains no metal elements in its molecule and thus cannot act as a catalyst poison even when the grease is scattered and attached to the stack of fuel cells.

As the urea compound there may be used a diurea compound, triurea compound, tetraurea compound or polyurea compound. Preferred among these urea compounds is a diurea compound represented by the following general formula (III):

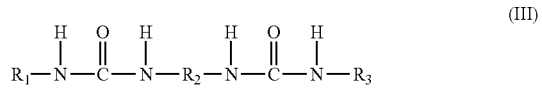

wherein $R_2$ represents a $C_6$-$C_{15}$ aromatic hydrocarbon group; $R_1$ and $R_3$ may be the same or different and each represent a hydrocarbon group which may be either aliphatic or aromatic or condensed ring hydrocarbon group which preferably has from 9 to 19 carbon atoms.

The diurea compound represented by the foregoing general formula (III) is obtained by reacting a monoamine containing $R_1$ or $R_3$ in its skeleton with a diisocyanate containing $R_2$ in its skeleton at a ratio of 2:1 in a base oil.

As the diisocyanate containing $R_2$ in its skeleton there is preferably used diphenylmethane diisocyanate, tolylene diisocyanate, xylylene diisocyanate, biphenylene diisocyanate, dimethyldiphenyl isocyanate or alkyl-substitution product thereof.

Preferred examples of the monoamine containing a hydrocarbon group as $R_1$ or $R_3$ in its skeleton include aniline, cyclohexylamine, octylamine, toluidine, dodecylaniline, octadecylamine, hexylamine, heptylamine, nonylamine, ethylhexylamine, decylamine, undecylamine, dodecylamine, tetradecylamine, pentadecylamine, nanodecylamine, eicodecyamine, oleylamine, linoleilamine, linolenylamine, methylcyclohexylamine, ethylcyclohexylamine, dimethylcyclohexylamine, diethylcyclohexylamine, butylcyclohexylamine, propylcyclohexylamine, amylcyclohexylqamine, cyclooctylamine, benzylamine, benzhydrylamine, phenethylamine, methylbenzylamine, biphenylamine, phenylisopropylamine, and phenylhexylamine.

Preferred examples of the monoamine containing a condensed ring hydrocarbon group as $R_{1\ or\ R3}$ in its skeleton include indene-based amine compounds such as aminoindene, aminoindane and amino-1-methylindene, naphthalene-based amino compounds such as aminonaphthalene (napthylamine), aminomethyl naphthalene, aminoethyl naphthalene, aminodimethyl naphthalene, aminocadalene, aminovinyl naphthalene, aminophenyl naphthalene, aminobenzyl naphthalene, aminodinaphthylamine, aminobinaphthyl, amino-1,2-dihydronaphthalene, amino-1,4-dihydronaphthalene, aminotetrahydronaphthalene and aminooctalene, condensed bicyclic amine compounds such as aminopentalene, aminoazlene and aminoheptane, aminofluororene-based compounds such as aminofluorene and amino-9-phenylfluorene, anthracene-based amine compounds such as aminoanthracene, aminomethyl anthracene, aminodimethyl anthracene, aminophenyl anthracene and amino-9,10-dihydroanthracene, phenanthrene-based amine compounds such as aminophenanthrene, amino-1,7-dimethylphenanthrene and aminoretene, condensed tricyclic amine compounds such as aminobiphenylne, amino-s-indacene, amino-as-indacene, aminoacenaphthylene and aminoacenaphthene and aminophenalene, condensed tetracyclic amine compounds such as aminonaphthacene, aminochrysene, aminopyrene, aminotriphenylene, aminobenzoanthracene, aminoaceantolylene, aminoaceanthrene, aminoacephenantolylene, aminoacephenanthrene, aminofluoranthene and aminopleiadene, condensed pentacyclic amine compounds such as aminopentacene, aminopentaphene, aminopicene, aminoperylene, aminodibenzoanthracene, aminobenzopyrene and aminocholanthrene, and condensed polycyclic (hexacyclic or higher) amine compounds such as aminocoronene, aminopyranthrene, aminoviolanthrene, aminoisopyranthrene and aminoovalene.

The content of the urea compound is from 10% to 25% by weight, preferably from 15% to 22% by weight based on the total amount of the grease. When the content of the urea compound falls below 10% by weight, a sufficient thickening effect can not be obtained, causing the leakage of the grease. On the contrary, when the content of the urea compound exceeds 25% by weight, the resulting grease exhibits a poor fluidity causing much agitation resistance leading to much heat generation in the bearing to disadvantage.

The aforementioned grease may comprise other additives incorporated therein as necessary to further enhance the lubricating properties, etc. thereof. However, since additives containing metal elements can act as catalyst poisons when the grease is scattered and attached to the stack of fuel cells, additives free of metal elements other than metal elements which are unavoidable impurities are preferably used. Exemplifying these additives free of metal elements by their kind, there are amine-based or phenol-based oxidation inhibitors, sulfur-based or phosphorus-based ash-free extreme pressure agents, long-chain aliphatic acid-based oiliness agents, and benzotriazole- or thiadiazole-based metal deactivators. The added amount of these additives may be properly predetermined so far as the aim of the invention is not impaired but is preferably from 0.1% to 4% by weight in total. When the content of these additives falls below 0.1% by weight, the effect of the additives cannot be exerted. On the contrary, when the content of these additives exceeds 4% by weight, the scattered amount of the grease increases and the content of the base oil is relatively reduced, causing deterioration of lubricating properties, particularly when the content of the thickening agent is small.

In the rolling bearing comprising the grease according to the mode 5, the base oil of the encapsulated grease comprises a low volatility diphenyl sulfide incorporated therein and comprises a diurea compound excellent in heat resistance, etc. incorporated therein as a thickening agent. Thus, the rolling bearing of the invention can operate in a stable manner over an extended period of time even under severe working conditions such as high temperature, high speed, high load and vibration and generates little unusual noise even when used at low temperatures. Accordingly, as mentioned above, the rolling bearing of the invention generates little dust and can be used even under severe working conditions such as high temperature, high speed, high load and vibration. Therefore, the rolling bearing of the invention can be used as a rolling bearing for fuel cell to be incorporated in the compressor for fuel cell system which is required to generate no unusual noise at low temperatures.

In the embodiment of implementation of the invention, a first grease composition or second grease composition described later may be used (hereinafter referred to as "mode 6"). The mode 6 will be described hereinafter.

(1) First Grease Composition

The first grease composition comprises abase oil, a thickening agent and an electrically-conductive material incorporated therein.

[Base Oil]

The base oil to be used in the invention is not specifically limited. All oils which are normally used as base oil for lubricants can be used. The base oil preferably exhibits a kinetic viscosity of from 30 to 600 $mm^2/s$, more preferably from 50 to 500 $mm^2/s$, particularly from 70 to 250 $mm^2/s$ at 40° C. to avoid the occurrence of unusual noise during low temperature starting due to lack of low temperature fluidity or the occurrence of seizing due to difficulty in forming oil film at high temperature.

In some detail, a mineral oil-based, synthetic oil-based or natural oil-based lubricant may be used. As the mineral oil-based lubricant there may be used one obtained by subjecting a mineral oil to purification by vacuum distillation, solvent deasphalting, solvent extraction, hydrogenation decomposition, solvent dewaxing, sulfuric acid washing, clay purification, hydrogenation purification, etc. in proper combination. As the synthetic oil-based lubricant there may be used a hydrocarbon-based oil, aromatic oil, ester-based oil, ether-based oil or the like. Examples of the hydrocarbon-based oil include poly-α-olefins such as normal paraffin, isoparaffin, polybutene, polyisobutylene, 1-decene oligomer, 1-decene and ethylene cooligomer, and hydrogenation product thereof. Examples of the aromatic oil include alkylbenzenes such as monoalkylbenzene and dialkylbenzene, and alkylnaphthalenes such as monoalkylnaphthalene, dialkylnaphthalene and polyalkylnaphthalene. Examples of the ester-based oil include diester oils such as dibutyl sebacate, di-2-ethylhexyl sebacate, dioctyl adipate, diisodecyl adipate, ditridecyl adipate, ditridecyl glutarate and methyl acetyl sinolate, aromatic ester oils such as trioctyl trimellitate, tridecyl trimellitate and tetraoctyl pyromellitate, polyol ester oils such as trimethylolpropane caprylate, trimethylolpropane peralgonate, pentaerythritol-2-ethylhexanoate and pentaerythritol peralgonate, and complex ester oils which are oligo esters of mixed aliphatic acid comprising dibasic acid and monobasic acid with polyvalent alcohol. Examples of the ether-based oil include polyglycols such as polyethylene glycol, polypropylene glycol, polyethylene glycol monoether and polypropylene glycol monoether, and phenyl ether oils such as monoalkyl triphenyl ether, alkyl diphenyl ether, dialkyl diphenyl ether, pentaphenyl ether, tetraphenyl ether, monoalkyl tetraphenyl ether and dialkyl tetraphenyl ether. Examples of other synthetic lubricant base oils include tricresyl phosphate, silicone oil, perfluoroalkylether, and perfluoropolyether (PFPE). Examples of the natural oil-based lubricant oils include fat oils such as beef tallow, lard, soybean oil, colza oil, rice bran oil, coconut oil, palm oil and palm nucleus oil, and hydrogenation product thereof. These base oils may be used singly or in admixture. These base oils are adjusted to the aforementioned preferred kinetic viscosity.

[Thickening Agent]

The thickening agent to be used in the invention is not specifically limited so far as it is capable of forming a gel structure and retaining a base oil in the gel structure. For example, metal soaps such as metal soaps made of Li, Na, etc. and complex metal soaps made of metal such as Li, Na, Ba and Ca, and non-soaps such as Benton, silica gel, urea compound, urea-urethane compound and urethane compound may be properly selected. Taking into account the heat resistance of the grease composition, however, the urea compound, urea-urethane compound, urethane compound or mixture thereof is preferably used. Specific examples of the urea compound, urea-urethane compound and urethane compound include diurea compound, triurea compound, tetraurea compound, polyurea compound, urea-urethane compound, diurethane compound and mixture thereof. Preferred among these compounds are diurea compound, urea-urethane compound, diurethane compound and mixture thereof. Taking into account the heat resistance and acoustic properties, the diurea compound is more preferably used. In order to further improve the high temperature stability of the grease composition, the diurea compound represented by any of the following general formulae (1) to (3) may be used.

(a) General formula (1)

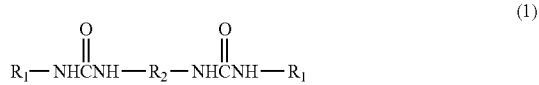

(b) General formula (2)

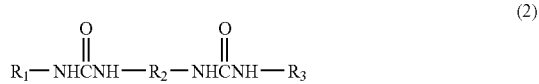

(c) General formula (3)

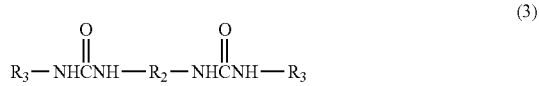

wherein $R_1$ represents a $C_7$-$C_{12}$ aromatic ring-containing hydrocarbon group; $R_2$ represents a $C_6$-$C_{15}$ divalent aromatic ring-containing hydrocarbon group; and $R_3$ represents a cylohexyl group or $C_7$-$C_{12}$ alkylcyclohexyl group. In particular, the diurea compound having [number of mols of $R_1$/(number of mols of $R_1$+number of mols of $R_3$)] ratio of from 0 to 0.55 among the diurea compounds represented by the general formulae (1) to (3) is preferably used.

In the case where as the base oil there is used a fluorine-based oil such as perfluoropolyether (PFPE), a fluororesin such as polytetrafluoroethylene (PTFE) is preferably incorporated in the grease composition as a thickening agent.

(Content)

The content of the thickening agent in the grease composition is not specifically limited so far as the gel structure can be maintain together with the aforementioned oil base. However, since carbon black which can be used as an electrically-conductive material as described later acts as a thickening agent itself, the sum of the amount of carbon black and thickening agent is predetermined to be from 5% to 40% by weight, preferably from 8% to 30% by weight based on the total amount of the grease composition if carbon black is selected as an electrically-conductive material. In this case, too, the added amount of carbon black is predetermined to fall within a predetermined range which is appropriate for electrically-conductive material as described later.

[Electrically-conductive Material]

The electrically-conductive material to be used in the invention is not specifically limited so far as its electrical conductivity is good enough. The electrically-conductive material may be either liquid or solid. In particular, carbon black is preferably used because it can be easily handled and causes no deterioration of lubricating properties. Further, carbon black having an average particle diameter of from about 10 nm to 300 nm is preferably selected tanking into account the dispersibility in the grease composition or acoustic properties.

Figure 24:
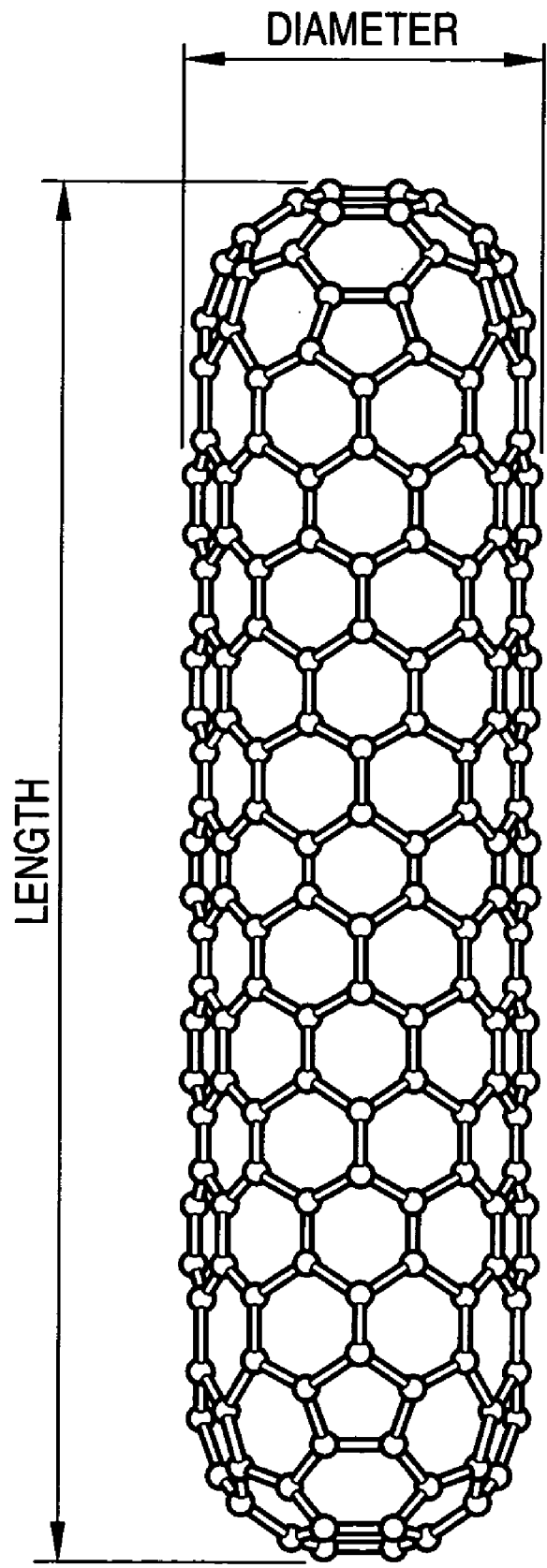
FIG. 24 is a diagram illustrating carbon nanotube.

As the electrically-conductive material there is preferably used carbon nanotube as well. The carbon nanotube is a polyhedral carbon material having a tubular form closed at both ends thereof obtained by rounding mainly the network structure of 6-membered carbon ring as typically shown in FIG. 24. At the junction of tubes having different diameters or closed end, there may be a 5-membered carbon ring or 7-membered carbon ring. Some carbon nanotubues may have a spherical structure. For example, $C_{60}$ and $C_{70}$ are known as flurene. In the present mode, flurene may be used. These carbon nanotubes preferably have a diameter of from 0.5 nm to 15 nm and a length of from 0.5 μm to 50 μm.

(Concentration)

The preferred added amount of the electrically-conductive material is from 0.1% to 10% by weight based on the total amount of the grease composition. When the added amount of the electrically-conductive material falls below 0.1% by weight, a sufficient electrical conductivity cannot be provided, causing flaking accompanying the white structure change. On the contrary, when the added amount of the electrically-conductive material exceeds 10% by weight, the resulting grease hardens, making it likely that the seizing life can be reduced to disadvantage. In order to assure the electrical conductivity so that no such flaking can occur and the seizing life can be enhanced, the electrically-conductive material is preferably incorporated in an amount of from 0.5% to 5% by weight based on the total amount of the grease composition. The worked penetration of the grease to which the electrically-conductive material has been added is preferably from Nos. 1 to 3 of NLGI.

[Other Additives]

In order to further enhance the lubricating properties, the grease composition may comprise various additives such as oxidation inhibitor, extreme pressure agent, oiliness agent, rust preventive, metal deactivator and viscosity index improver incorporated therein singly or in proper combination. As these additives there may be used any known materials. The added amount of these additives is not specifically limited. In practice, however, these additives are added in a total amount of not greater than 20% by weight based on the total amount of the grease composition.

[Preparation Method]

The method for the preparation of the aforementioned grease composition is not specifically limited. In practice, however, the grease composition is obtained by reacting a thickening agent in a base oil. The electrically-conductive material is preferably added to the grease composition in a predetermined amount. However, it is necessary that the mixture of the grease composition and the electrically-conductive material be thoroughly stirred to make uniform dispersion. This procedure is preferably effected under heating. In the aforementioned preparation method, other additives such as oxidation inhibitor and rust preventive are preferably added at the same time with the electrically-conductive material from the standpoint of process efficiency.

(2) Second Grease Composition

The second grease composition is substantially free of sulfonate which acts as a source of hydrogen brittle flaking. It is known that a sulfonate can be detected by Epton method. In this method, Epton method is used to confirm the presence or absence of sulfonate.

[Base Oil and Thickening Agent]

As the base oil and thickening agent there may be used the base oil and thickening agent which are used in the first grease composition. However, the kinetic viscosity of the base oil is preferably from 50 to 600 mm$^2$/sec, more preferably from 70 to 500 mm$^2$/sec, even more preferably from 100 to 450 mm$^2$/sec at 40° C. The content of the thickening agent is preferably from 10 to 35% by weight based on the total amount of the grease composition.

[Additives]

As additives there are preferably added the following napthenates or succinic acid derivatives.

(Naphthenate)

The naphthenate to be used in the invention is not specifically limited so far as it is a saturated carboxylate having naphthene nucleus. Main examples of the saturated carboxylate include saturated monocyclic carboxylate $C_nH_{2n}$-COOM, saturated heterocyclic carboxylate $C_nH_{2n-3}$COCM, aliphatic carboxylate $C_nH_{2n+1}$COOM, and derivative thereof. Examples of the monocyclic carboxylate include the following compounds.

In the foregoing general formulae, $R_4$ represents a hydrocarbon group such as alkyl group, alkenyl group, aryl group, alkaryl group and aralkyl group. M represents a metal element such as Co, Mn, Zn, Al, Ca, Ba, Li, Mg and Cu. These naphthenates may be used singly or in proper combination.

(Succinic Acid Derivative)

Specific examples of the succinic acid derivative include the following compounds. Examples of the succinic acid derivative include succinic acid, alkylsuccinic acid, alkylsuccinic acid half ester, alkenylsuccinic acid, alkenylsuccinic acid half ester, and succinic acid imide. These succinic acid derivatives may be used singly or in proper combination.

The aforementioned naphthenates and succinic acid derivatives may be each used singly or in combination. The added amount of these components is preferably from 0.1% to 10% by weight based on the total amount of the grease composition regardless of which they are used singly or in combination. When the added amount of these components falls below the above defined range, a sufficient rust preventing effect cannot be exerted. On the contrary, when the added amount of these components exceeds the above defined range, the resulting grease composition softens and thus can leak to disadvantage. In the case where a desired rust preventing effect can be assured and the expiration of seizing life due to grease leakage is considered, the added amount of these components is preferably from 0.25% to 5% by weight based on the total amount of the grease composition. More preferably, a naphthenate and a succinic acid derivative are used in combination.

In order to further enhance the flaking resistance, the following organic metal salt is more preferably added.

(Organic Metal Salt)

As organic metal salts there are preferably used dialkyldithiocarbaminate (DTC)-based compound represented by the following general formula (4) and dialkyldithiophosphate (DTP)-based compound represented by the following general formula (5).

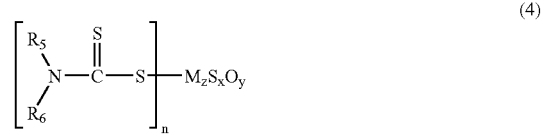

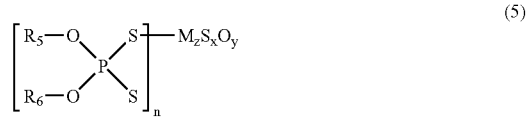

n = 2, 3, 4    x, y, z = 0, 1, 2, 3, 4

In the foregoing general formulae, M represents a metal seed. Specific examples of the metal seed include Sb, Bi, Sn, Ni, Te, Se, Fe, Cu, Mo, and Zn. $R_5$ and $R_6$ may be the same or different and each represent an alkyl group, cycloalkyl group, alkenyl group, aryl group, alkylaryl group or arylalkyl group. Particularly preferred examples of these groups include 1,1,3,3-tetramethylbutyl group, 1,1,3,3-tetramethylhexyl group, 1,1,3-trimethylhexyl group, 1,3-dimethylbutyl group, 1-methylundecane group, 1-methylhexyl group, 1-methylpentyl group, 2-ethylbutyl group, 2-ethylhexyl group, 2-methylcyclohexyl group, 3-heptyl group, 4-methylcyclohexyl group, n-butyl group, isobutyl group, isopropyl group, isoheptyl group, isopentyl group, undecyl group, eicosil group, ethyl group, octadecyl group, octyl group, cyclooctyl group, cyclododecyl group, cyclopentyl group, dimethylcyclohexyl group, decyl group, tetradecyl group, docosyl group, dodecyl group, tridecyl group, trimethylcyclohexyl group, nonyl group, propyl group, hexadecyl group, hexyl group, henicosyl group, heptadecyl group, heptyl group, pentadecyl group, pentyl group, methyl group, tertiary butylcyclohexyl group, tertiary butyl group, 2-hexenyl group, 2-metharyl group, allyl group, undecenyl group, oleyl group, decenyl group, vinyl group, butenyl group, hexenyl group, heptadecenyl group, tolyl group, ethylphenyl group, isopropylphenyl group, tertiary butylphenyl group, secondary pentylphenyl group, n-hexylphenyl group, tertiary octylphenyl group, isononylphenyl group, n-dodecylphenyl group, phenyl group, benzyl group, 1-phenylmethyl group, 2-phenylethyl group, 3-phenylpropyl group, 1,1-dimethylbenzyl group, 2-phenylisopropyl group, 3-phenylhexyl group, benzhydryl group, and biphenyl group. These groups may have an ether bond.

As other organic metal salts there may be used organic zinc compounds represented by the following general formulae (6) to (8).

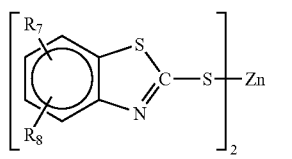

(6)

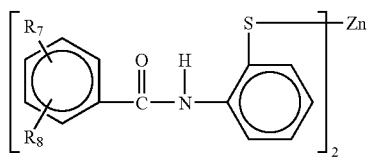

(7)

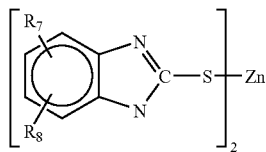

(8)

wherein $R_7$ and $R_8$ may be the same or different and each represent a hydrogen atom or a hydrocarbon group having from 1 to 18 carbon atoms (Cn: 1 to 18). In particular, methylcaptobenzothiazole zinc (general formula (6)), benzamidethiophenol zinc (general formula (7)) and mercaptobenzimidazole zinc (general formula (8)) wherein $R_7$ and $R_8$ are a hydrogen atom altogether are preferably used.

As a further organic metal salt there may be used zinc alkylxzanthogenate represented by the following general formula (9).

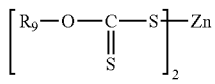

(9)

wherein $R_9$ represents a hydrocarbon group having from 1 to 18 carbon atoms (Cn: 1 to 18).

The organic metal salts represented by the general formulae (4) to (9) may be used singly or in admixture of two or more thereof. However, the combination of these organic metal salts is not specifically limited. The organic metal salt exerts an effect of forming a reactive film in a minute gap to inhibit flaking due to white structure change. When the added amount of these organic metal salts falls below 0.1% by weight, such an effect cannot be exerted sufficiently. On the other hand, it is not considered necessary to define the upper limit of the added amount of the organic metal salts. However, since the aforementioned organic metal salts are relatively expensive and the excessive addition of the organic metal salts abnormally accelerates the reaction with the bearing material, deteriorating seizing resistance, the added amount of the organic metal salts is preferably predetermined to be from 0.1% to 10% by weight, more preferably from 0.5% to 10% by weight. Most preferably, three components, i.e., naphthenate, succinic acid derivative and organic metal salt are used in combination.

Further, the aforementioned naphthenate, succinic acid salt or organic metal salt may be used in proper combination with the additives exemplified as other additives with reference to the first grease composition.

[Preparation Method]

The preparation of the grease composition can be carried out according to the method for the preparation of the first grease composition. In some detail, a thickening agent is reacted in a base oil. To the grease composition thus obtained is then added the aforementioned additives in a predetermined amount. The mixture is then thoroughly stirred using a kneader, roll mill or the like optionally under heating to make uniform dispersion.

When the rolling bearing comprising the grease according to the mode 6 is used with, e.g., fuel cell system, white structure flaking due to hydrogen present in the rolling bearing incorporated in the compressor for force-feeding various fluids between machines can be inhibited to enhance the durability of the rolling bearing.

The urea grease may be in the form described below (hereinafter referred to as "mode 7"). The mode 7 will be described hereinafter.

[Base Oil]

Examples of the base oil to be incorporated in the grease include synthetic hydrocarbon oil, ester-based synthetic oil and ether-based synthetic oil. These base oils are used singly or in admixture. Specific preferred examples of the hydrocarbon-based oil include poly-α-olefins such as normal paraffin, isoparaffin, polybutene, polyisobutylene, 1-decene oligomer, 1-decene and ethylene cooligomer, hydrogenation product thereof, alkylbenzenes such as monoalkylbenzene and dialkylbenzene, and aromatic oils such as alkylnaphthalene, e.g., monoalkylbenzene, dialkylnaphthalene, polyalkylnaphthalene. Examples of the ester-based oil include diester oils such as dibutyl sebacate, di-2-ethylhexyl sebacate, dioctyl adipate, diisodecyl adipate, ditridecyl adipate, ditridecyl glutarate and methyl acetyl sinolate, aromatic ester oils such as trioctyl trimellitate, tridecyl trimellitate and tetraoctyl pyromellitate, polyol ester oils such as trimethylolpropane caprylate, trimethylolpropane peralgonate, pentaerythritol-2-ethylhexanoate and pentaerythritol peralgonate, and complex ester oils which are oligo esters of mixed aliphatic acid comprising dibasic acid and monobasic acid with polyvalent alcohol. Examples of the ether-based oil include polyglycols such as polyethylene glycol, polypropylene glycol, polyethylene glycol monoether and polypropylene glycol monoether, and phenyl ether oils such as monoalkyl triphenyl ether, alkyl diphenyl ether, dialkyl diphenyl ether, pentaphenyl ether, tetraphenyl ether, monoalkyl tetraphenyl ether and dialkyl tetraphenyl ether.

These base oils preferably exhibit a kinetic viscosity of from 20 to 400 mm²/sec at 40° C. When the kinetic viscosity of these base oils falls below 20 mm²/sec, the formation of oil film is insufficient. On the contrary, when the kinetic viscosity of these base oils exceeds 400 mm²/sec, much torque or heat generation occurs to disadvantage.

In the present mode, the amount of metal ions in the grease is reduced as much as possible to further eliminate the effect on the stack of fuel cells even when the grease is scattered. The inhibition of the scattering of the grease itself is more advantageous. Therefore, the vapor pressure of the base oil is more preferably not higher than $1.3 \times 10^{-1}$ Pa at 25° C.

The base oil may further comprise a mineral oil incorporated therein so far as there are no effects on the aforementioned viscosity or vapor pressure. The mineral oil is preferably subjected to vacuum distillation, solvent deasphalting, solvent extraction, hydrogenation decomposition, solvent dewaxing, sulfuric acid washing, clay purification, hydrogenation purification, etc. in proper combination before use.

[Thickening Agent]

In the present mode, as the thickening agent there is used a urea compound. Unlike the metal soap-based thickening agent, the urea compound contains no metal elements in its molecule and thus cannot act as a catalyst poison even when the grease is scattered and attached to the stack of fuel cells. The kind of the urea compound to be used in the invention is not limited. Examples of the urea compound employable herein include diurea compound, triurea compound, tetraurea compound, and polyurea compound. Preferred among these urea compounds is diurea compound. These urea compounds may contain elements other than metal elements or substituents free of metal elements.

The content of the urea compound is from 8% to 40% by weight, preferably from 15% to 40% by weight based on the total amount of the grease. When the content of the urea compound falls below 8% by weight, a sufficient thickening effect cannot be exerted, causing the leakage of grease and hence raising the scattered amount of grease. On the contrary, when the content of the urea compound exceeds 40% by weight, the resulting grease exhibits a poor fluidity that causes seizing.

[Additives]

In order to further enhance lubricating properties, etc., the grease composition may comprise various additives incorporated therein singly or in proper combination. However, since the additives containing metal elements can act as a catalyst poison when the grease is scattered and attached to the stack of fuel cells, additives free of metal elements are used in the present mode. Even additives free of metal elements are synthesized in the presence of a metal catalyst and thus can have the metal catalyst left therein as an unavoidable impurity. In the invention, the incorporation of metal elements as unavoidable impurities is tolerated. The total content of metal elements is preferably not greater than 0.1 ppm based on the total amount of the grease. Additives free of sulfur, chlorine and phosphorus besides metal elements are also preferred.

Exemplifying these additives free of metal elements by their kind, there are oxidation inhibitors such as amine-based or phenol-based oxidation inhibitors, rust preventives such as carboxylic acid, e.g., succinic acid, and derivative thereof and nonionic surface active agents, e.g., sorbitan, oiliness agents such as long-chain aliphatic acid-based oiliness agent, and metal deactivators such as benzotriazole-based metal deactivator.

The total content of the additives free of metal elements is preferably from 0.1% to 4% by weight based on the total amount of the grease. When the content of the additives free of metal elements falls below 0.1% by weight, the effect of the additives cannot be exerted. On the contrary, when the content of the additives free of metal elements exceeds 4% by weight, the scattered amount of the additives is extremely great and the relative amount of the base oil is reduced, causing the deterioration of lubricating properties, particularly when the content of the thickening agent is small. In order to reduce as much as possible the scattered amount of the additives also when the content of the thickening agent is at the lower limit, the content of the additives free of metal elements is preferably from 0.1% to 1% by weight based on the total amount of the grease.

[Preparation Method]

The method for the preparation of the aforementioned grease is not specifically limited. In practice, however, the grease is obtained by reacting a thickening agent in a base oil. The kneading of these components can be carried out using a kneader, roll mill or the like. The additives may be added during kneading.

When used as, e.g., a rolling bearing for fuel cell to be incorporated in the compressor for fuel cell system, the rolling bearing comprising the grease according to the mode 7 causes little scattering of grease. Even when the grease is scattered and attached to the stack of fuel cells, the fuel cells can continue to make stable operation without dropping the reaction efficiency.

The grease may have an initial worked penetration which is predetermined as described below (hereinafter referred to as "mode 8"). The mode 8 will be further described hereinafter.

[Base Oil]

The base oil to be used in the invention is not specifically limited. All oils which are normally used as base oil for lubricants can be used. The base oil preferably exhibits a kinetic viscosity of from 10 to 400 $m^2/s$, more preferably from 20 to 250 $mm^2/s$, particularly from 40 to 150 $mm^2/s$ at 40° C. to avoid the occurrence of unusual noise during low temperature starting due to lack of low temperature fluidity or the occurrence of seizing due to difficulty in forming oil film at high temperature.

In order to avoid the worsening of dusting due to evaporation of base oil, the base oil preferably exhibits a vapor pressure of not higher than $1.3 \times 10^{-1}$ Pa at 25° C.

In some detail, a mineral oil-based, synthetic oil-based or natural oil-based lubricant may be used. As the mineral oil-based lubricant there may be used one obtained by subjecting a mineral oil to purification by vacuum distillation, solvent deasphalting, solvent extraction, hydrogenation decomposition, solvent dewaxing, sulfuric acid washing, clay purification, hydrogenation purification, etc. in proper combination. As the synthetic oil-based lubricant there may be used a hydrocarbon-based oil, aromatic oil, ester-based oil, ether-based oil or the like. Examples of the hydrocarbon-based oil include poly-α-olefins such as normal paraffin, isoparaffin, polybutene, polyisobutylene, 1-decene oligomer, 1-decene and ethylene cooligomer, and hydrogenation product thereof. Examples of the aromatic oil include alkylbenzenes such as monoalkylbenzene and dialkylbenzene, and alkylnaphthalenes such as monoalkylnaphthalene, dialkylnaphthalene and polyalkylnaphthalene. Examples of the ester-based oil include diester oils such as dibutyl sebacate, di-2-ethylhexyl sebacate, dioctyl adipate, diisodecyl adipate, ditridecyl adipate, ditridecyl glutarate and methyl acetyl sinolate, aromatic ester oils such as trioctyl trimellitate, tridecyl trimellitate and tetraoctyl pyromellitate, polyol ester oils such as trimethylolpropane caprylate, trimethylolpropane peralgonate, pentaerythritol-2-ethylhexanoate and pentaerythritol peralgonate, and complex ester oils which are oligo esters of mixed aliphatic acid comprising dibasic acid and monobasic acid with polyvalent alcohol. Examples of the ether-based oil include polyglycols such as polyethylene glycol, polypropylene glycol, polyethylene glycol monoether and polypropylene glycol monoether, and phenyl ether oils such as monoalkyl triphenyl ether, alkyl diphenyl ether, dialkyl diphenyl ether, pentaphenyl ether, tetraphenyl ether, monoalkyl tetraphenyl ether and dialkyl tetraphenyl ether. Examples of other synthetic lubricant base oils include tricresyl phosphate, silicone oil, perfluoroalkylether, and perfluoropolyether (PFPE). Examples of the natural oil-based lubricant oils include fat oils such as beef tallow, lard, soybean oil, colza oil, rice bran oil, coconut oil, palm oil and palm nucleus oil, and hydrogenation product thereof. These base oils may be used singly or in admixture. These base oils are adjusted to the aforementioned preferred kinetic viscosity.

[Thickening Agent]

The thickening agent to be used in the invention is not specifically limited so far as it is capable of forming a gel structure and retaining a base oil in the gel structure and satisfies the requirements that the initial worked penetration at 25° C. be from 150 to 240. In practice, however, metal soaps, metal complex soaps and urea compounds are preferably used. The initial worked penetration is worked penetration defined in JIS K2220 (5.3).

Examples of the metal soaps employable herein include metal soaps made of Li, Na, etc. Examples of the metal complex soaps employable herein include complex metal soaps made of metal such as Li, Na, Ba and Ca. These metal soaps or metal complex soaps are incorporated in an amount of from 20% to 35% by weight, preferably from 22% to 30% by weight based on the total amount of the grease.

Examples of the urea compound employable herein include diurea compound, triurea compound, tetraurea compound, polyurea compound, urea-urethane compound, diurethane compound and mixture thereof. Preferred among these compounds is diurea compound. The urea compound is incorporated in an amount of from 15% to 40% by weight, preferably from 18% to 33% by weight based on the total amount of the grease.

[Additives]

In order to further enhance the lubricating properties, etc. of the grease, the grease may comprise various additives such as oxidation inhibitor, rust preventive, metal deactivator, oiliness agent, extreme pressure agent and abrasion inhibitor incorporated therein singly or in proper combination as necessary. However, since additives containing metal elements can be a dusting source, additives free of metal elements need to be selected except those containing metal elements as unavoidable impurities. The total added amount of these additives is preferably not greater than 0.1 to 4% by weight based on the total amount of the grease.

[Preparation Method]

The method for the preparation of the aforementioned grease is not specifically limited. In practice, however, the grease is obtained by reacting a thickening agent in a base oil. The kneading of these components can be carried out using a kneader, roll mill or the like. The additives may be added during kneading.

The rolling bearing comprising the grease according to the mode 8 can cause less dusting and thus can be used as, e.g., rolling bearing for fuel cell to be incorporated in the compressor for fuel cell system.

The grease may comprise the following specific additives incorporated therein (hereinafter referred to as "mode 9"). The mode 9 will be further described hereinafter.

(Grease Composition)

The kind of the base oil to be incorporated in the grease composition according to the present mode is not limited. A mineral oil-based, synthetic oil-based or natural oil-based lubricant which has heretofore been used as a base oil for grease composition may be used. As the mineral oil-based lubricant there may be used one obtained by subjecting a mineral oil to purification by vacuum distillation, solvent deasphalting, solvent extraction, hydrogenation decomposition, solvent dewaxing, sulfuric acid washing, clay purification, hydrogenation purification, etc. in proper combination. As the synthetic oil-based lubricant there may be used a hydrocarbon-based oil, aromatic oil, ester-based oil, ether-based oil or the like. Examples of the hydrocarbon-based oil include poly-α-olefins such as normal paraffin, isoparaffin, polybutene, polyisobutylene, 1-decene oligomer, 1-decene and ethylene cooligomer, and hydrogenation product thereof. Examples of the aromatic oil include alkylbenzenes such as monoalkylbenzene and dialkylbenzene, and alkylnaphthalenes such as monoalkylnaphthalene, dialkylnaphthalene and polyalkylnaphthalene. Examples of the ester-based oil include diester oils such as dibutyl sebacate, di-2-ethylhexyl sebacate, dioctyl adipate, diisodecyl adipate, ditridecyl adipate, ditridecyl glutarate and methyl acetyl sinolate, aromatic ester oils such as trioctyl trimellitate, tridecyl trimellitate and tetraoctyl pyromellitate, polyol ester oils such as trimethylolpropane caprylate, trimethylolpropane peralgonate, pentaerythritol-2-ethylhexanoate and pentaerythritol peralgonate, and complex ester oils which are oligo esters of mixed aliphatic acid comprising dibasic acid and monobasic acid with polyvalent alcohol. Examples of the ether-based oil include polyalkylene glycols such as polyethylene glycol, polypropylene glycol, polyethylene glycol monoether and polypropylene glycol monoether, and phenyl ether oils such as monoalkyl triphenyl ether, alkyl diphenyl ether, dialkyl diphenyl ether, pentaphenyl ether, tetraphenyl ether, monoalkyl tetraphenyl ether and dialkyl tetraphenyl ether. Examples of other synthetic lubricant oils include tricresyl phosphate, silicone oil, and perfluoroalkylether. Examples of the natural oil-based lubricant oils include fat oils such as beef tallow, lard, soybean oil, colza oil, rice bran oil, coconut oil, palm oil and palm nucleus oil, and hydrogenation product thereof. Preferred among these base oils are ester-based oils and ether-based oils because they are excellent in both heat resistance and low temperature fluidity. Particularly preferred among these ester-based oils and ether-based oils are aromatic ester oils and polyol ester oils because they are more excellent in heat resistance.

In order to avoid lack of low temperature fluidity or the occurrence of seizing due to difficulty in forming oil film at high temperatures, the base oil preferably exhibits a kinetic viscosity of from 10 to 400 mm$^2$/sec, preferably from 20 to 250 mm$^2$/sec, more preferably from 40 to 150 mm$^2$/sec at 40° C. This is important particularly from the standpoint of prevention of the occurrence of unusual noise at low temperature starting in fuel cell system for automobile.

The thickening agent is not specifically limited. Metal soaps or metal complex soaps made of Li, Na, Ba, Ca, Al or the like as a metal seed or urea compounds may be used. However, a simple metal soap-based thickening agent such as lithium soap has a water absorption that causes the grease composition to contain water content, making it likely that the bearing can be rusted or the grease can become liquid. The urea compounds are particularly preferred because they are excellent in heat resistance and water resistance. Examples of the urea compounds employable herein include diurea compound, triurea compound, tetraurea compound, polyurea compound, and mixture thereof.

The mixing ratio of the thickening agent is not limited so far as the thickening agent can provide and keep the grease aspect together with the aforementioned base oil but is normally from 5% to 40% by weight, preferably from 10% to 30% by weight based on the total amount of the grease composition. When the amount of the thickening agent falls below 5% by weight, the grease aspect cannot be formed. On the contrary, when the amount of the thickening agent exceeds 40% by weight, the resulting grease composition becomes too hard.

The grease composition according to the present mode comprises at least one selected from the group consisting of benzotriazole or derivative thereof, indazole or derivative thereof, benzothiazole or derivative thereof, benzoxazole or derivative thereof, benzimidazole or derivative thereof, and thiadiazole or derivative thereof and at least one selected from the group consisting of metal dithiophosphate and metal dithiocarbamate incorporated in the aforementioned base oil and thickening agent.

The benzotriazole derivative, indazole derivative, benzothiazole derivative, benzoxazole derivative, benzimidazole derivative and thiadiazole derivative are represented by the following chemical formulae, respectively.

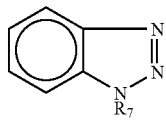

Benzotriazole derivative

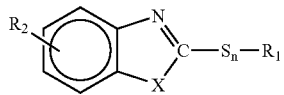

Benzothiazole derivative (X = S)
Benzoxazole derivative (X = O)

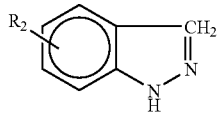

Indazole derivative

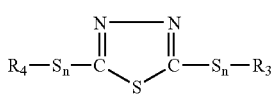

Thiadiazole derivative

-continued

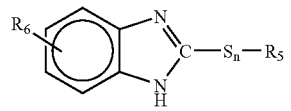

Benzimidazole derivative

In these chemical formulae, n represents an integer of 1 or 2. R, $R_1$, $R_2$, $R_3$, $R_4$, $R_5$, $R_6$ and $R_7$ each represent a hydrogen atom or a $C_1$-$C_{24}$ alkyl group which may have other functional groups. A plurality of R's, $R_2$'s and $R_6$'s may be incorporated in the benzene ring. In this case, these R's, $R_2$'s and $R_6$'s may be the same or different. $R_1$ and $R_2$, $R_3$ and $R_4$, and $R_5$ and $R_6$ may be the same or different in the respective pair. The benzene ring in the molecule may be other aromatic compound such as naphthalene.

All these compounds act to deactivate the surface of metal and hereinafter will be occasionally referred to as "metal deactivator". As described below, benzotriazole produces coordinate bond between nitrogen atom and metal (Cu) in the skeleton to form a surface film having a high adhesion that effectively inhibits the contact of metal with water content. In order to secure such a surface film, the added amount of the metal deactivator needs to be not smaller than 0.2% by weight, preferably not smaller than 0.5% by weight based on the total amount of the grease composition. The upper limit of the added amount of the metal deactivator is 2% by weight based on the total amount of the grease composition. When the metal deactivator is added in an amount greater than the upper limit, the rust preventing effect cannot be further enhanced. On the contrary, the total amount of metal dithiophosphate and metal dithiocarbamate is excessive, causing the reduction of seizing life.

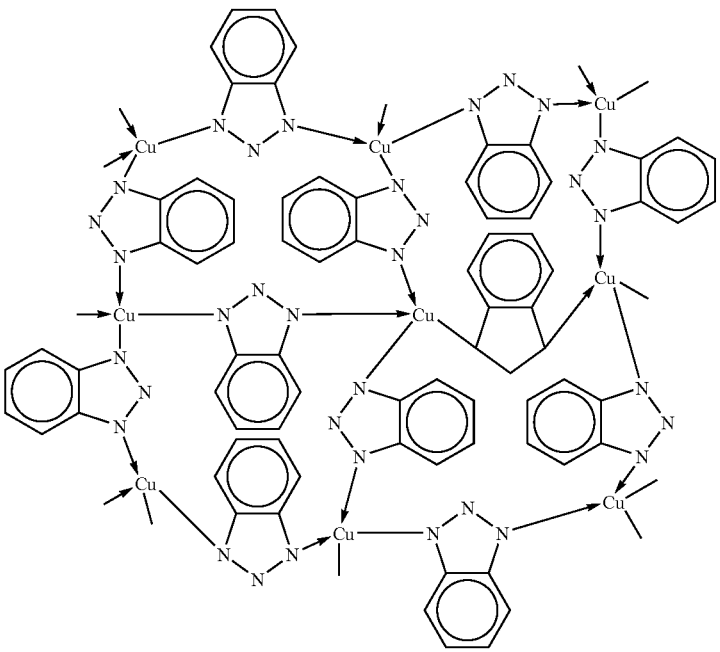

Examples of the metal seed of metal dithiophosphate and metal dithiocarbamate include molybdenum, zinc, antimony, selenium, bismuth, iron, copper, and lead. These metal deactivators are known as extreme pressure agents. The grease composition according to the present mode exhibits a better abrasion resistance when used in combination with the aforementioned metal deactivators. The aforementioned metal deactivators have a benzene ring or a cyclic structure containing atoms having an unshared electron pair such as N and S in its skeleton and thus have a high electron density. On the other hand, the metal atoms contained in the metal dithiophosphate and metal dithiocarbamate are slightly positively polarized and thus can be easily attracted by high density electron group in the metal deactivator. Since the metal deactivator forms a coordinate bond with the surface of metal, the attraction of dithiophosphate and metal dithiocarbamate to the metal deactivator results in the activation of the reaction with the surface of metal. In other words, the interaction of the metal deactivator with dithiophosphate and metal dithiocarbamate makes it possible to provide further abrasion resistance as compared with the single use of dithiophosphate and metal dithiocarbamate. In order to effectively exert the interaction with the metal deactivator, the added amount of metal dithiophosphate and metal dithiocarbamate is predetermined to be from 1% to 10% by weight based on the total amount of the grease composition. When the added amount of metal dithiophosphate and metal dithiocarbamate falls below 1% by weight, a sufficient effect of improving abrasion resistance cannot be exerted. On the contrary, when the added amount of metal dithiophosphate and metal dithiocarbamate exceeds 10% by weight, the total amount of these compounds and metal deactivators becomes excessive, reducing the seizing life.

The grease composition according to the present mode may further comprises other additives incorporated therein as necessary to further enhance lubricating properties, etc. For example, amine-based, phehol-based and sulfur-based oxidation inhibitors, and oiliness agents such as aliphatic acid and animal and vegetable oils may be used singly or in combination of two or more thereof. The added amount of these additives is not specifically limited so far as the desired aim of the invention is accomplished and is properly predetermined.

The rolling bearing comprising the grease composition according to the mode 9 is provided with excellent, corrosion resistance and abrasion resistance by the grease composition encapsulated therein and thus can be used in an atmosphere where it comes in contact with water content and also for compressor for fuel cell.

The grease composition may comprise the following specific additives incorporated therein (hereinafter referred to as "mode 10"). The mode 10 will be further described hereinafter.

[Grease Composition]

The grease composition according to the present mode comprises a base oil and a thickening agent and further comprises at least one of a basic alkylamine compound, an organic metal salt and an organic acid metal salt incorporated therein. These components will be further described hereinafter.

(Base Oil)

The base oil to be used in the invention is not specifically limited. All oils which are normally used as base oil for lubricants can be used. However, in order to avoid the occurrence of unusual noise during low temperature starting due to lack of low temperature fluidity or the occurrence of seizing due to difficulty in forming oil film at high temperature, there is preferably used a base oil having a kinetic viscosity of from 20 to 400 m$^2$/s at 40° C.

Specific examples of the base oil employable herein include synthetic hydrocarbon oils, ester oils, and ether oils. Examples of the synthetic hydrocarbon oils include poly-α-olefins such as normal paraffin, isoparaffin, polybutene and polyisobutylene, and hydrogenation product thereof, alkylbenzenes such as monoalkylbenzene and dialkylbenzene, and alkylnaphthalenes such as monoalkylbenzene and dialkylnaphthalene. Examples of the ester-based oils include diester oils such as dibutyl sebacate, di-2-ethylhexyl sebacate, dioctyl adipate, diisodecyl adipate, ditridecyl adipate, ditridecyl glutarate and methyl acetyl sinolate, aromatic ester oils such as trioctyl trimellitate, tridecyl trimellitate and tetraoctyl pyromellitate, polyol ester oils such as trimethylolpropane caprylate, trimethylolpropane peralgonate, pentaerythritol-2-ethylhexanoate and pentaerythritol peralgonate, and complex ester oils which are oligo esters of mixed aliphatic acid comprising dibasic acid and monobasic acid with polyvalent alcohol. Examples of the ether-based oil include polyglycols such as polyethylene glycol, polypropylene glycol, polyethylene glycol monoether and polypropylene glycol monoether, and phenyl ether oils such as monoalkyl triphenyl ether, alkyl diphenyl ether, dialkyl diphenyl ether, pentaphenyl ether, tetraphenyl ether, monoalkyl tetraphenyl ether and dialkyl tetraphenyl ether. These base oils may be used singly or in admixture. These base oils are adjusted to the aforementioned preferred range of kinetic viscosity. Further, taking into account the lubricating properties and lubrication life at high temperatures and speeds, the base oil preferably comprises ester oil or ether oil incorporated therein. Moreover, in the case where the atmosphere has a high water content, the base oil preferably contains a poly-α-olefinic synthetic hydrocarbon oil having a high water repellent effect incorporated therein.

If necessary, the base oil may comprise mineral oil incorporated therein. Examples of the mineral oil include paraffin-based mineral oil, and naphthenic mineral oil. In particular, there is preferably used a mineral oil which has been subjected to vacuum distillation, solvent deasphalting, solvent extraction, hydrogenation decomposition, solvent dewaxing, sulfuric acid washing, clay purification, hydrogenation purification, etc. in proper combination.

(Thickening Agent)

The thickening agent to be used in the invention is not specifically limited so far as it is capable of forming a gel structure and retaining a base oil in the gel structure. For example, metal soaps such as metal soaps made of Li, Na, etc. and complex metal soaps made of metal such as Li, Na, Ba and Ca, and non-soaps such as Benton, silica gel, polytetrafluoroethylene (PTFE), urea compound, urea-urethane compound and urethane compound may be properly selected. Taking into account the heat resistance of the grease composition, however, the urea compound, urea-urethane compound, urethane compound or mixture thereof is preferably used. Particularly preferred among these compounds are diurea compounds, triurea compounds, tetraurea compounds, polyurea compounds and mixture thereof. In particular, a diurea compound represented by the general formula (A) is preferably incorporated in the grease composition.

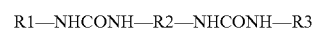 (A)

In the general formula (A), the amine residues (R1, R3) may be the same or different and each represent a cyclohexyl group, $C_7$-$C_{12}$ alkylcylohexyl group or $C_8$-$C_{20}$ alkyl group. The isocyanate residue (R2) represents a hydrocarbon group containing a $C_6$-$C_{15}$ divalent aromatic group.

(Basic Alkylamine, Organic Metal Salt, Organic Acid Metal Salt)

The grease composition according to the present mode comprises at least one of basic alkylamine, organic metal salt and organic acid metal salt incorporated therein to neutralize the acidic material. The content of these components, singly or in admixture, is from 0.1% to 10% by weight, preferably from 0.5% to 5% by weight, particularly from 1% to 5% by weight based on the total amount of the grease. When the content of these components falls below 0.1% by weight, the resulting effect of neutralizing the acidic material cannot be sufficiently exerted. On the contrary, when the content of these components exceeds 10% by weight, the amount of the base oil is relatively reduced, causing the deterioration of the durability of the grease composition. In particular, since the amine is hydrophilic, when the content of the amine exceeds 10% by weight, the resulting grease composition softens and thus exhibits a deteriorated water resistance.

Examples of the basic alkylamine employable herein include alkylamine such as stearyl allylamine, alkylamine represented by the general formula (B), and N-alkylpolyalkylenediamine represented by the general formula (C).

$(R4)_nNH_{3-n}$ (B)

$R5NH(CH_2)_mNH_2$ (C)

In the general formula (B), R4 represents a $C_{12}$-$C_{30}$ straight-chain saturated or unsaturated alkyl group, and n represents an integer of 1 or 2. In the general formula (C), R5 represents a $C_{12}$-$C_{30}$ straight-chain saturated or unsaturated alkyl group; and m represents an integer of from 2 to 5.

Examples of the organic metal salt or organic acid metal salt include various rust preventives such as high basicity carboxylic acid metal salt-based, ester-based, amine-based and surface active agent-based rust preventives. Specific examples of these rust preventives include organic carboxylic acid salts of alkaline metals or alkaline earth metals such as calcium and magnesium, high basicity phenates of these metals, salicylates of these metals, and phosphates of these metals. Alternatively, partial ester of polyvalent alcohols such as alkenylsuccinic acid, succinic acid and sorbitan monooleate, hydroxystearic acid such as oleyl sarcosine, and metal salt of mercaptoaliphatic acids such as 1-mercaptostearic acid may be used. Further, among metal sulfoantes, those showing basicity, e.g., Sulfol Ca-45, Moscoamber SC-45 and Sulfol 1040, produced by MATSUMURA OIL REASERCH CORP., NA-SUL611, NA-SUL BSB and NA-SUL CA-50, produced by King Inc./Kusumoto Chemicals, Ltd. may be used.

(Other Additives)

The grease composition may further comprise various additives incorporated therein as necessary. For example, an oxidation inhibitor, an oiliness agent, an extreme pressure agent and an abrasion inhibitor are preferably added. As these additives there may be used known materials. Examples of the oxidation inhibitor include amine-based compounds such as aliphatic amine and aromatic amine, and phenolic oxidation inhibitors. Examples of the oiliness agent include aliphatic acids such as oleic acid and stearic acid, aliphatic acid alcohols such as oleyl alcohol, aliphatic acid esters such as polyoxystearic acid ester, and phosphoric acid esters such as tricresyl phosphate, lauric acid ester and polyoxyethylene oleyl ether phosphoric acid. Examples of the extreme pressure agent and abrasion inhibitor include dithiocarbaminate of zinc, molybdenum, tellurium, antimony, selenium, iron and copper, complex thereof, dithiophosphate of zinc, molybdenum and antimony, and organic metal compounds such as iron octylate, copper naphthenate, dibutyltin sulfide, phenate and phosphate. These additives may be added singly or in combination of two or more thereof. The added amount of these additives is not specifically limited so far as the desired aim of the invention can be accomplished but is preferably not greater than 20% by weight based on the total amount of the grease composition.

In accordance with the rolling bearing comprising the grease composition according to the mode 10, the grease composition encapsulated therein acts to neutralize an acidic material. Thus, the rolling bearing of the invention can be used as a rolling bearing for fuel cell to be incorporated in the compressor for fuel cell system.

(Compressor for Fuel Cell System)

A compressor for fuel cell system comprising the aforementioned rolling bearing will be described hereinafter. As the compressor for fuel cell system there is normally used an impeller type compressor, scroll type compressor, swash plate compressor or screw type compressor, but the invention is not limited thereto. The invention will be further described with reference to impeller type compressor, scroll type compressor, double swash plate compressor, single swash plate compressor and screw type compressor by way of example.

Figure 4:
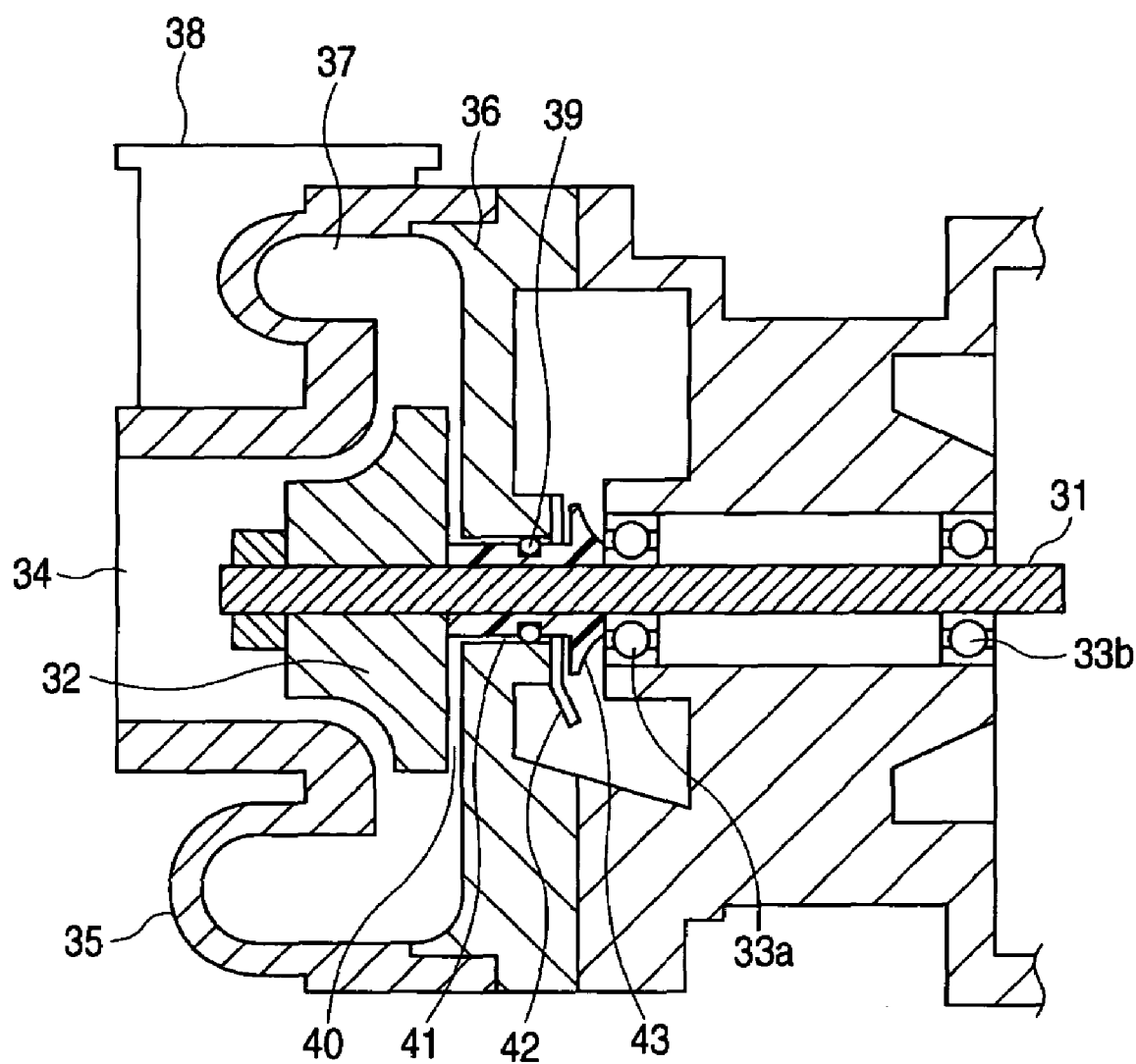
FIG. 4 is a sectional view illustrating an example (impeller type compressor) of the compressor according to an embodiment of implementation of the invention.

An impeller type compressor shown in FIG. 4 comprises an impeller 32 mounted on a rotary shaft 31 which is supported by rolling bearings 33a, 33b described above. As the impeller 32 rotates at a high speed with the high speed rotation of the rotary shaft 31, a gas sucked through a gas suction port 34 is compressed by the centrifugal force of the impeller 32 and then force-fed through a pressure volute defined by a housing 35 and a back plate 36 from a water vapor exhaust port 38. In accordance with this compressor, when the sealing properties of a sealing member 39 deteriorate, a gas can leak from the back space 40 on the back side of the impeller 32 through the gap 41 between the rotary shaft 31 and the sealing member 39 and then reach the rolling bearings 33a, 33b. In order to avoid this trouble, a baffle 42 and a bush 43 are attached to the rotary shaft 31.

Figure 5:
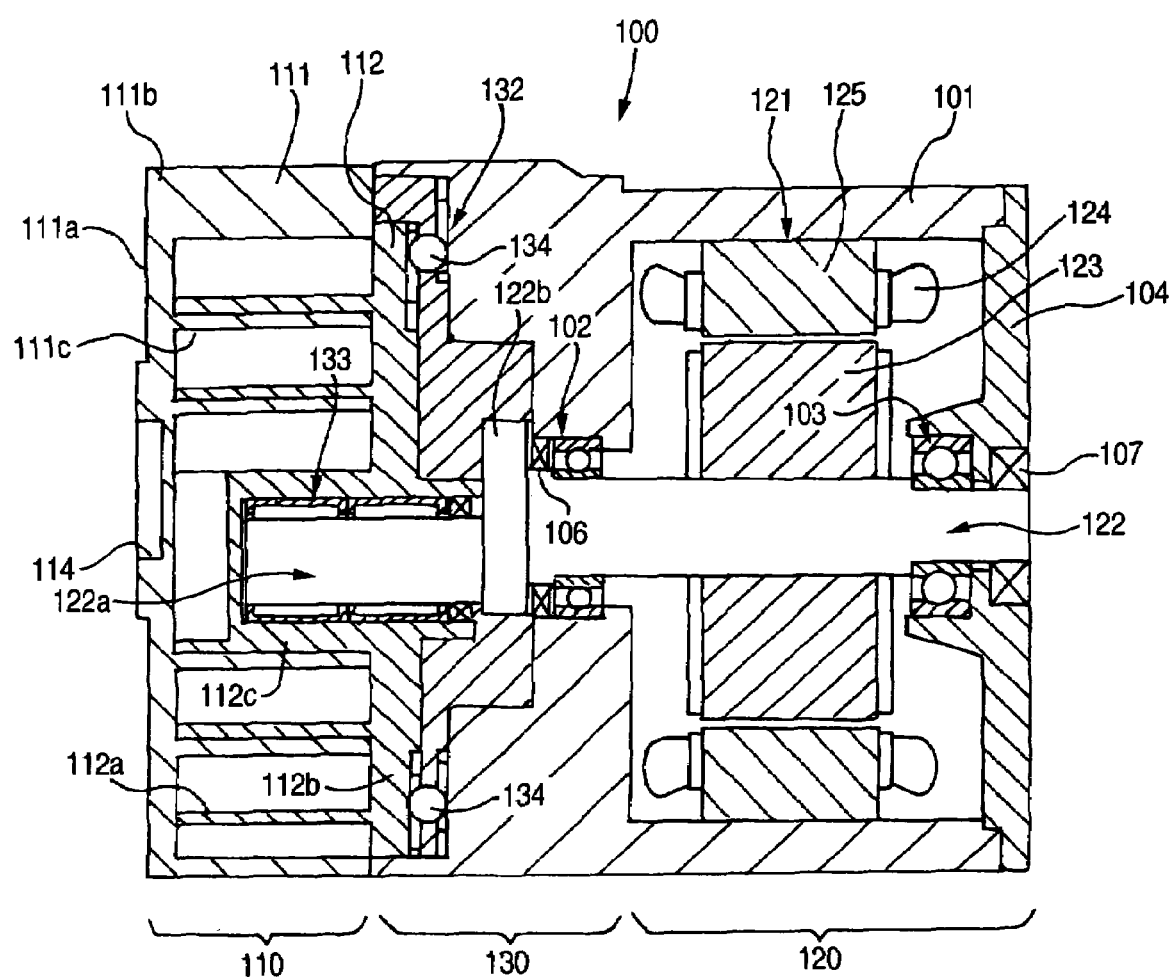
FIG. 5 is a sectional view illustrating an example (scroll type compressor) of the compressor according to an embodiment of implementation of the invention.

FIG. 5 is a sectional view illustrating an example of scroll type compressor. The scroll type compressor 100 shown comprises a compression mechanism portion 110 comprising a fixed scroll 111 and a turning scroll 112, a crank mechanism portion 130 for turning the turning scroll 112 by a crank pin 112a provided eccentrically with respect to a motor main shaft 122, and a driving motor portion 120 for rotating the motor main shaft 122.

The crank mechanism portion 130 comprises a revolution preventive mechanism 132 provided therein for preventing the revolution of the turning scroll 112. As the revolution preventive mechanism 132 there may be used ordam coupling or pin & ring coupling besides a ball coupling 134 shown. As the revolution preventive mechanism 132 there is also known a crank mechanism comprising a rolling bearing as disclosed in JP-A-2002-70762.

The fixed scroll 111 comprises a disc-shaped fixed substrate 111a, a spirally-shaped turning spiral portion 111c provided at right angle on the fixed substrate 111a, and an outer wall 111b covering the turning spiral 111c. The turning scroll 112 comprises a disc-shaped turning substrate 112b, and a spirally-shaped turning spiral portion 112c provided at right angle on the turning substrate 112b. The turning substrate 112b comprises a closed-end cylindrical concave portion 112c provided at the center thereof on the rear side. The fixed substrate 111a comprises a discharge port 114 provided at substantially horizontal central position as viewed on the drawing for discharging air or other gases compressed between the fixed scroll 111 and the turning scroll 112.

The aforementioned needle roller bearing 133 is provided inside the concave 112c as a housing. The needle roller bearing 133 bears the turning scroll 112 rollably with the crank pin 122a of the motor main shaft 122 as a rotary shaft.

In the driving motor portion 120, the driving motor 121 comprises a rotor 123 fixed in the motor main shaft 122 and a stator 125 provided on the periphery of the rotor 123 and having a coil 124 wound thereon. The rotor 123 and the stator 125 are provided in a motor housing 101.

The motor main shaft 122 is rollably supported by the motor housing 101 with the aforementioned rolling bearing 102 and is also rollably supported by a rear housing 104 on its rear side (right side as viewed on the drawing) with the aforementioned rolling bearing 103. The motor main shaft 122 has a seal 106 provided interposed between the motor main shaft 122 and the motor housing 101 on the side of the rolling bearing 102 closer to the crank pin 122a and a seal 107 provided interposed between the motor main shaft 122 and the rear housing 104 on the rear side thereof. The motor main shaft 122 also has a balance weight 122b provided thereon so that a moment of inertia produced during the rotation of the turning scroll 112 can be cancelled to eliminate vibration.

In the operation of the scroll type compressor 100, when the driving motor 121 is energized, the motor main shaft 122 rotates. The rotation is transferred to the turning scroll 112 via the driving crank mechanism 130. As the motor main shaft 122 rotates, the turning scroll 112 rotates while being engaged with the fixed scroll 111. In this manner, various gases are sucked from a suction port (not shown) into the space between the turning scroll 112 and the fixed scroll 111 where they are compressed. The gas thus compressed is then discharged from the discharge port 114.

Figure 6:
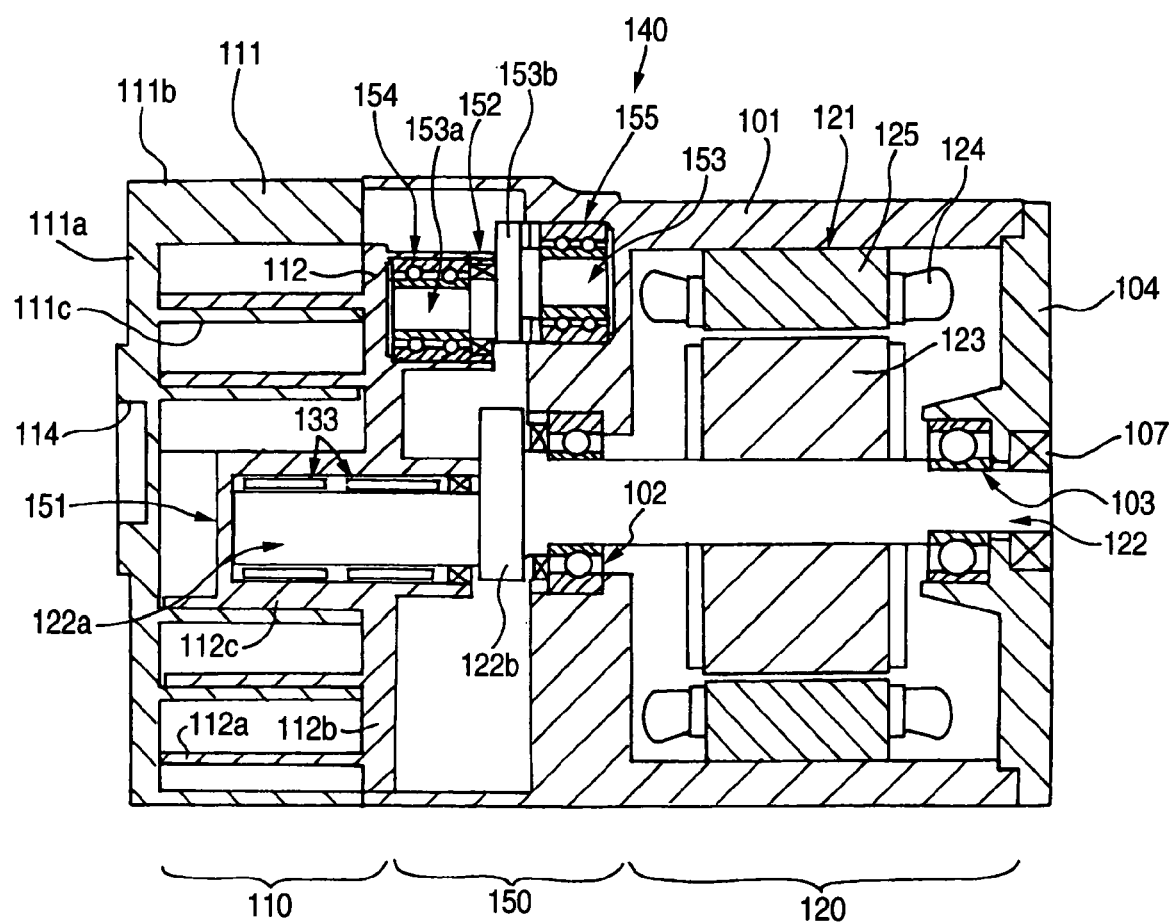
FIG. 6 is a sectional view illustrating another example (scroll type compressor) of the compressor according to an embodiment of implementation of the invention.

As a scroll type compressor there is also known one having a constitution as shown in FIG. 6. In the scroll type compressor 140 shown, a crank mechanism portion 150 comprises a driving crank mechanism 151 for turning a turning scroll 112, and a driven crank mechanism 152 for preventing the revolution of the turning scroll 112.

The driven crank mechanism 152 comprises a concave retaining portion 112c provided on the turning scroll 112, a crank pin 153a provided on the driven crank shaft 153, and a rolling bearing 154 for making the crank pin 153a rollable relative to the turning scroll 112. The driven crank shaft 153 is supported rollably on a motor housing 101 with a rolling bearing 155 on the side thereof opposite the crank pin 153a.

The driven crank shaft 153 also comprises a balance weight 153b provided thereon similarly to the motor main shaft 122 so that a moment of inertia produced during the rotation of the turning scroll 112 can be cancelled to eliminate vibration. Other constitutions and actions are as described with reference to the scroll type compressor 100 shown in FIG. 5. Where the parts are the same as those of FIG. 5, the same numbers are used.

Figure 7:
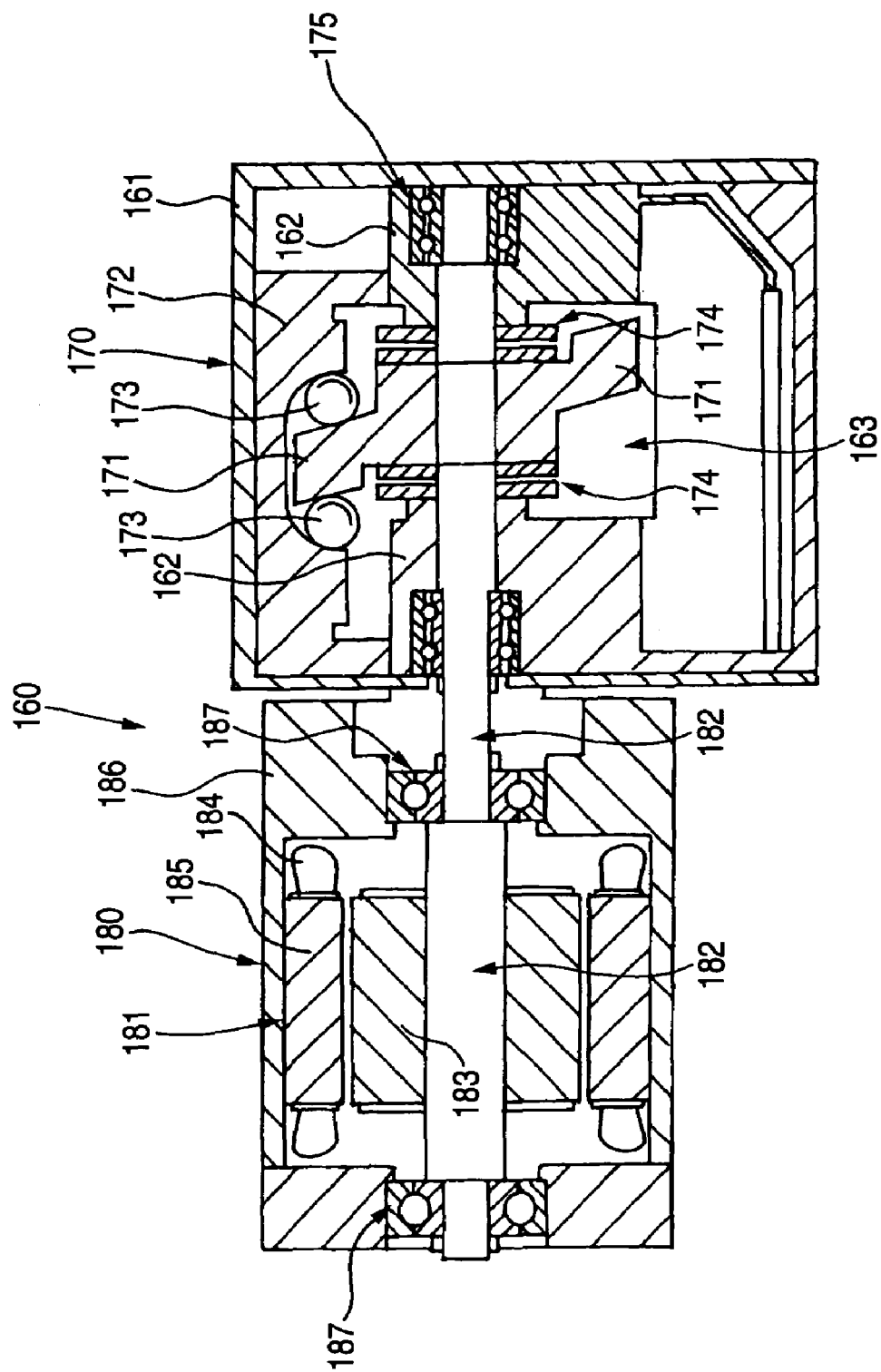
FIG. 7 is a sectional view illustrating other example (double swash type compressor) of the compressor according to an embodiment of implementation of the invention.

FIG. 7 illustrates a double swash plate type compressor 160 which comprises a compression mechanism portion 170 for compressing gas by the reciprocating motion of a double head piston 172 accompanying the rotation of a double swash plate 171 and a driving motor portion 180 for driving the compression mechanism portion 170 by the rotation of the motor main shaft 182 of the driving motor 181.

In the compression mechanism portion 170, the double head piston 172 is arranged in a crank chamber 163 of a cylinder block 161 so as to move back and forth along the axis of the motor main shaft 182 and is connected to the double swash plate 171 via a shoe 173. The double swash 171 is attached to the periphery of the motor main shaft 182 in such an arrangement that it can be rotated integrally with the motor main shaft 182 and is rollably supported by a supporting member 162 provided in the cylinder block 161 with a thrust bearing 174.

In the driving motor portion 180, the driving motor 181 comprises a rotor 183 fitted in the motor main shaft 182 and a stator 185 provided on the periphery of the rotor 183 and having a coil 184 wound thereon in the motor housing 186.

The motor main shaft 182 is rollably supported on the left side of substantially axially center thereof as viewed on the drawing by the motor housing 186 with the aforementioned pair of rolling bearings 187 which are disposed horizontally apart from each other and is rollably supported on the right side of substantially axially center thereof as viewed on the drawing by the supporting member 162 with the aforementioned pair of rolling bearings 175 which are disposed horizontally apart from each other.

In the operation of the double swash plate type compressor 160 having the aforementioned constitution, as the driving motor 181 is energized, the motor main shaft 182 rotates. The rotation is transferred to the double head piston 172 via the double swash plate 171 and the shoe 173. As the double head piston 172 moves in the crank chamber 163 back and forth in the axial direction with the rotation of the motor main shaft 182, a gas is sucked, compressed and discharged.

Figure 8:
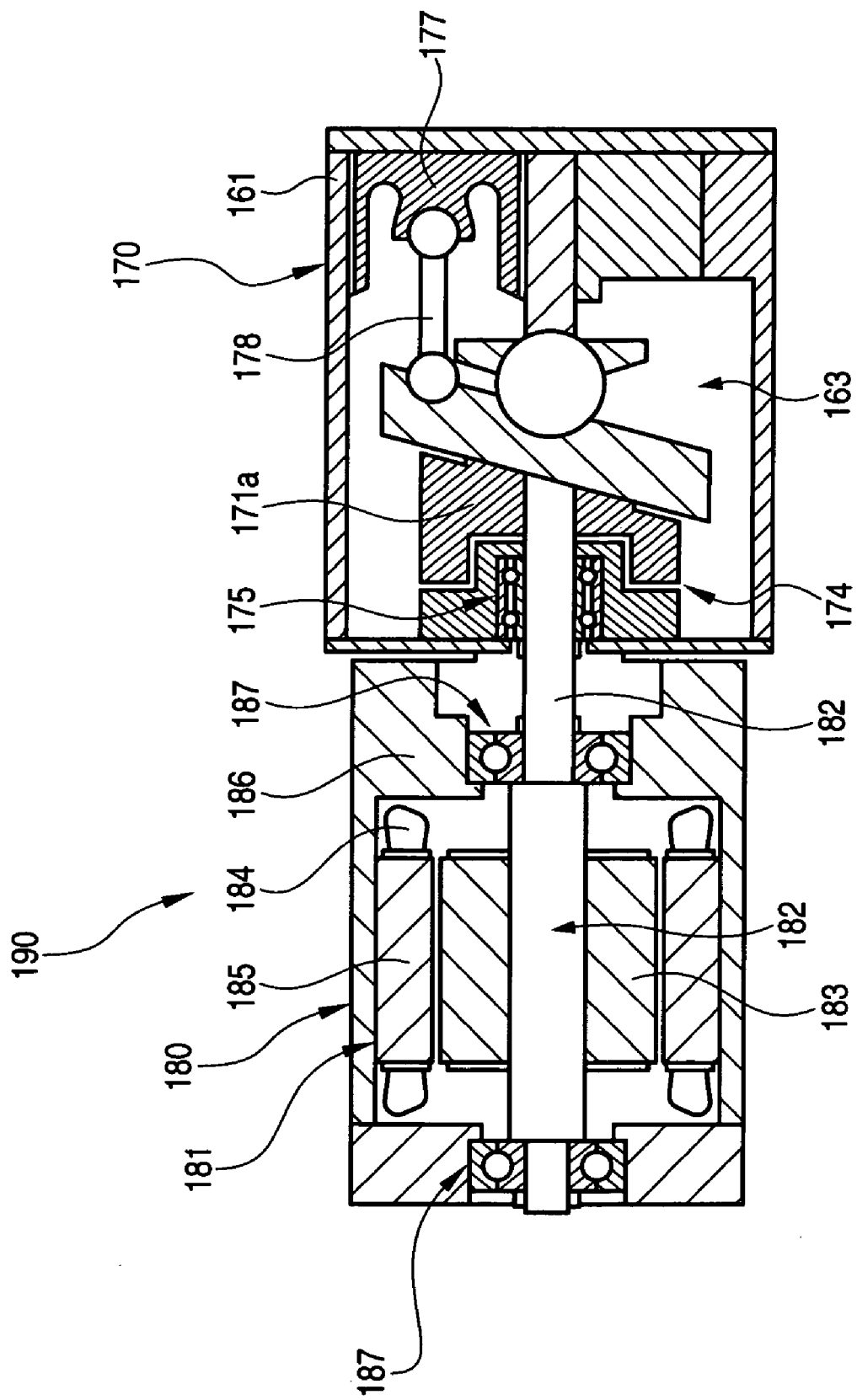
FIG. 8 is a sectional view illustrating other example (single swash type compressor) of the compressor according to an embodiment of implementation of the invention.

As a swash plate type compressor there is known a single swash plate compressor comprising a single-sided swash plate 171a as shown in FIG. 8. The single swash plate type compressor 190 shown is arranged such that a piston 177 moves with a rod 176 interlocked to the single-sided swash plate 171a. Other constitutions, e.g., supporting structure of the motor main shaft 182, motor driving portion 180, are the same as those of the double swash plate type compressor 160 shown in FIG. 7. Where the parts are the same as those of FIG. 7, the same numbers are used and the description thereof will be omitted.

Figure 9:
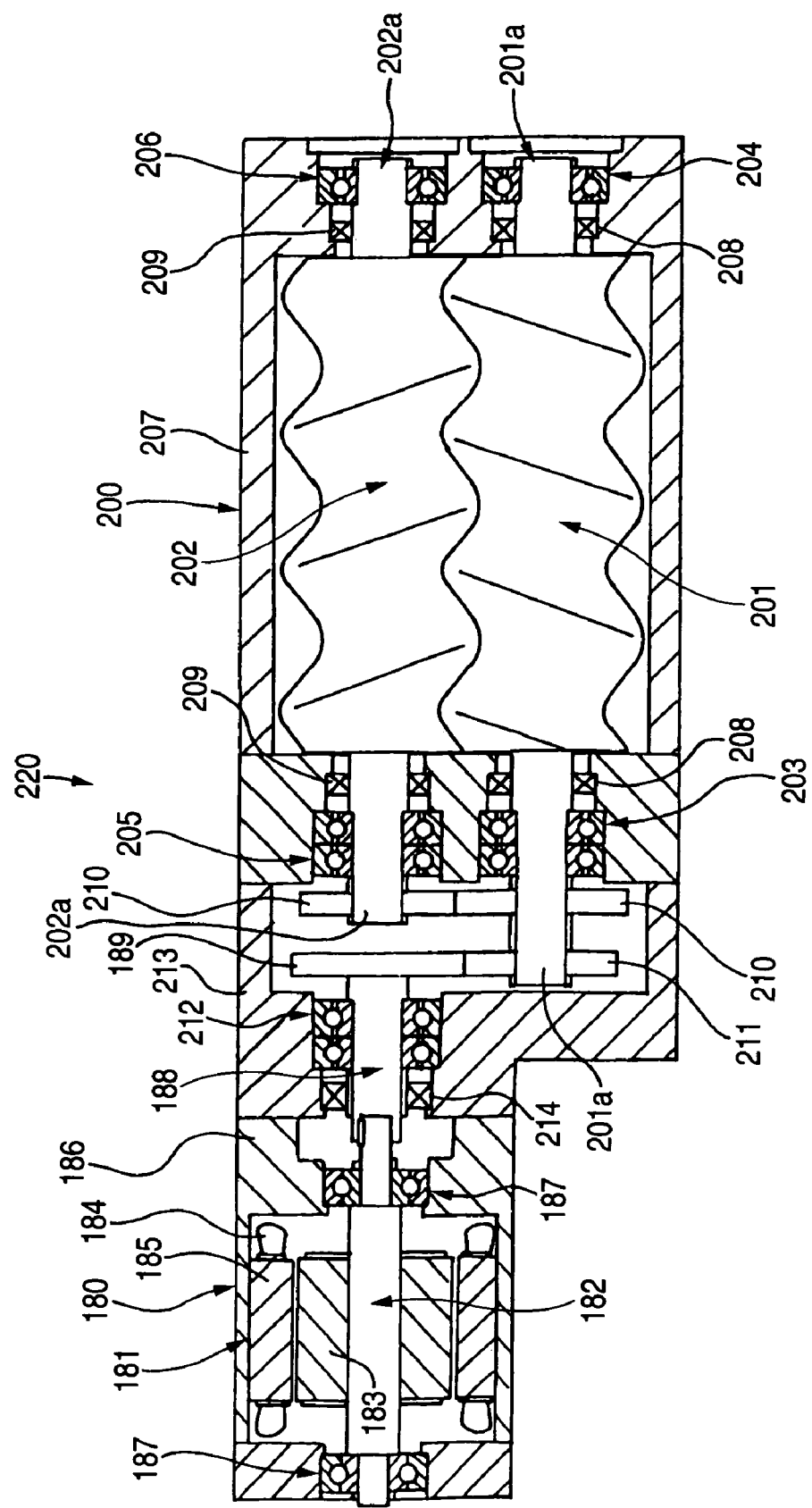
FIG. 9 is a sectional view illustrating other example (screw type compressor) of the compressor according to an embodiment of implementation of the invention.

FIG. 9 illustrates a screw type compressor 220 comprising a compression mechanism portion 200 for compressing gas by the rotation of a main rotor 201 and a sub rotor 202 in engagement with each other and a driving motor portion 180 for driving the compression mechanism portion 200 by the rotation of the driving motor 181 and the motor main shaft 182. The driving motor 180 is the same as that in the double swash plate type compressor 160 shown in FIG. 7. Where the parts are the same as those of FIG. 7, the same numbers are used and the description thereof will be omitted.

In the compression mechanism portion 200, the main rotor 201 and the sub rotor 202 are formed spirally such that they engage with each other. In this arrangement, the main rotor 201 and the sub rotor 202 can rotate in cooperation with each other. In the main rotor 201, the rotary shaft 201a disposed at left side as viewed on the drawing is rollably supported by a housing 207 with the aforementioned pair of rolling bearings 203 which are disposed horizontally apart from each other and the rotary shaft 201a disposed at right side as viewed on the drawing is rollably supported by the housing 207 with the aforementioned rolling bearing 204. In the sub rotor 202, the rotary shaft 202a disposed at left side as viewed on the drawing is rollably supported by the housing 207 with the aforementioned pair of rolling bearings 205 which are disposed horizontally apart from each other and the rotary shaft 202a disposed at right side as viewed on the drawing is rollably supported by the housing 207 with the aforementioned rolling bearing 206.

The rotary shaft 201a of the main rotor 201 has a sealing member 208 provided interposed between the rotary shaft 201a and the housing 207 axially inside the rolling bearings 203, 204. The rotary shaft 202a of the sub rotor 202 has a sealing member 209 provided interposed between the rotary shaft 202a and the housing 207 axially inside the rolling bearings 205, 206.

The main rotor 201 and the sub rotor 202 are interlocked to each other via coupling gears 210 provided on the rotary shafts 201a, 202a disposed at left side as viewed on the drawing, respectively. The rotary shaft 201a of the main rotor 201 disposed at left side as viewed on the drawing comprises a driven gear 211 provided on the left end thereof. The driven gear 211 engages with a driving gear 189 provided on a driving shaft 188 fitted on the motor main shaft 182 of the driving motor 181. Accordingly, the main rotor 201 is given rotational power transferred from the motor main shaft 182 via the driving shaft 188, the driving gear 189 and the driven gear 211. The rotation of the main rotor 201 is transferred to the sub rotor 202 via the coupling gear 210.

The driving shaft 188 is rollably supported by a housing 213 with the aforementioned pair of rolling bearings 212 which are disposed horizontally apart from each other. The driving shaft 188 and the housing 213 have a sealing member 214 provided interposed therebetween.

In the operation of the screw type compressor 220 having the aforementioned constitution, as the driving motor 181 is energized, the motor main shaft 182 rotates. The rotational power is transferred to the rotary shaft 201a of the main rotor 201 via the driving shaft 188, the driving gear 189 and the driven gear 211. At the same time, the rotational power is transferred from the rotary shaft 201a of the main rotor 201 to the rotary shaft 202a of the sub rotor 202 via the coupling gear 210. The main rotor 201 and the sub rotor 202 rotate in engagement with each other to suck, compress and discharge gas.

The incorporation of the aforementioned grease in the aforementioned various compressors makes it possible for the rolling bearing incorporated therein to operate in a stable manner even under severe working conditions such as high temperature, high speed, high load and violent vibration over an extended period of time.

Figure 10:
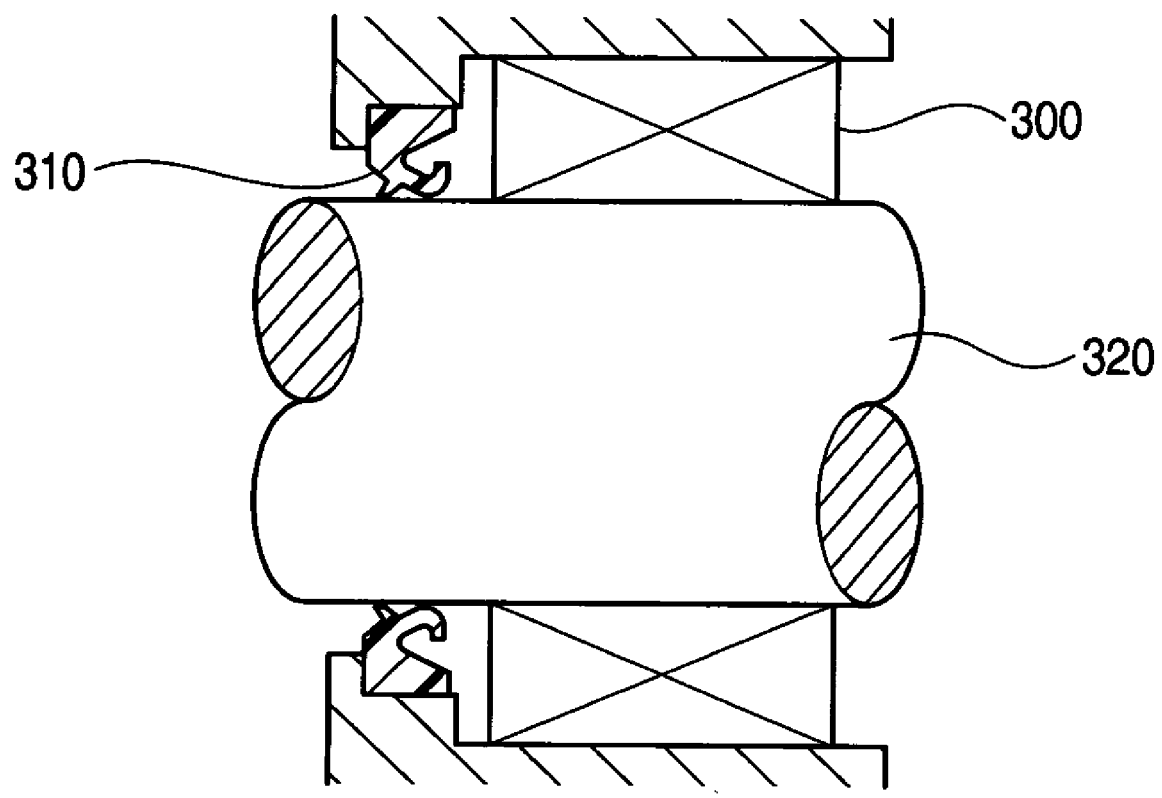
FIG. 10 is a diagram typically illustrating how a rolling bearing is mounted on the compressor for fuel cell system according to an embodiment of implementation of the invention.

As shown in FIG. 10, it is also preferred that an oil seal 310 be provided outside the rolling bearing 300 to fill the gap between the housing and the rotary shaft 320 at each of the mounting position of the various rolling bearings 200. The provision of the oil seal 310 makes it possible to enhance the sealability and hence the waterproofness of the rolling bearing 300.

(Fuel Cell System)

The invention relates more particularly to a fuel cell system comprising the aforementioned compressor for fuel cell system. As such a fuel cell system there may be exemplified a solid polymer electrolyte type fuel cell system as shown in FIG. 11 or a hydrogen tank process fuel cell system as shown in FIG. 12.

Figure 11:
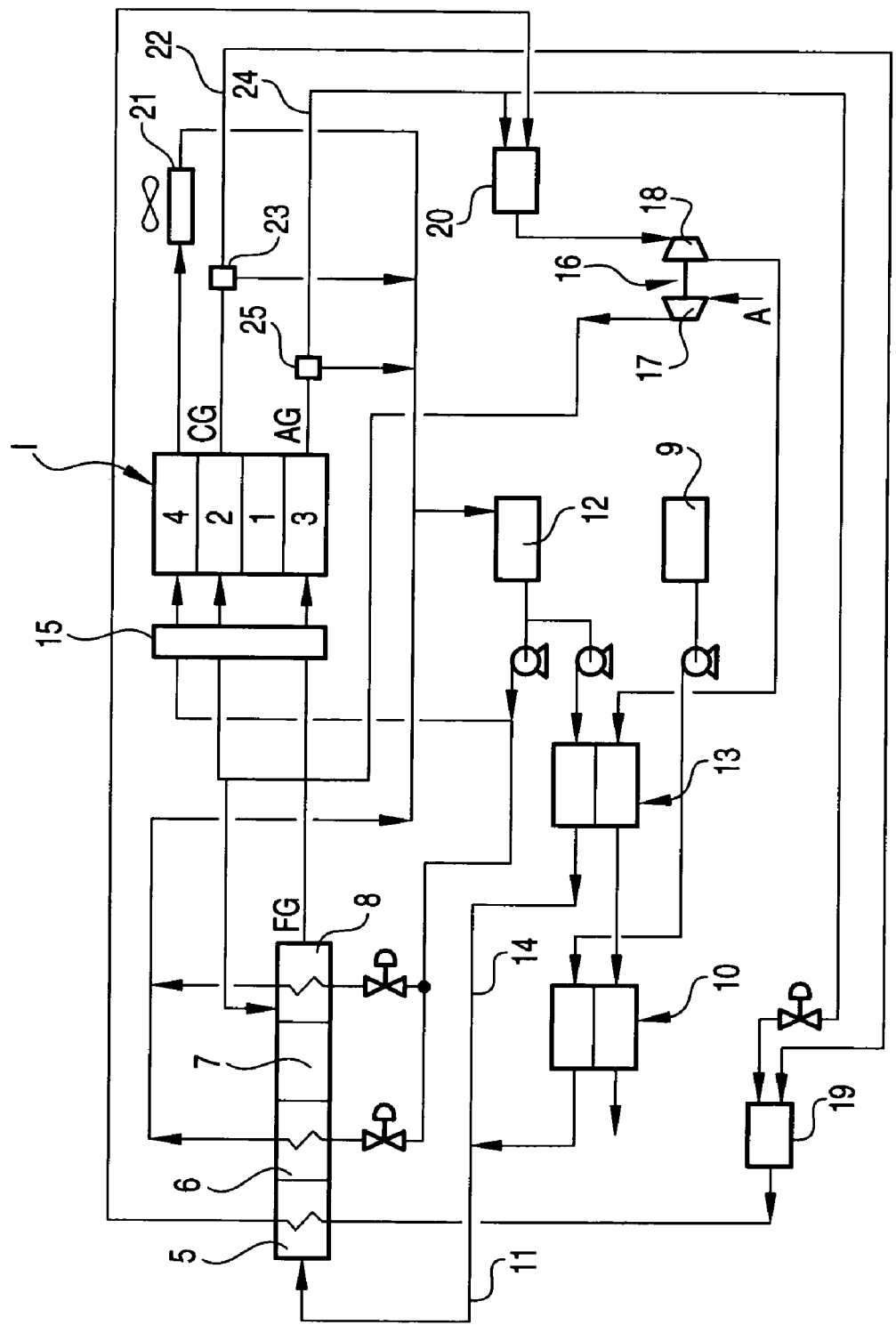
FIG. 11 is a diagram illustrating the entire configuration of an example (solid polymer electrolyte type fuel cell) of the fuel cell system according to an embodiment of implementation of the invention.
Figure 12:
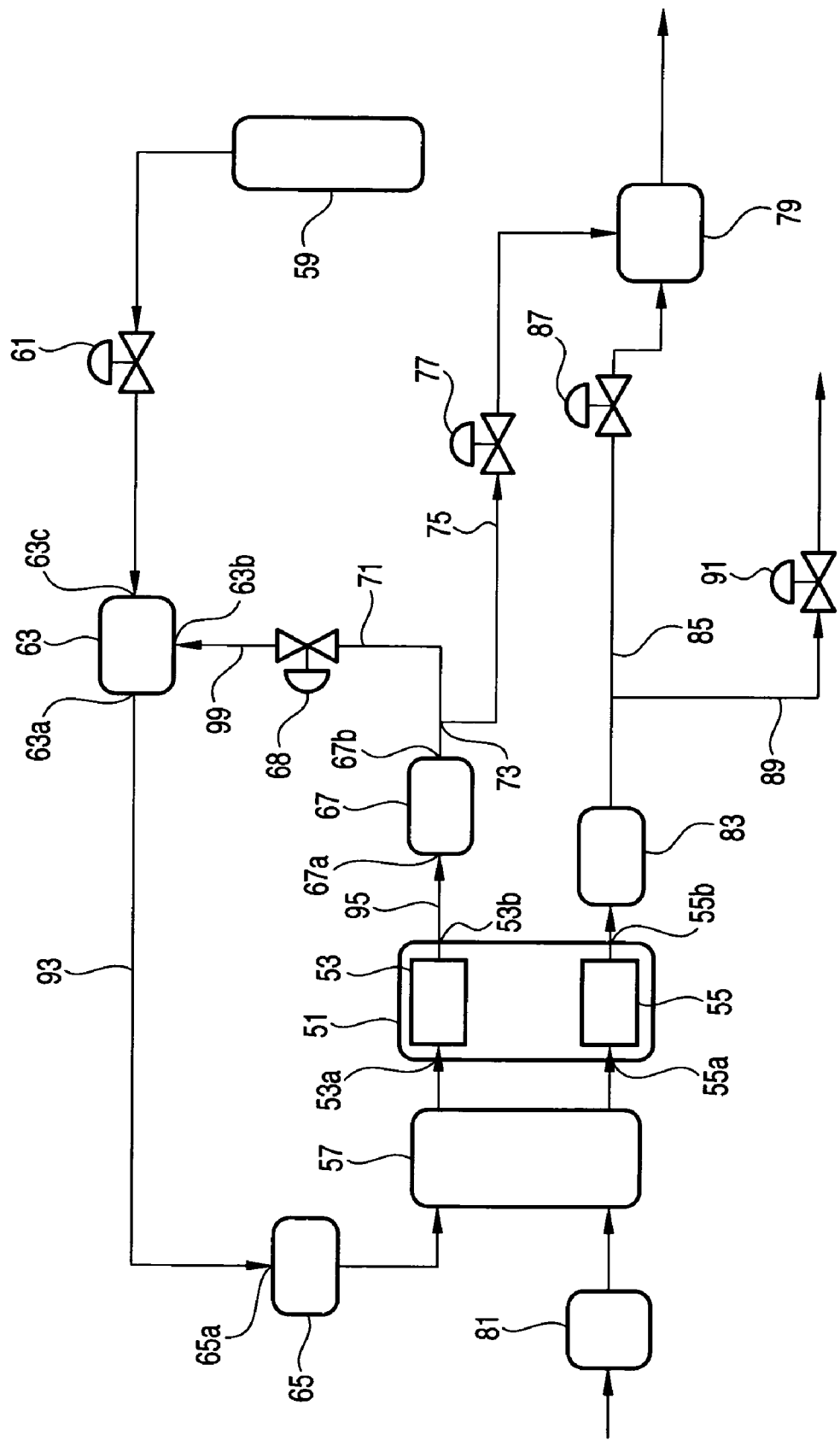
FIG. 12 is a diagram illustrating the entire configuration of another example (hydrogen tank system fuel cell) of the fuel cell system according to an embodiment of implementation of the invention.

The solid polymer electrolyte type fuel cell system shown in FIG. 11 corresponds to the fuel cell system described in Citation 1 (JP-A-11-307112). A solid polymer electrolyte type fuel cell I comprising a stack of fuel cells obtained by laminating cells each having a solid polymer electrolyte membrane 1 interposed between gas diffusion electrodes, i.e., cathode 2 and anode 3 with a separator interposed therebetween and a cooling portion 4 provided each for some of these cells has a modifier 5, a heat exchanger 6, a shift converter 7 and a CO remover 8 provided in this order from upstream on the anode port 3 side thereof. A methanol supply line 11 is provided for introducing methanol supplied from a fuel tank 9 into the modifier 5 via a methanol evaporator 10. On the other hand, a water vapor line 14 through which part of water from a water tank 12 which has been evaporated in a vaporizer 13 is passed is connected to the methanol supply line 11 so that methanol and water vapor are introduced into the modifier 5 where water vapor modification of methanol is then effected. At the same time, it is arranged such that the other part of water is passed through the heat exchanger 6 and the CO remover 8 as a coolant. In this manner, the fuel gas FG which has been modified is cooled with cooling water from the water tank 12 in the heat exchanger 6. Thereafter, the fuel gas is subjected to shift reaction in a shift converter 7 which operates at 200° C. to reduce the concentration of carbon monoxide (CO), which can act as a catalyst poison to the solid polymer electrolyte type fuel cell I, to a value which can be processed by the CO remover 8 (not greater than 1%). The fuel gas FG which has been freed of CO by the CO remover 8 which operates at a temperature of from about 100° C. to 150° C. is then supplied into the anode 3 of the solid polymer electrolyte type fuel cell I via a humidifier 15.

On the other hand, it is arranged such that air A which has been compressed as an oxidizer gas by the aforementioned compressor 17 of the turbo charger 16 is supplied into the solid polymer electrolyte type fuel cell I at the cathode port 2 thereof via a humidifier 15. At the same time, part of the air A is branched to the CO remover 8 where it is then used for the combustion of CO. The total mount of cathode discharge gas CG from the cathode 2 and part of the anode discharge gas AG from the anode 3 are combusted in a combustor 19, and then introduced into the combustion chamber of the modifier 5 where methanol in the modification chamber absorbs heat in the presence of a modifying catalyst up to a temperature of 250° C. to undergo reaction that modifies it to fuel gas FG.

The discharge gas discharged from the combustion chamber of the modifier 5 is combusted together with part of the anode discharge gas AG discharged from the anode 3 in the combustor 20, and then introduced into a turbine 18 to drive the aforementioned compressor 17. The discharge gas discharged from the turbine 18 is then discharged as an exhaust gas via the vaporizer 13 and the methanol evaporator 10. Part of the cooling water from the water tank 12 is passed through the cooling portion 4 of the solid polymer electrolyte type fuel cell I via the humidifier 15. The cooling water which has been passed through the cooling portion 4 is cooled by a cooler 21, and then introduced into the water tank 12. Water which has been separated by a gas-water separator 23 in the cathode discharge gas line 22 and a gas-water separator 25 in the anode discharge gas line 24, respectively, is then returned to the water tank 12 together with water which has been passed through the heat exchanger 6 and the CO remover 8.

The fuel cell system shown in FIG. 12 corresponds to the fuel cell system described in Citation 2 (JP-A-2002-231294). In FIG. 12, the reference numeral 51 indicates a stack of fuel cells obtained by laminating a plurality of fuel cells each having a fuel electrode 53 and an oxidizer electrode 55 facing opposed to each other with a solid polymer electrolyte membrane interposed therebetween with the interposition of a separator. The reference numeral 57 indicates a humidifier where the fuel gas and the oxidizer gas come in contact with pure water via a semipermeable membrane while water molecule passes through the semipermeable membrane to humidify these gases.

Hydrogen is stored in the hydrogen tank 59. The hydrogen is pressure-controlled by a fuel pressure control valve 61, and then supplied into the fuel cell stack 51 at the fuel inlet 53a of the fuel electrode 53 through a supply side water separator 65 and a humidifier 57. The mixture of hydrogen and water vapor discharged from the fuel outlet 53b of the fuel electrode 53 is passed through the discharge side water separator 67 and the pass cut valve 69 to the aforementioned compressor (ejector compressor) 63 where it is then mixed with a raw fuel gas. The mixed gas is then recycled to the fuel electrode 53 of the fuel cell stack 51 via the supply side water separator 65 and the humidifier 57. To a piping 71 connecting between the discharge side water separator 67 and the pass cut valve 69 is branched a purge piping 75 for purging hydrogen. The purge piping 75 comprises a purge gas cut valve 77 and a purge gas catalyst 79 provided therein.

By the action of the aforementioned compressor 81, air as an oxidizer is supplied into the oxidizer electrode 55 of the fuel cell stack 1 at the oxidizer inlet 55a thereof via the humidifier 57. The exhaust gas discharged from the oxidizer outlet 55b of the oxidizer electrode 55 contains water vapor and liquid water which are then separated from each other by the water separator 83 to remove liquid water. The water separator 83 comprises an air purge piping 85 for supplying air during hydrogen purge and a purge gas cut valve 87. During hydrogen purge, air is supplied into the purge gas catalyst 79 from which it is then discharged out. To the air purge piping 85 is branched an air discharge piping 89 which comprises an air pressure control valve 91 provided therein.

The electricity-generating state of the fuel cell stack 51 is detected by a sensor (not shown). Upon the reception of the detection signal, a feedback control is then effected such that the hydrogen pressure and the air pressure are controlled by the fuel pressure control valve 51 and the air pressure control valve 91 depending on the electricity-generating state thus detected and the air flow is controlled by the rotary speed of the aforementioned compressor 81.

The fuel cell system having the aforementioned constitution comprises the aforementioned compressor incorporated therein and thus can make stable electricity generation over an extended period of time even under severe working conditions.

EXAMPLES

The invention will be further described in the following examples and comparative examples, but the invention is not construed as being limited thereto.

(Preparation of Test Greases)

Test greases A to G were prepared according to the formulations set forth in Table 1 below. For comparison, commercially available lithium soap-mineral oil-based greases and urea compound-mineral oil-based greases (grease C) were prepared.

(Moisture Durability Test)

A Type 6203DD contact type sealed ball bearing (produced by NSK Ltd.) was filled with the test grease to give a test bearing. The test bearing thus prepared was then rotated at a temperature of 120° C., a radial load of 100N, an axial load of 100N and an inner ring rotary speed of 2,000 rpm. Every 24 hours, rotation was suspended to inject 0.3 ml of water into the interior of the bearing through a syringe. When any unusual noise occurred, the bearing was not able to be started or the motor current rose beyond not smaller than 10% greater than the value during unloaded operation even if 1 minute passes from starting, it was judged to have undergone seizing. The time required until such a trouble occurs was then measured. The results are set forth in Table 1 below.

TABLE 1

|  | Grease F | Grease A | Grease B | Grease G |
|---|---|---|---|---|
| Kind of thickening agent | Diurea | Diurea | Lithium complex soap | Fluororesin |
| Amount of thickening agent (Note 1) | 18 | 14 | 14 | 22 |
| Kind of base oil | Ester oil | Synthetic hydrocarbon oil | Ether oil + mineral oil (mixing ratio: 1:1) | Fluorine-based oil |
| Viscosity of base oil (Note 2) | 33 | 100 | 250 | 60 |
| Rust preventive | Metal sulfonate | Ester-based | Metal carboxylate | Inorganic |
| Worked penetration | 280 | 220 | 250 | 290 |
| Seizing time (h) during moisture resistance test | 350 | 380 | 290 | 400 |

|  | Grease C | Grease D | Grease E | Commercial grease (comparative) |
|---|---|---|---|---|
| Kind of thickening agent | Diurea | Diurea | Lithium complex soap | Lithium soap |
| Amount of thickening agent (Note 1) | 6 | 30 | 14 | 8 |
| Kind of base oil | Mineral oil | Synthetic hydrocarbon oil | Ether oil | Mineral oil |
| Viscosity of base oil (Note 2) | 430 | 120 | 100 | 130 |
| Rust preventive | Metal sulfonate | Ester-based | Metal carboxylate | Inorganic |
| Worked penetration | 360 | 185 | 250 | 280 |
| Seizing time (h) during moisture resistance test | 250 | 340 | 290 | 80 |

Note 1:
% by weight based on the total amount of grease
Note 2:
Kinetic viscosity (mm$^2$/s) at 40° C.

As can be seen in the results of Table 1 above, all the test bearings having a fluorine-based grease comprising a fluororesin and a fluorine-based oil (grease G), a urea grease comprising a urea compound and a synthetic oil (greases A, D and F) or a lithium complex grease comprising a lithium complex and a synthetic oil (greases B and E) encapsulated therein exhibit an excellent durability as compared with the commercially available lithium-mineral oil-based greases. On the contrary, the grease C (comparative example) comprising a mineral oil as abase oil exhibits a slightly deteriorated durability.

Examples 1-1 to 1-7; Examples 1-1' and 1-2'

As set forth in Table 2 below, perfluoroalkylethers (PFPE) having a kinetic viscosity of from 270 to 300 mm$^2$/s at 40° C. were each subjected to thickening with a polytetrafluoroethylene (PTFE). To the perfluoroalkylethers (PFPE) thus thickened were each added a magnesium compound or a vapor phase inhibitor to prepare test greases of Examples 1-1 to 1-7. Further, a polyolester (kinetic viscosity at 40° C.:270 mm$^2$/s) was subjected to thickening with a diurea compound. To the polyolester thus thickened was then added barium sulfonate as a rust preventive to prepare a test grease of Example 1-1'. Moreover, a polyolester oil (kinetic viscosity at 40° C.: 100 mm$^2$/s) was subjected to thickening with a lithium complex soap. To the polyolester thus thickened was then added barium sulfonate as a rust preventive to prepare a test grease of Example 1-2'. All these test greases were each adjusted to have a worked penetration of NLGI No. 2.

Subsequently, a Type LM2512 solid type needle roller bearing (produced by NSK Ltd.; inner diameter: 20 mm, outer diameter: 32 mm, width: 12.1 mm) was fully packed with each of these test greases. The roller bearing was rotated at a rotary speed of 1,800 min$^{-1}$ for 180 seconds, subjected to durability test using a simple bearing rotary testing machine, and then measured for durability life. The test was conducted at an atmosphere temperature of 220° C., a radial load of 98 N and a rotary speed of 8,000 min$^{-1}$. The results are set forth in Table 2 below relative to that of the bearing filled with the test grease of Example 1-1' as 1.

TABLE 2

|  | Example 1-1 | Example 1-2 | Example 1-3 | Example 1-4 | Example 1-1' | Example 1-2' |
|---|---|---|---|---|---|---|
| Thickening agent | PTFE | PTFE | PTFE | PTFE | Diurea | Li complex |
| Base oil | PFPE | PFPE | PFPE | PFPE | Polyol ester | Polyol ester |
| Worked penetration (NLGI) | No. 2 | No. 2 | No. 2 | No. 2 | No. 2 | No. 2 |
| Kinetic viscosity of base oil (mm$^2$/s, 40° C.) | 270 | 300 | 300 | 270 | 270 | 100 |
| Rust preventive | Magnesium oxide | Magnesium oxide | Benzo-triazole | Benzo-triazole | Ba sulfonate | Ba sulfonate |
| Content of rust preventive (wt-%) | 1.0 | 1.0 | 0.1 | 0.1 | 1.0 | 1.0 |
| Bearing life ratio (-) | 2.5 | 2.3 | 2.1 | 2.2 | 1 | 0.5 |

|  | Example 1-5 | Example 1-6 | Example 1-7 |
|---|---|---|---|
| Thickening agent | PTFE | PTFE | PTFE |
| Base oil | PFPE | PFPE | PFPE |
| Worked penetration (NLGI) | No. 2 | No. 2 | No. 2 |
| Kinetic viscosity of base oil (mm$^2$/s, 40° C.) | 270 | 270 | 270 |
| Rust preventive | Magnesium zirconate | Methyl benzo-triazole | DICHAN |
| Content of rust preventive (wt-%) | 1.0 | 0.1 | 0.1 |
| Bearing life ratio (-) | 2.3 | 2.1 | 2.0 |

As can be seen in Table 2 above, the encapsulation of a grease composition comprising a perfluoroalkylether as a base oil, a polytetrafluoroethylene as a thickening agent, and a magnesium compound or vapor phase inhibitor makes it possible to enhance durability as much as twice or more.

(Verification of Content of Magnesium Oxide)

To a base grease obtained by thickening a perfluoroalkylether (PFPE) having a kinetic viscosity of 270 mm$^2$/s at 40° C. with a polytetrafluoroethylene (PTFE) was added magnesium oxide in various amounts to prepare test greases. The worked penetration of these test greases were each adjusted to NLGI No. 2. These test greases were each then subjected to the following rust prevention test (1-1) and acoustic test (1-2).

(1-1) Rust Prevention Test

As a test bearing there was used a Type 6202 sealed ball bearing with rubber seal (produced by NSK Ltd.; inner diameter: 15 mm, outer diameter: 35 mm, width: 11 mm). The test bearing was filled with 2.4 g of the test grease, and then subjected to running-in at 1,800 min$^{-1}$ for 30 seconds. Thereafter, a 0.05 wt-% brine was injected into the test bearing in an amount of 0.1 cc. The test bearing was then again subjected to running-in at 1,800 min$^{-1}$ for 30 seconds. Subsequently, the test bearing was allowed to stand in a constant temperature and humidity tank which had been kept at 85° C. and 90% RH for 48 hours, disassembled, and then visually observed for the occurrence of rust on the race. The evaluation was conducted according to the following criterion. From the practical standpoint of view, those showing a score of from 1 to 2 are accepted.

| Score | Degree of rust |
|---|---|
| 1: | No rust |
| 2: | Slight spot rust |
| 3: | Spot rust |
| 4: | Slight rust |
| 5: | Some rust |
| 6: | Much rust |
| 7: | Maximum rust |

(1-2) Acoustic Test

As a test bearing there was used a Type LM2512 solid type needle roller bearing (produced by NSK Ltd.; inner diameter: 20 mm, outer diameter: 32 mm, width: 12.1 mm). The bearing was fully packed with the test grease, rotated at a rotary speed of 1,800 $min^{-1}$ for 180 seconds, and then measured for acoustic properties by an anderon meter.

Figure 13:
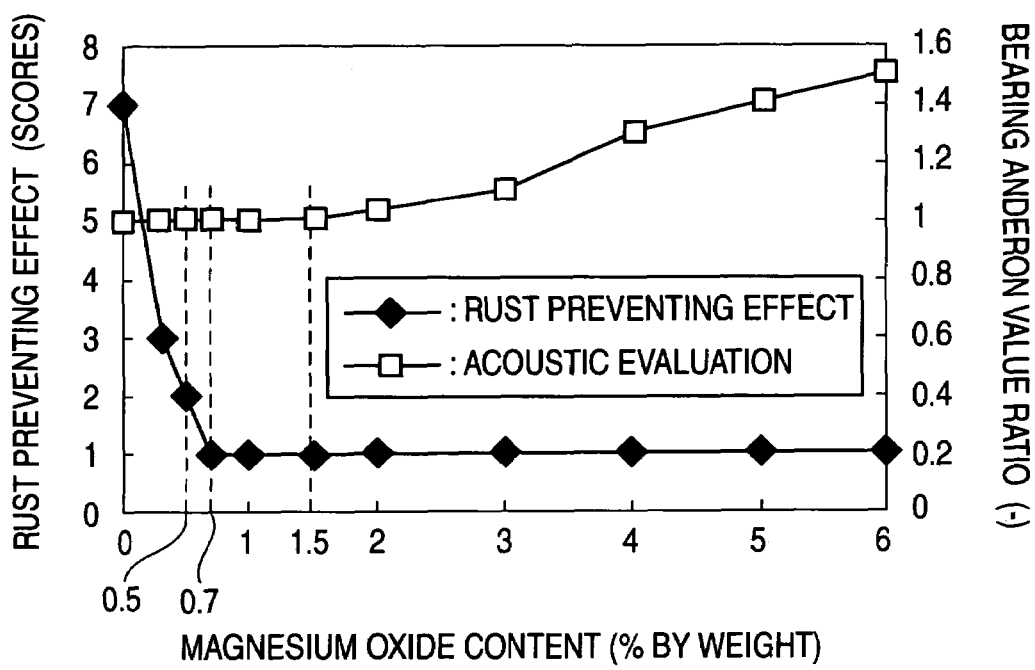
FIG. 13 is a graph illustrating the relationship between the content of magnesium oxide and the rustproofness and acoustic properties obtained in examples.

The results of rust prevention test and acoustic test are graphically shown in FIG. 13. As the content of magnesium oxide increases, the rust preventing effect enhances, but the acoustic properties deteriorate. This is because magnesium oxide exists in the grease composition in the form of solid particles and when the content of magnesium oxide increases, it acts as foreign matter. However, when the content of magnesium oxide falls within the range of from 0.5% to 3.0% by weight, the rust preventing effect and the acoustic properties are well balanced. In particular, the content of magnesium oxide preferably falls within the range of from 0.7% to 1.5% by weight.

(Verification of Content of Vapor Phase Inhibitor)

To a base grease obtained by thickening a perfluoroalky-lether (PFPE) having a kinetic viscosity of 270 $m^2/s$ at 40° C. with a polytetrafluoroethylene (PTFE) was added benzotriazole in various amounts to prepare test greases. The worked penetration of these test greases were each adjusted to NLGI No. 2. These test greases were each then subjected to the rust prevention test (1-1) and acoustic test (1-2) as mentioned above.

Figure 14:
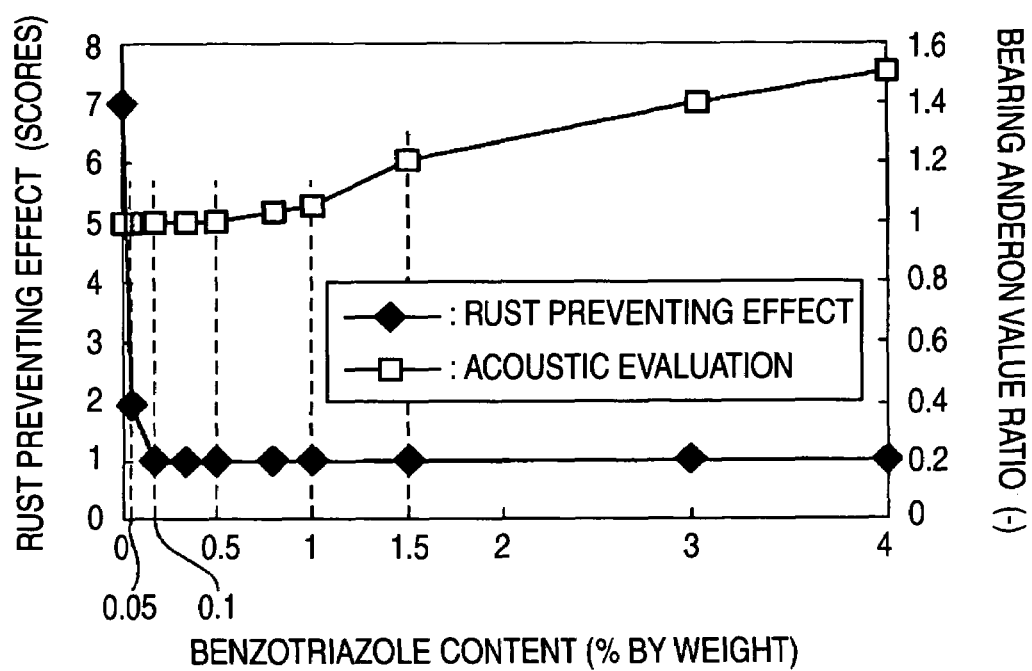
FIG. 14 is a graph illustrating the relationship between the content of benzotriazole and the rustproofness and acoustic properties obtained in examples.

The results of rust prevention test and acoustic test are graphically shown in FIG. 14. As can be seen in these results, the content of benzotriazole is preferably from 0.1% to 1.5% by weight, more preferably from 0.05% to 1.0% by weight, most preferably from 0.1% to 0.5% by weight.

(Verification of Kinetic Viscosity of Base Oil)

Further, test greases were prepared by varying the kinetic viscosity of base oil according to the formulation set forth in Example 1-1 to define proper kinetic viscosity of base oil. These test greases were then each measured for durability life in the same manner as mentioned above. The results are shown in FIG. 15 relative to that of the bearing filled with the test grease of Example 1-1' as 1.

Figure 15:
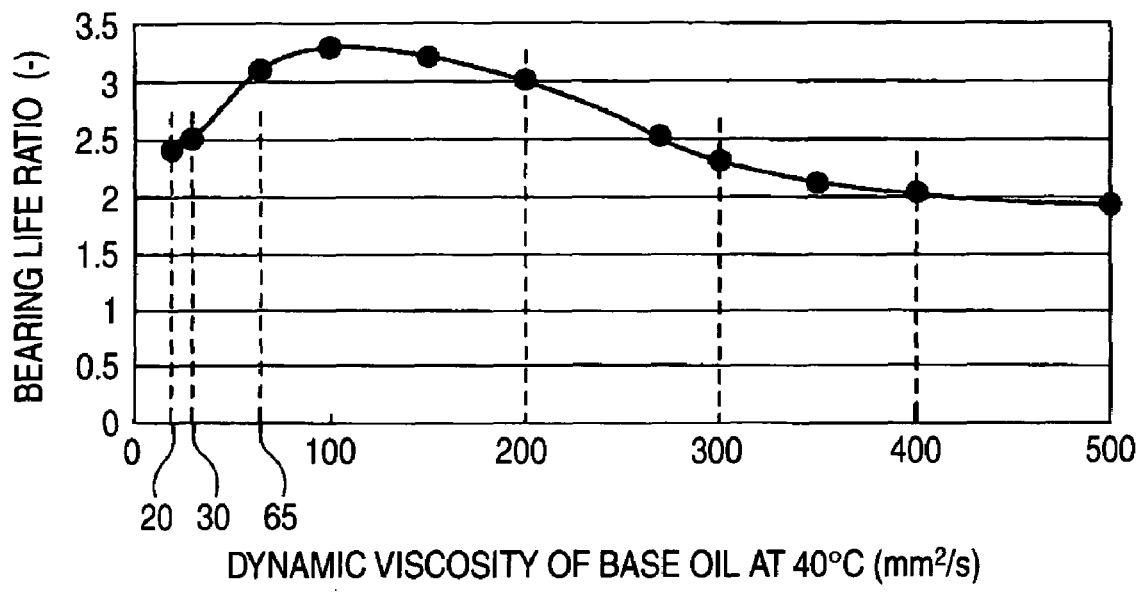
FIG. 15 is a graph illustrating the relationship between the kinetic viscosity of base oil and the bearing life ratio obtained in examples.

As can be seen in FIG. 15, when the kinetic viscosity is from 20 to 400 $mm^2/s$ at 40° C., the results of bearing life are as good as not smaller than twice that of Example 1-1'. The kinetic viscosity of the grease is more preferably from 30 to 300 $mm^2/s$ at 40° C. In particular, when the kinetic viscosity of the grease is from 65 to 200 $mm^2/s$ at 40° C., the results of bearing life is as best as not smaller than three times that of Example 1-1'.

To a commercially available additive-free fluorine-based grease ("Crytox GPL203", produced by Du Pont Inc.; kinetic viscosity of base oil at 20° C.: 80 $mm^2/s$) as a base grease were added a fluorine-based surface active agent (3-(perfluoro-n-octyl)propanoic acid and magnesium oxide powder or benzotriazole as set forth in Table 3. The mixture was uniformly stirred by a three-roll mill. To the mixture was then added "Nasul BSN" (barium sulfonate) (produced by King Inc.). The mixture was then uniformly stirred by a three-roll mill to prepare various test greases. These test greases were each then subjected to the following seizing durability test (2-1) and rust prevention test (2-2).

(2-1) Seizing Durability Test

A Type 6204DD contact type sealed ball bearing with seal (produced by NSK Ltd.; inner diameter: 20 mm, outer diameter: 47 mm, width: 14 mm, see FIG. 1) was packed with the test grease in an amount such that 40% of the space volume was occupied to prepare a test bearing. The test bearing was then subjected to seizing durability test using a testing machine shown in FIG. 16. The testing machine shown comprises a rotary shaft 360 supported by a pair of supporting bearings 362, 362. The test bearing 361 is mounted on the central part of the rotary shaft 360. The testing machine is entirely received in a constant temperature and humidity tank (not shown) so that it can be entirely kept at a predetermined temperature. For this test, the test bearing 361 was continuously rotated at an outer ring temperature of 220° C., a radial load of 98 N, an axial load of 98 N and an inner ring rotary speed of 5,000 $min^{-1}$. When the outer ring temperature reached 230° C., the test bearing was then judged to have undergone seizing. The time required until seizing occurs was then determined. The results are set forth in Table 3 below relative to that of the test bearing filled with a base grease alone as 10.

(2-2) Rust Prevention Test

A Type 6303ZZ non-contact type ball bearing with sealed shield (produced by NSK Ltd.; inner diameter: 17 mm, outer diameter: 47 mm, width: 14 mm) was packed with the test grease in an amount such that 50% of the space volume was occupied to prepare a test bearing. The test bearing was then subjected to running-in at a rotary speed of 1,800 $min^{-1}$ for 30 seconds according to ASTM D 1743. A 0.5% brine was then injected into the interior of the bearing in an amount of 0.5 ml through a syringe. The test bearing was then subjected to running-in at a rotary speed of 1, 800 $min^{-1}$ for 30 seconds. Subsequently, the test bearing was allowed to stand in a constant temperature and humidity tank which had been kept at 90° C. and 95% RH for 96 hours, disassembled, and then visually observed for the occurrence of rust on the race. The occurrence of rust was judged according to a three-step criterion (no rust, some rust, much rust) The results are set forth in Table 3.

TABLE 6

| | Example 5-1 | Example 5-2 | Example 5-3 | Example 5-4 | Example 5-5 | Example 5-6 |
|---|---|---|---|---|---|---|
| Thickening agent | Diurea (alicyclic + aliphatic) | Diurea (alicyclic) | Diurea (aromatic) | Diurea (aromatic + alicyclic) | Triurea | Tetraurea |

TABLE 6-continued

| Base oil | ADS | ADS + AE (50:50) | ADS + PAO (I) (60:40) | ADS + ADE (40:60) | ADS | ADS + AE (50:50) |
|---|---|---|---|---|---|---|
| Oil separation (wt-%) | 0.5 | 0.9 | 1.0 | 0.7 | 0.5 | 0.8 |
| Seizing life ratio | 8.2 | 9.3 | 5.4 | 5.0 | 7.5 | 6.2 |
| Unusual noise at low temperature | None | None | None | None | None | None |
| Evaporation loss (wt-%) | 3.5 | 3.6 | 3.9 | 4.5 | 3.5 | 3.6 |

| | Example 5-1' | Comparative Example 5-2 | Comparative Example 5-3 | Example 5-4' | Example 5-5' | Example 5-6' |
|---|---|---|---|---|---|---|
| Thickening agent | Diurea (aliphatic) | Bentonite | Sodium terephthalamate | Diurea (alicyclic) | Diurea (alicyclic) | Diurea (alicyclic) |
| Base oil | MO | ADE | PAO (II) | AE | PAO (I) | ADE |
| Oil separation (wt-%) | 2.5 | 1.5 | 1.0 | 1.2 | 1.3 | 0.9 |
| Seizing life ratio | 1.0 | 0.5 | 0.8 | 3.0 | 2.0 | 2.5 |
| Unusual noise at low temperature | None | None | Some | None | None | Some |
| Evaporation loss (wt-%) | 8.0 | 5.0 | — | 5.5 | 6.0 | 5.0 |

Note)
ADS: Diphenyl sulfide alkyl-substituted compound (140 mm$^2$/s at 40° C.)
AE: Aromatic ester (50 mm$^2$/s at 40° C.)
PAO (I): Poly-α-olefin (50 mm$^2$/s at 40° C.)
PAO (II): Poly-α-olefin (403 mm$^2$/s at 40° C.)
POE: Polyether ester (30 mm$^2$/s at 40° C.)
ADE: Dialkyl phenyl ether (100 mm$^2$/s at 40° C.)
MO: Mineral oil (76 mm$^2$/s at 40° C.)

TABLE 3

| | Example 2-1 | Example 2-2 | Example 2-3 | Example 2-4 | Example 2-5 | Example 2-6 | Example 2-7 | Example 2-1' | Example 2-2' | Example 2-3' | Example 2-4' |
|---|---|---|---|---|---|---|---|---|---|---|---|
| Fluorine-based surface active agent (Notes 1, 2) | 1 | 2 | 3 | 5 | 8 | 3 | 5 | — | — | — | — |
| Magnesium oxide (Note 2) | — | — | — | — | — | — | — | — | — | 2 | 2 |
| Benzotriazole (Note 2) | — | — | — | — | — | — | — | — | 1 | 1 | 2 |
| Nasul BSN (Note 2) | 1 | 1 | 2 | 2 | 3 | — | — | — | 1 | — | 1 |
| Bearing seizing time ratio | 11 | 10.5 | 10.5 | 9.5 | 9 | 9 | 8.5 | 10 | 10.5 | 10.5 | 10 |
| Results of rust prevention test | No rust | No rust | No rust | No rust | No rust | Slight rust | Slight rust | Much rust | Some rust | Some rust | Some rust |

Note 1: Fluorine-based surface active agent; 3-(Perfluoro-n-octyl)propanoic acid
Note 2: % by weight based on the total amount of grease As can be seen in the results of Table 3, the test bearings having the test greases of Examples 2-1 to 2-7 encapsulated therein stand comparison with the test bearings of Examples 2-1' to 2-4' in seizing durability time and exhibit a drastically excellent rust preventing effect as compared with the test bearings of Examples 2-1' to 2-4'.

(Verification of Added Amount of Fluorine-Based Surface Active Agent)

Test greases were prepared in the same manner as in Example 2-5 except that the added amount of the fluorine-based surface active agent (3-(perfluoro-n-octyl)propanoic acid) was varied. These test greases were each then subjected to seizing durability test (2-1) and rust prevention test (2-2) as mentioned above. The results are graphically shown in FIG. 17.

Figure 17:
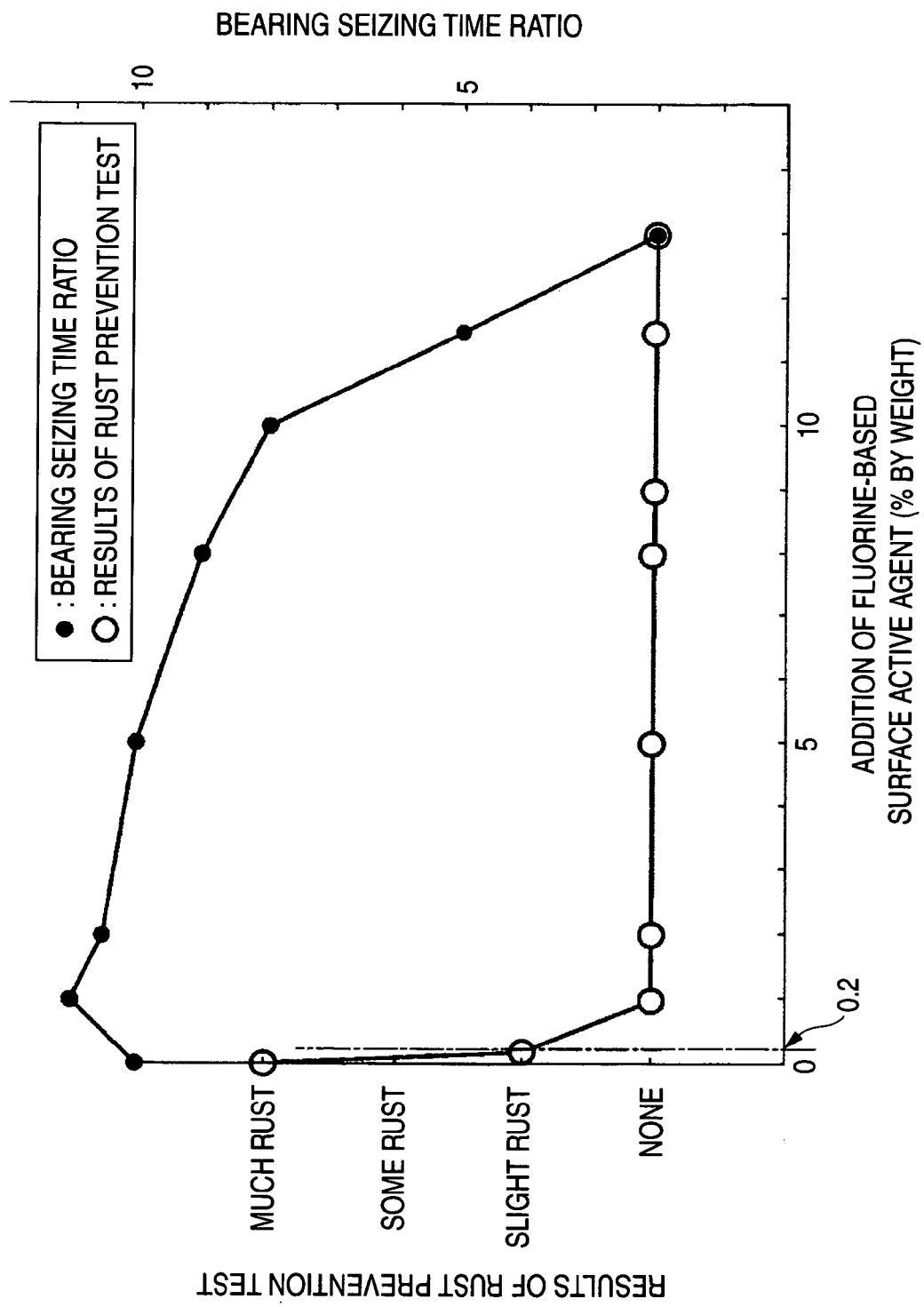
FIG. 17 is a graph illustrating the relationship between the percent addition of fluorine-based surface active agent and the results of rust prevention test and seizing time ratio in examples.

As can be seen in FIG. 17, as the added amount of the fluorine-based surface active agent increases, the rust preventing effect enhances, but the seizing time decreases. Therefore, in order to satisfy both the rust preventing effect and the seizing resistance, the upper limit of the added amount of the fluorine-based surface active agent is preferably predetermined to be not greater than 10% by weight, more preferably not greater than 8% by weight, particularly not greater than 5% by weight based on the total amount of the grease composition. The lower limit of the added amount of the fluorine-based surface active agent is preferably not smaller than 0.2% by weight, more preferably not smaller than 1% by weight based on the total amount of the grease composition. In other words, the added amount of the fluorine-based surface active agent is preferably from 0.2% to 10% by weight, more preferably from 1% to 8% by weight, particularly from 1% to 5% by weight based on the total amount of the grease composition.

[Test-1]

(Preparation of Test Grease)

A grease formulation is set forth in Table 4. A perfluoropolyether oil (kinetic viscosity at 40° C.: 60 mm²/s) was thoroughly mixed with a polytetrafluoroethylene powder in a proportion of 22% by weight. To the mixture was then added the exemplified rust preventive dissolved in the same perfluoropolyether oil as mentioned above. The mixture was then kneaded using a three-roll mill to prepare a fluorine-based grease.

As a grease other than fluorine-based grease, a urea grease was prepared by reacting a base oil (synthetic hydrocarbon oil, ether oil or ester oil; kinetic viscosity: as defined in the table) having a diisocyanate incorporated therein with the same base oil having an amine incorporated therein, heating the reaction product with stirring to obtain a semi-solid matter, adding the exemplified rust preventive dissolved in the same base oil to the semi-solid matter, and then thoroughly stirring the mixture. During this procedure, adjustment was conducted such that the content of the diurea compound reached 25% by weight (Examples 3-1 to 3-4; Example 3-2'). Further, a lithium soap-based grease was prepared by mixing a mineral oil (kinetic viscosity at 40° C.: 130 mm²/s) with a lithium soap, and then adding a rust preventive dissolved in the same mineral oil to the mixture (Comparative Example 3-1).

Subsequently, the fluorine-based grease and the grease other than fluorine-based grease were mixed in the same amount, and then passed through a roll mill to obtain a test mixed grease. The worked penetration of the test mixed grease is as set forth in the table. The test mixed grease thus obtained was encapsulated in the test bearing which was then subjected to the following moisture durability test and rust prevention test.

(Moisture Durability Test)

A Type 6203DD contact type single-row deep groove ball bearing with rubber seal having an inner diameter of 17 mm, an outer diameter of 40 mm and a width of 12 mm (produced by NSK Ltd.) (see FIG. 1) was filled with the test mixed grease in an amount such that 40% of the space volume was occupied to prepare a test bearing which was then evaluated for seizing life using a testing machine shown in FIG. 16. The testing machine shown comprises a rotary shaft 360 supported by a pair of supporting bearings 362, 362. The test bearing 361 is mounted on the central part of the rotary shaft 360. The testing machine is entirely received in a constant temperature and humidity tank (not shown) so that it can be entirely kept at a predetermined temperature. For this test, the rotary shaft 360 was rotated to rotate the test bearing 361 continuously at an inner ring rotary speed of 2,000 min$^{-1}$, a bearing temperature of 120° C., a radial load of 100 N and an axial load of 100 N. Every 24 hours, rotation was suspended to inject 0.3 ml of water into the interior of the bearing through a syringe. When any unusual noise occurred, the bearing was not able to be started or the motor current was excessive after 1 minute from starting, the test was terminated. The results are set forth in Table 4 below.

(Rust Prevention Test)

A deep groove ball bearing with rubber seal having an inner diameter of 17 mm, an outer diameter of 47 mm and a width of 14 mm was filled with the various test mixed greases in an amount such that 50% of the space volume was occupied. The test bearing was then subjected to running-in at 1,800 min$^{-1}$ for 30 seconds. Thereafter, a 0.5 wt-% brine was injected into the ball bearing in an amount of 0.5 ml. The test bearing was then again subjected to running-in at 1,800 min$^{-1}$ for 30 seconds. Subsequently, the ball bearing was allowed to stand in a constant temperature and humidity tank which had been kept at 80° C. and 100% RH for 48 hours, disassembled, and then visually observed for the occurrence of rust on the race of the bearing. The score of rust evaluation and rust conditions in the rust prevention test are as follows.

7: No rust

6: Slight spot rust (minute spot rust)

5: Spot rust ($\phi$: not greater than 0.3 mm)

TABLE 4

Formulation of grease and results of test

| | | Example 3-1 | Example 3-2 | Example 3-3 | Example 3-4 | Comparative Example 3-1 | Example 3-2' |
|---|---|---|---|---|---|---|---|
| Fluorine-based grease | Base oil | Fluorine-based oil | Fluorine-based oil | Fluorine-based oil | Fluorine-based oil | — | — |
| | Kinetic viscosity (mm²/s, 40° C.) | 60 | 60 | 60 | 60 | — | — |
| | Thickening agent | Fluororesin | Fluororesin | Fluororesin | Fluororesin | — | — |
| | Rust preventive | Modified fluorine polymer | Inorganic | Modified fluorine polymer | Modified fluorine polymer | — | — |
| Grease other than fluorine-based grease | Base oil | Synthetic hydrocarbon oil | Ether oil | Ester oil | Ether oil | Mineral oil | Ether oil |
| | Kinetic viscosity (mm²/s, 40° C.) | 68 | 100 | 33 | 100 | 130 | 100 |
| | Thickening agent | Urea | Urea | Urea | Urea | Lithium soap | Urea |
| | Rust preventive | Metal carboxylate | Metal sulfonate | Metal carboxylate | Metal carboxylate | Inorganic | Metal sulfonate |
| Fluorine-based grease/grease other than fluorine-based grease | | 0.5 | 0.5 | 0.5 | 0.5 | 0 | 0 |
| Worked penetration | | 250 | 285 | 250 | 250 | 280 | 285 |
| Results of moisture durability test (seizing time: h) | | 443 | 381 | 352 | 390 | 81 | 170 |
| Results of rust prevention test | | #6 | #6 | #6 | #6 | #6 | #7 |

4: Slight rust (φ: not greater than 1.0 mm)
3: Some rust (φ: not greater than 5.0 mm)
2: Much rust (φ: not greater than 10.0 mm)
1: Maximum rust (almost entirely rusted)

Those showing #7 to 5 were judged good. Those showing #4 to 1 were judged poor. The results are set forth in Table 4.

As can be seen in the results of Table 4, the test bearings of the various examples comprising mixed greases comprising a fluorine-based grease and a grease other than fluorine-based grease encapsulated therein exhibit a drastically prolonged seizing life as compared with the test bearings of the various comparative examples comprising greases other than fluorine-based grease encapsulated therein and almost the same rust preventing effect as that of the comparative examples.

[Test-2]

(Preparation of Test Grease)

A perfluoropolyether oil (kinetic viscosity at 40° C.: 60 mm²/s) was thoroughly mixed with a polytetrafluoroethylene powder in a proportion of 22% by weight. To the mixture was then added an inorganic rust preventive dissolved in the same perfluoropolyether oil as mentioned above. The mixture was then kneaded using a three-roll mill to prepare a fluorine-based grease.

As a grease other than fluorine-based grease, a urea-based grease was prepared by reacting an ether oil (kinetic viscosity at 40° C.: 100 mm²/s) having a diisocyanate incorporated therein with the same ether oil having an amine incorporated therein, heating the reaction product with stirring to obtain a semi-solid matter, adding a rust preventive having a metal sulfonate dissolved in the same base oil to the semi-solid matter, and then thoroughly stirring the mixture. During this procedure, adjustment was conducted such that the content of the diurea compound reached 25% by weight.

The fluorine-based grease and the grease other than fluorine-based grease were then mixed at various ratios, and then passed through a roll mill to obtain test mixed greases. The worked penetration of these test mixed greases were each adjusted to 285. As a grease having a fluorine-based grease ratio of 0 there was used the grease of Example 3-2'.

Figure 18:
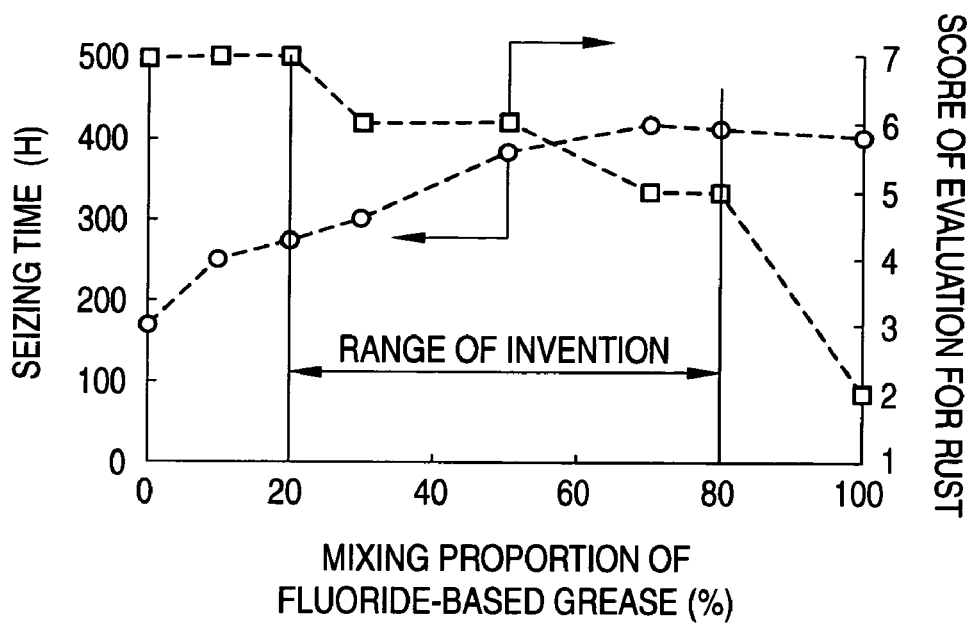
FIG. 18 is a graph illustrating the relationship between the mixing proportion of fluorine-based grease and the seizing time and scores of evaluation of rust obtained in examples.

Subsequently, the test mixed greases thus obtained were each subjected to moisture durability test and rust prevention test in the same manner as in Test-1. The results are graphically shown in FIG. 18. The greater the mixing ratio of the fluorine-based grease is, the longer is the seizing life but the more easily can occur rust. The encapsulation of a mixed grease comprising a fluorine-based grease in a proportion of from 20% to 80% by weight makes it possible to prolong the seizing life and prevent the occurrence of rust.

[Test-A]

A monoalkyltriphenylether oil having a kinetic viscosity of 60 mm²/sec at 40° C. and a vapor pressure of $1.3 \times 10^{-7}$ Pa at 25° C. ("Neoback S-3102", produced by MATSUMURA OIL RESEARCH CORP.), a paraffin-based hydrocarbon having a kinetic viscosity of 45 mm²/sec at 40° C. and a vapor pressure of $2.6 \times 10^{-4}$ Pa at 25° C. ("Neoback MR-100", produced by MATSUMURA OIL RESEARCH CORP.) and a mineral oil having a kinetic viscosity of 5 mm²/sec at 40° C. and a vapor pressure of not lower than 1 Pa at 25° C. were combined to prepare base oils having a vapor pressure ranging from $1.3 \times 10^{-7}$ Pa to 1.0 Pa at 25° C. To each of these base oils was then added lithium 12-hydroxystearate in an amount of 13% by weight based on the total amount of the grease. Thereafter, to the mixture was added dialkylphenylamine (oxidation inhibitor) in an amount of 3% by weight based on the total amount of the grease. The mixture was then passed through a three-roll mill to adjust the worked penetration thereof to NLGI No. 2. Thus, test greases were obtained.

Figure 19:
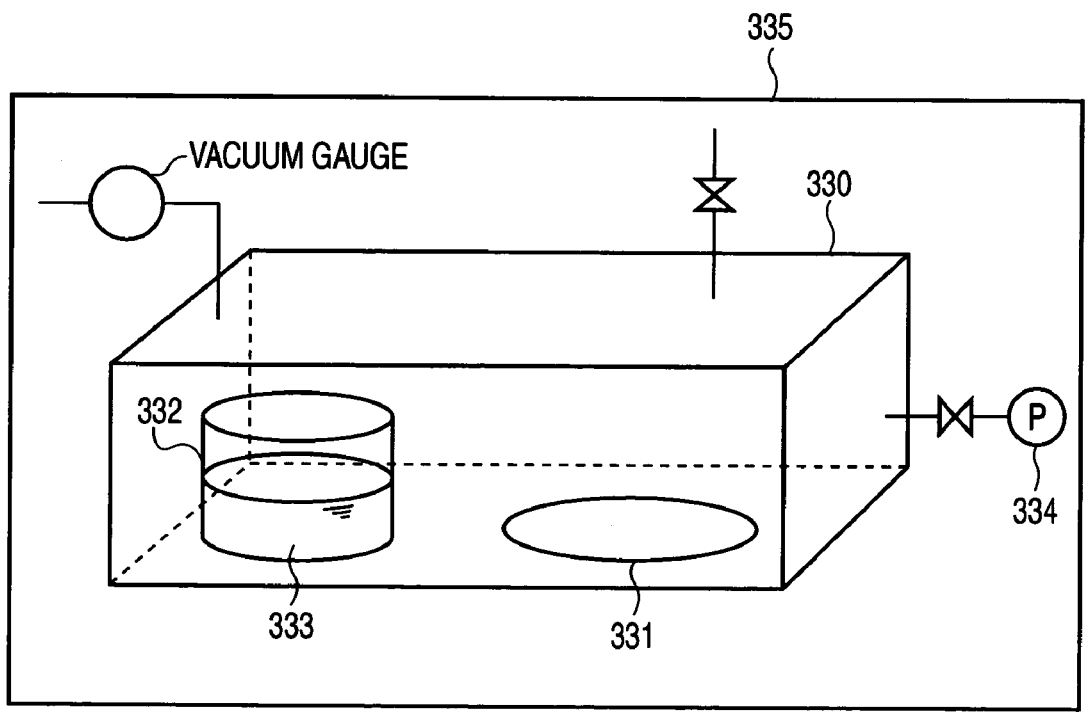
FIG. 19 is a schematic diagram illustrating an outgas evaluation device.

The test greases thus obtained were each evaluated for outgas properties using an outgas evaluation device shown in FIG. 19. For evaluation, in a sealable glass container 330 were received a laboratory dish 332 containing 10 ml of a test grease 333 together with a steel plate 331 having a diameter of 63.5 mm. Using a vacuum compressor, the air in the glass container was evacuated to keep the interior of the glass container in a predetermined degree of vacuum. Subsequently, the sealed glass container 330 was entirely put in a constant temperature tank 335 where it was then allowed to stand at 100° C. for 10 days. The steel plate 331 was then visually observed for surface conditions to see if there were oil spots. The evaluation was conducted according to the following criterion. Those showing a score of 2 were accepted.

|  | Score |
|---|---|
| No oil spots observed on the surface of steel plate: | 2 |
| Slight oil spots observed on the surface of steel plate: | 1 |
| Oil spots the surface of steel plate: | 0 |

Figure 20:
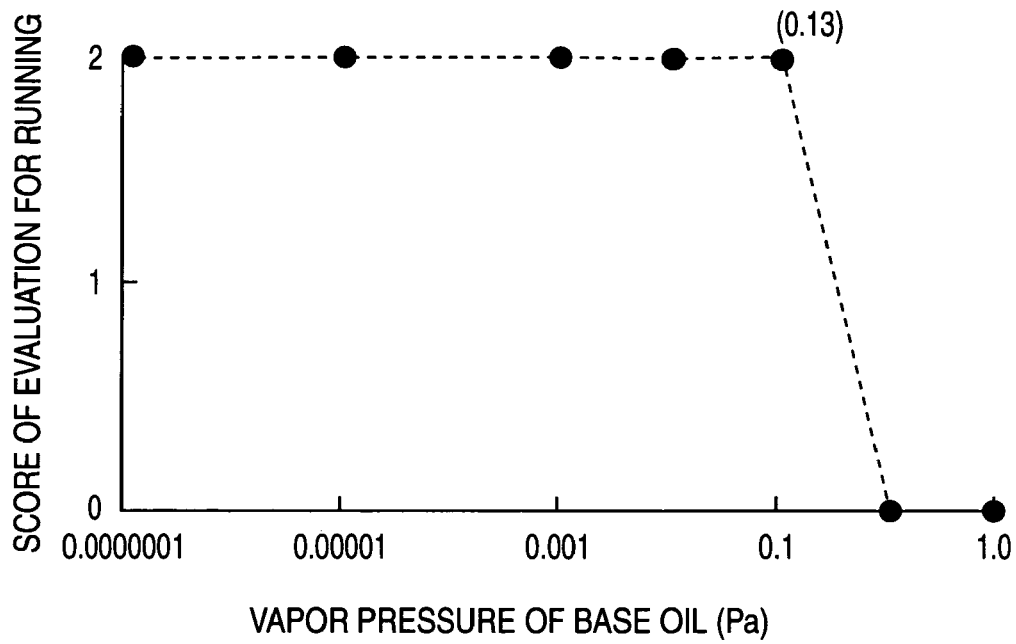
FIG. 20 is a graph illustrating the results of evaluation of oil running with varying base oil vapor pressures in examples.

The foregoing continuous procedure was conducted each for the test greases. The results are shown in FIG. 20. As can be seen in the results, all the test greases comprising a base oil having a vapor pressure of not higher than $1.3 \times 10^{-1}$ Pa at 25° C. have a score of 2.

[Test-B]

As set forth in Table 5 below, to tris(2-octyldodecyl)cyclopentane and the same monoalkyltriphenylether oil or paraffin-based hydrocarbon as used in Test-A were added cyclohexylamine and 4,4'-diphenylmethanediisocyanate in an amount of 18% by weight based on the total amount of the grease. The mixture was then reacted with stirring under heating to obtain gel-like matters. Thereafter, to these gel-like matters were each added an alkyldiphenylamine (oxidation inhibitor) in an amount of 3% by weight based on the total amount of the grease. The mixtures were each passed through a three-roll mill to adjust the worked penetration thereof to NLGI No. 2. Thus, test greases were obtained.

The various test greases thus obtained were each then evaluated for outgas properties using an outgas evaluation machine shown in FIG. 19. The test was conducted at 100° C. or 140° C. The test was conducted for 10 days. The results are set forth in Table 5.

TABLE 5

| Base oil | Tris(2-octyldodecyl) cyclopentane | Monoalkyl triphenyl ether oil | Paraffin-based hydrocarbon |
|---|---|---|---|
| Kinetic viscosity of base oil *1) | 112 | 60 | 45 |
| Vapor pressure of base oil *2) | $2.5 \times 10^{-10}$ | $1.3 \times 10^{-7}$ | $2.6 \times 10^{-4}$ |
| Thickening agent | | Alicyclic diurea | |
| Score of evaluation on outgas evaluation test (100° C.) | 2 | 2 | 2 |

TABLE 5-continued

| Base oil | Tris(2-octyldo decyl) cyclopentane | Monoalkyl triphenyl ether oil | Paraffin-based hydrocarbon |
|---|---|---|---|
| Score of evaluation on outgas evaluation test (140° C.) | 2 | 1 | 1 |

*1) Unit: mm$^2$/s (40° C.)
*2) Unit: Pa

As can be seen in Table 5, all the test greases comprising a base oil having a vapor pressure of not higher than $1.3 \times 10^{-1}$ Pa at 25° C. have a sore of 2 at 100° C. and thus exhibit low outgassing properties. In particular, tris(2-octyl-dodecyl)cyclopentane has a score of 2 even at a temperature as high as 140° C. and thus exhibits lower outgassing properties.

(Preparation of Test Greases)

As set forth in Table 6, base oils and thickening agents were used to prepare various test greases of examples and comparative examples. In the case where a urea compound was used as a thickening agent, to a base having diphenyl-methane-4,4'-diisocyanate dissolved therein was added a base oil having stearylamine dissolved therein and/or a base having cyclohexylamine dissolved therein. The mixture was heated to a temperature of about 70° C. with vigorous stirring to undergo reaction, and then heated to 160° C. The reaction was then terminated. After cooling, to the reaction mixture were then added an oxidation inhibitor and a rust preventive. The mixture was then passed through a three-roll mill where it was defoamed for finishing. To the other test greases were each added the same oxidation inhibitor and rust preventive as used above. All these test greases comprised a thickening agent, an oxidation inhibitor and a rust preventive incorporated therein in the same amount, respectively. These test greases were each then subjected to the following measurements and tests.

(Measurement of Percent Oil Separation)

The test grease was kept at 100° C. for 24 hours, and then measured for the separated amount of oil (JIS K2220). The results are set forth in Table 6.

(Seizing Test)

Figure 21:
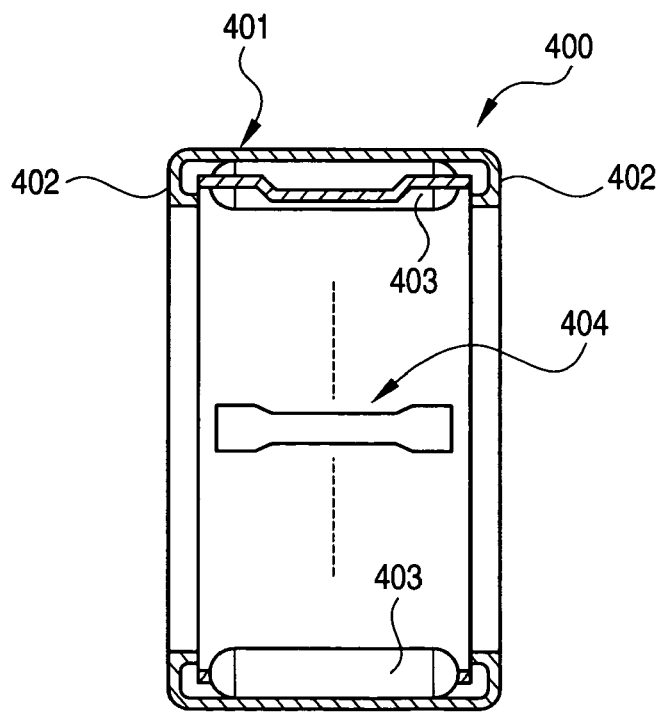
FIG. 21 is a schematic diagram illustrating a needle roller bearing used in seizing test in examples.

A shell-shaped needle roller bearing having the constitution shown in FIG. 21 produced by NSK Ltd. (inner diameter: 20 mm; outer diameter: 26 mm; width: 20 mm) was filled with the test grease to prepare a test bearing. The shell-shaped needle roller bearing 400 shown comprises a shell-shaped outer ring 401 obtained by bending a cylindrical body radially inward at the axial both ends 402 thereof to form a collar, a plurality of needle rollers 403 disposed all over the periphery of the shell-shaped outer ring 401, and a retainer 404 received in the shell-shaped outer ring 401 for rollably supporting the needle rollers 403. The test bearing was then continuously rotated at a rotary speed of 10,000 min$^{-1}$, a radial load of 1,470 N and a bearing temperature of 180° C. When the bearing temperature showed a rise of 15° C., it was considered that seizing had occurred. The rotation time required until seizing occurs (seizing life) was then measured. The results are set forth in Table 6 relative to that of the test bearing filled with the test grease of Example 5-1' as 1.

(Low Temperature Unusual Noise Test)

A contact type single-row deep groove ball bearing with rubber seal (inner diameter: 25 mm; outer diameter: 62 mm; width: 17 mm; see FIG. 1) produced by NSK Ltd. was filled with 3.4 g of the test grease to prepare a test bearing. The test bearing thus prepared was then continuously operated at a rotary speed of 1,800 min$^{-1}$, an axial load of 98 N and a bearing temperature of –20° C. The test bearing was then confirmed to see if any unusual noise had occurred. The results are set forth in Table 6.

(Evaporation Loss Test)

15 mg of the test grease was measured out and put in a container for thermogravimeter where it was then kept at 160° C. for 12 hours. The loss of the weight of the test grease was then measured. The results are set forth in Table 6.

As can be seen in the results of Table 6 above, all the test greases of Examples 5-1 to 5-6 comprising a base oil containing a diphenylsulfide alkyl-substituted compound in a proportion of not smaller than 30% by weight and a urea compound showed an oil separation of not greater than 1% by weight and a small evaporation loss. Further, the encapsulation of the test greases of Examples 5-1 to 5-6 makes it possible to drastically prolong the seizing life of the bearing and eliminate the occurrence of unusual noise at low temperatures. On the contrary, Comparative Example 5-2, comprising a thickening agent different from the inventive compound encapsulated therein, showed some oil separation and evaporation loss and a reduced seizing life. All Examples 5-4', 5-5' and 5-6' generally showed a great evaporation loss and were far poorer than Examples 5-1 to 5-6 in seizing life. Comparative Example 5-3 is poor in all properties except oil separation.

(Verification of Content of Diphenyl Sulfide in Base Oil)

Figure 22:
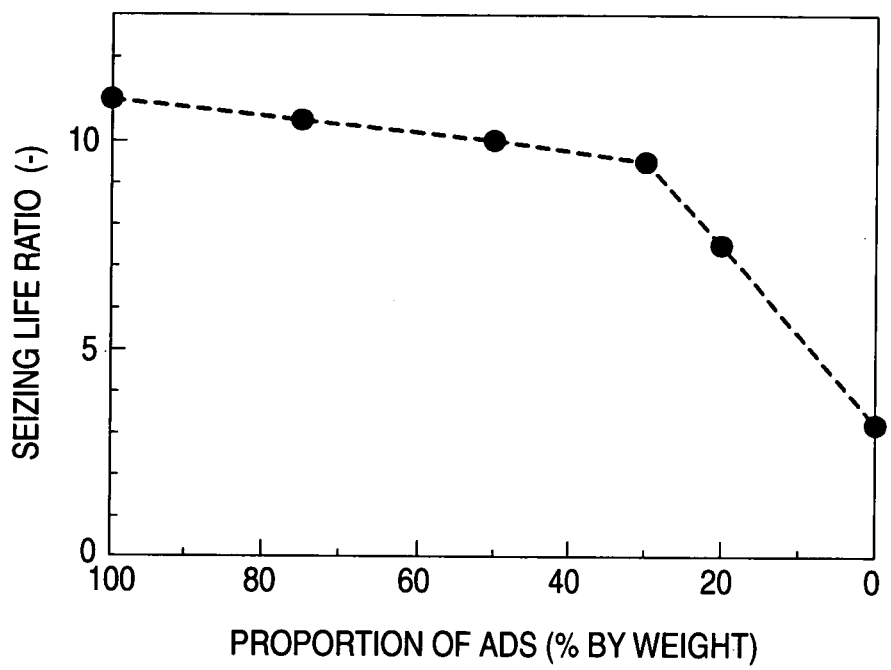
FIG. 22 is a graph illustrating the relationship between the proportion of ADS (diphenyl sulfide alkyl-substituted product) in base oil and the seizing life ratio obtained in examples.

Base oils comprising a diphenylsulfidealkyl-substituted compound (ADS) and an aromatic ester (AE) in various mixing ratios were used to prepare test greases according to the formulation of Example 5-2. These test greases were each then subjected to the aforementioned seizing life test. The results are shown in FIG. 22 relative to that of Example 5-2 (ADS: 50% by weight; AE: 50% by weight) as 10. In the graph of FIG. 22, the scale of 100 and 0 on the abscissa indicates ADS100% and AE100%, respectively.

As shown in FIG. 22, the greater the proportion of ADS is, the longer is the seizing life of the bearing. When there is incorporated ADS alone, the resulting seizing life is longest. Since a point of inflection was observed in the vicinity of ADS content of 30% by weight, it was confirmed that ADS needs to be incorporated in the base oil in an amount of not smaller than 30% by weight.

(Verification of Amount of Thickening Agent)

Test greases were prepared by varying the amount of the thickening agent according to the formulation of Example 5-1. These test greases were each then subjected to the aforementioned seizing life test. The results are shown in FIG. 23 relative to that of the test grease comprising the thickening agent incorporated therein in an amount of 10% by weight based on the total amount of the grease as 1.

Figure 23:
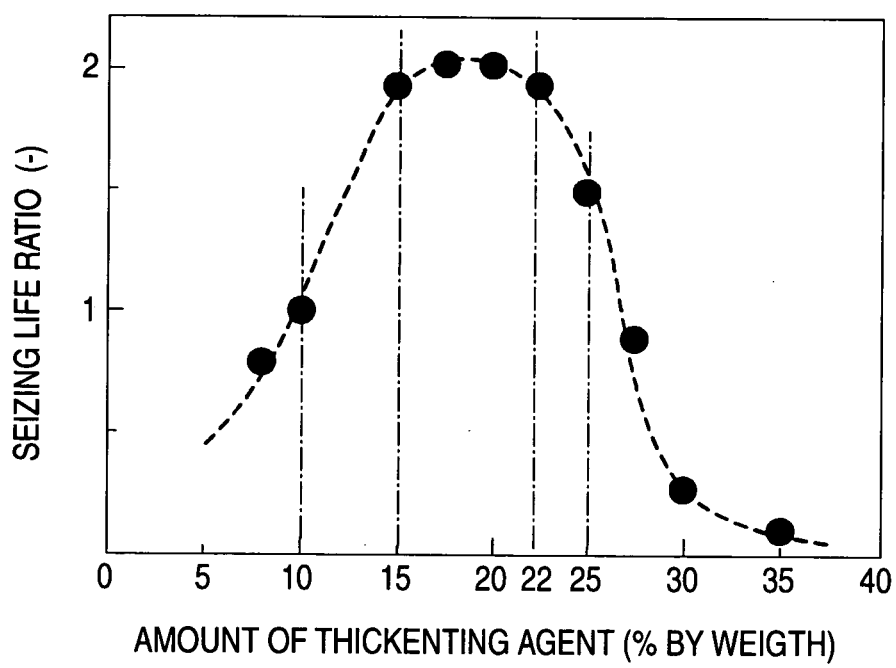
FIG. 23 is a graph illustrating the relationship between the amount of thickening agent and the seizing life ratio obtained in examples.

As shown in FIG. 23, when the amount of the thickening agent is from 10% to 25% by weight based on the total amount of the grease, a good seizing life can be obtained. When the amount of the thickening agent is from 15% to 22% by weight based on the total amount of the grease, the resulting seizing life is longest.

Example 6-1

A base oil comprising a diisocyanate incorporated therein (ether oil: kinetic viscosity at 40° C.: 100 mm²/sec) was reacted with the same kind of a base oil comprising an amine incorporated therein with stirring under heating to obtain a semi-solid matter. To the semi-solid matter was then added an amine-based oxidation inhibitor dissolved in the same kind of a base oil. The mixture was then thoroughly stirred. The semi-solid matter was then allowed to cool. To the semi-solid matter was then added carbon black (average particle diameter: 30 nm) in various amounts ranging from 0.1% to 10% by weight based on the total amount of the grease. The mixture was then passed through a roll mill to obtain various test greases having different carbon black contents.

During the aforementioned procedure, adjustment was made such that the sum of the amount of the urea compound as a thickening agent and carbon black was constant at 20% by weight based on the total amount of the grease depending on the added amount of the grease. The worked penetration of the test greases were each adjusted to NLGI No. 1 to 3.

Examples 6-1' and 6-2'

For comparison, test greases were prepared in the same manner as in Example 6-1 except that the amount of the urea compound and carbon black were 19.95% by weight and 0.05% by weight based on the total amount of the grease, respectively (Example 6-1'), and the amount of the urea compound and carbon black were 8% by weight and 12% by weight based on the total amount of the grease, respectively

Example 6-2'

The various test greases were each then subjected to the following tests.

(Highly Accelerated Test)

Figure 25:
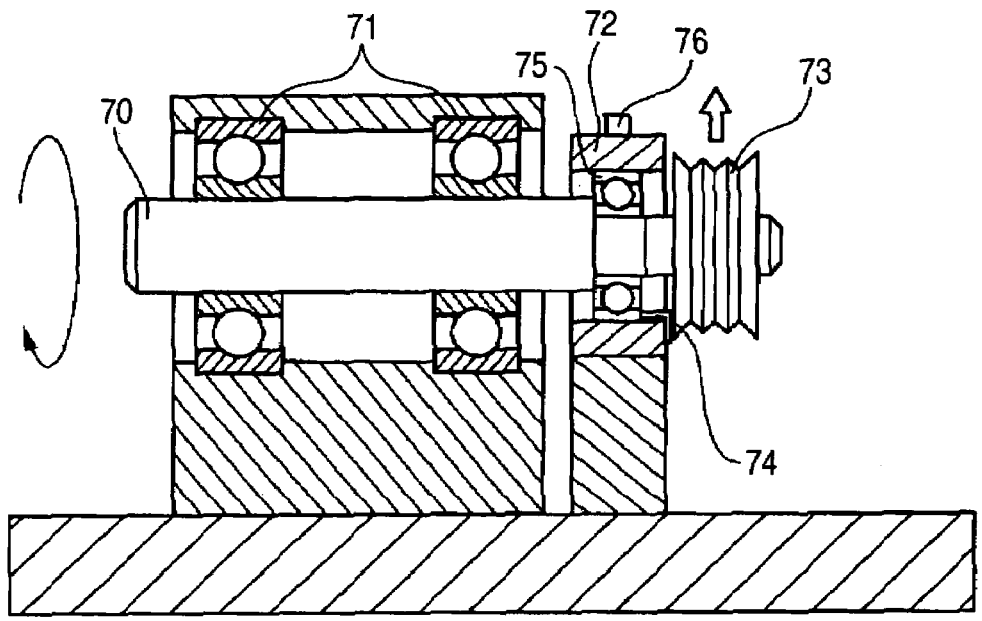
FIG. 25 is a schematic diagram illustrating a testing machine used in highly accelerated test.

A contact type single-row deep groove ball bearing with rubber seal having an inner diameter of 17 mm, an outer diameter of 47 mm and a width of 14 mm (see FIG. 1) was filled with 2.3 g of each of the various test greases to prepare test bearings which were each then evaluated for flaking life using a testing machine shown in FIG. 25. In the testing machine shown, the inner ring of the test bearing 75 is fitted on the end of the shaft 70 supported on a pair of supporting bearings 71, 71. The outer ring of the test bearing 75 is fixed to a holder 72. The rotational power from an engine (not shown) is transferred to the test bearing 75 via a pulley 73. The reference numeral 74 indicates a thermometer for the outer ring temperature. The reference numeral 76 indicates a heater for heating the outer ring. The test bearings were each continuously rotated at a rotary speed ranging from 2,400 to 13,300 min⁻¹, a pulley load of 1,560 N and room temperature. 500 hours were targeted. When flaking occurred on the running surface of the outer ring of the test bearing 75 to cause vibration or when 500 hours passed without causing flaking, the test was suspended. The test was conducted 10 times each for the test bearings. The probability of occurrence of flaking was calculated by the following equation.

Percent occurrence of flaking=(number of occurrence of flaking/number of tests)×100

(Moisture Seizing Test)

Figure 16:
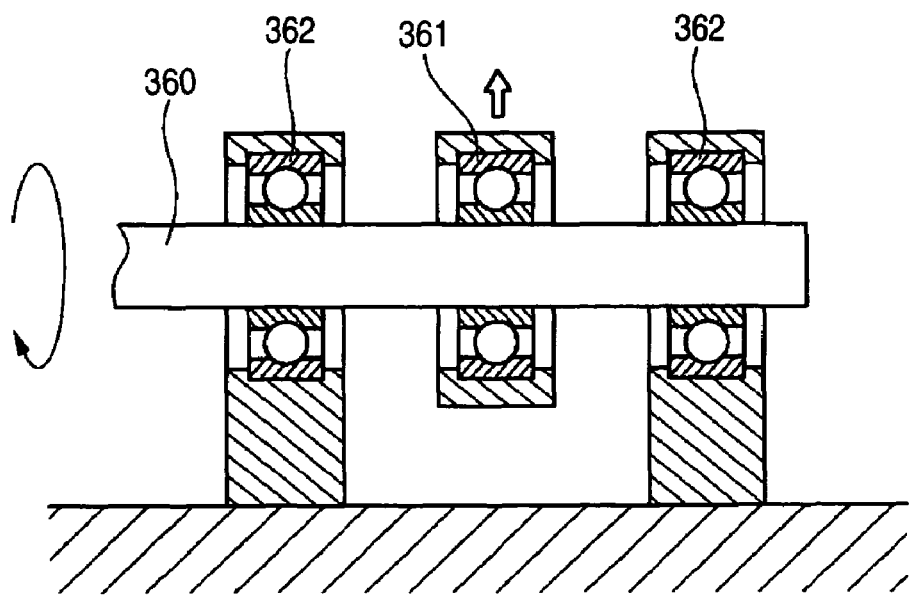
FIG. 16 is a schematic diagram illustrating a testing machine used in bearing endurance test (seizing endurance test, moisture endurance test) in examples.

A contact type single-row deep groove ball bearing with rubber seal having an inner diameter of 17 mm, an outer diameter of 47 mm and a width of 14 mm was filled with 1.0 g of the test grease to prepare a test bearing which was then evaluated for seizing life using a testing machine shown in FIG. 16. The testing machine shown comprises a rotary shaft 360 supported by a pair of supporting bearings 362, 362. The test bearing 361 is mounted on the central part of the rotary shaft 360. The testing machine is entirely received in a constant temperature and humidity tank (not shown) so that it can be entirely kept at a predetermined temperature. For this test, the rotary shaft 360 was rotated to rotate the test bearing 361 continuously at an inner ring rotary speed of 2,000 min⁻¹, a bearing temperature of 120° C., a radial load of 98 N and an axial load of 98 N. Every 24 hours, rotation was suspended to inject 0.3 ml of water into the interior of the bearing through a syringe. When seizing occurred to raise the temperature of the outer ring of the bearing to not lower than 130° C., the test was suspended. The test was conducted four times each for the test bearings. The measurements were then averaged to determine the seizing life. When the average time required until the temperature of the outer ring of the bearing reaches 130° C. was not smaller than 200 hours, the test bearing was accepted.

Figure 26:
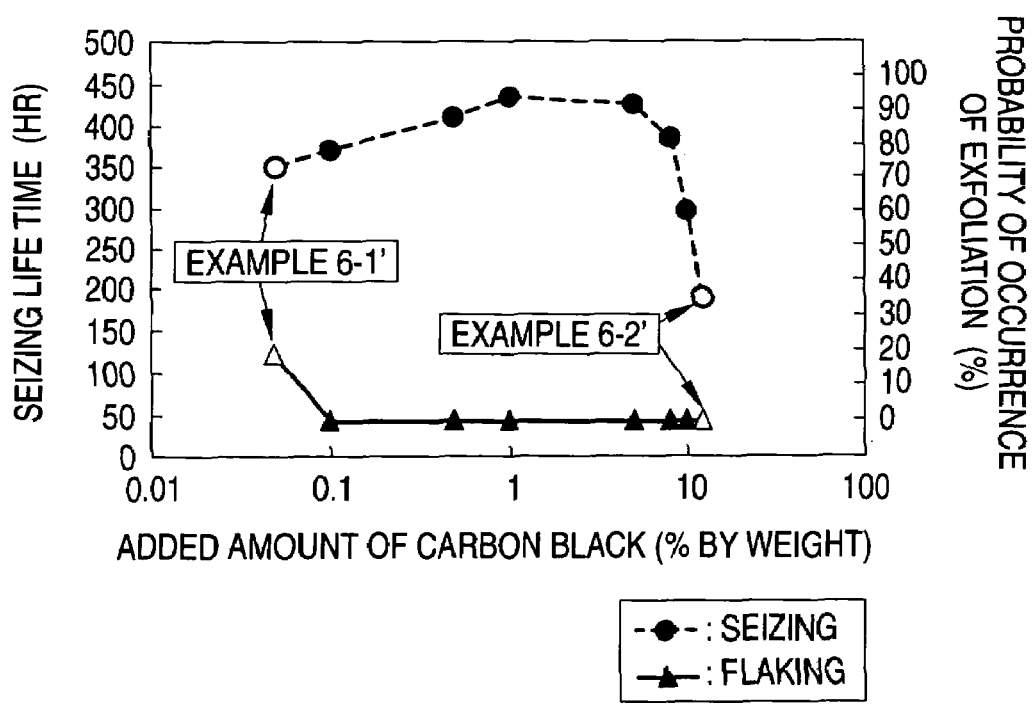
FIG. 26 is a graph illustrating the relationship between the added amount of carbon black and the seizing life and percent probability of occurrence of flaking obtained in examples.

FIG. 26 is a graph illustrating the results of the aforementioned highly accelerated test and moisture seizing test. The blank circle and triangle indicate the results on the test grease of Example 6-1' or Example 6-2'. As shown in FIG. 26, the encapsulation of the test grease comprising carbon black as an electrically-conductive material incorporated the reinin an amount of from 0.1% to 10% by weight according to the invention makes it possible to obtain a rolling bearing having a low probability of occurrence of flaking and a prolonged seizing life. On the contrary, when the content of carbon black falls below 0.1% by weight, flaking can easily occur. When the content of carbon black exceeds 10% by weight, the resulting rolling bearing can difficultly undergo flaking but exhibits deteriorated seizing life.

Example 6-2

Test greases having different carbon nanotube contents ranging from 0.1% to 10% by weight were prepared in the same manner as in Example 6-1 except that carbon nanotube (diameter: 0.7 to 2 nm; whole length: 10 to 30 μm) was used in stead of carbon black. In any case, the added amount of the urea compound was 20% by weight based on the total amount of the grease as calculated in terms of the sum of the amount of the urea compound and the carbon nanotube.

These test greases were each then subjected to the aforementioned highly accelerated test and moisture seizing test. As a result, similarly to the case of carbon black, the encapsulation of test greases comprising carbon nanotube incorporated therein in an amount of from 0.1% to 10% by weight made it possible to obtain rolling bearings which show a low probability of occurrence of flaking and an excellent seizing life as compared with Examples 6-1' and 6-2', which comprise carbon black.

Examples 6-3 to 6-5; Examples 6-3' and 6-4'

Figure 28:
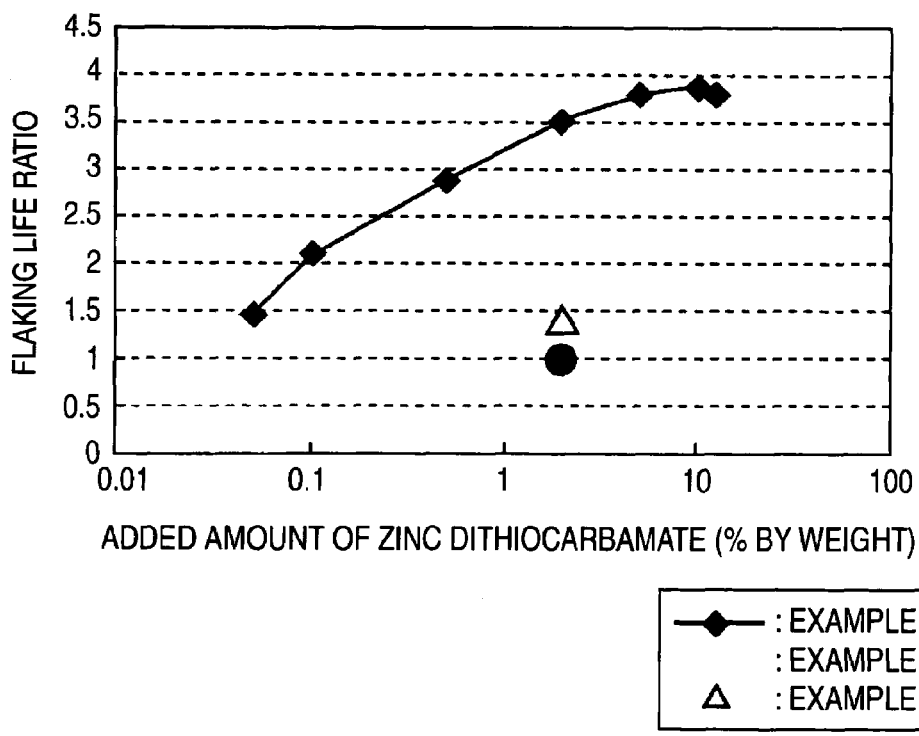
FIG. 28 is a graph illustrating the relationship between the added amount of zinc dithiocarbamate and the flaking life ratio obtained in examples.

As shown in Table 7, a base oil comprising a diisocyanate incorporated therein (ether oil: kinetic viscosity at 40° C.: 200 mm²/sec; or poly-α-olefin oil (PAO): kinetic viscosity at 40° C.: 100 mm²/sec) was reacted with the same kind of a base oil comprising an amine incorporated therein with stirring under heating to obtain a semi-solid matter. To the semi-solid matter was then added an amine-based oxidation inhibitor dissolved in the same kind of a base oil. The mixture was then thoroughly stirred. The semi-solid matter was then allowed to cool. To the semi-solid matter was then added barium sulfonate, zinc naphthenate, succinic acid half ester or dithiocarbaminate in various amounts such that the mixing ratio based on the total amount of the grease was as set forth in the table. The mixture was then passed through a roll mill to obtain various test greases.

total amount of the grease makes it possible to enhance the flaking life of the rolling bearing and hence prolong the life of the rolling bearing. FIG. 28 is a graph illustrating the flaking life of the test bearings of Examples 6-5 and 6-4' relative to that of the test bearing of Example 6-3'. As can be seen in FIG. 28, the encapsulation of the grease composition comprising zinc dithiocarbaminate incorporated therein in an amount of from 0.1% to 10% by weight based on the total amount of the grease makes it possible to enhance the flaking life of the rolling bearing and hence prolong the life of the rolling bearing.

TABLE 7

|  | Example 6-3 | Example 6-4 | Example 6-5 | Example 6-3' | Example 6-4' |
|---|---|---|---|---|---|
| Thickening agent | | | Urea compound | | |
| Base oil | PAO | PAO | Ether oil | PAO | Ether oil |
| Kinetic viscosity of base oil (mm²/s, 40° C.) | 100 | 100 | 200 | 100 | 200 |
| Barium sulfonate (wt-%) | 0 | 0 | 0 | 2 | 2 |
| Zinc naphthenate (wt-%) | 0.05 to 12 | 0 | 0 | 2 | 0 |
| Succinic acid half ester (wt-%) | 0 | 0.05 to 12 | 0 | 0 | 0 |
| Zinc dithiocarbamate (wt-%) | 0 | 0 | 0.05 to 12 | 0 | 2 |
| Worked penetration | | | NLGI No. 2 | | |

A contact type single-row deep groove ball bearing with rubber seal having an inner diameter of 17 mm, an outer diameter of 47 mm and a width of 14 mm was filled with 2.3 g of each of the various test greases to prepare test bearings which were each then subjected to the aforementioned highly accelerated test using a testing machine shown in FIG. 25 to evaluate the flaking life thereof. The test was conducted at a bearing rotary speed ranging from 2,400 to 13,300 min$^{-1}$, room temperature and a pulley load of 1,560 N. The time required until flaking occurs on the running surface of the outer ring of the test bearing 75 to cause vibration (flaking life) was the measured.

Figure 27:
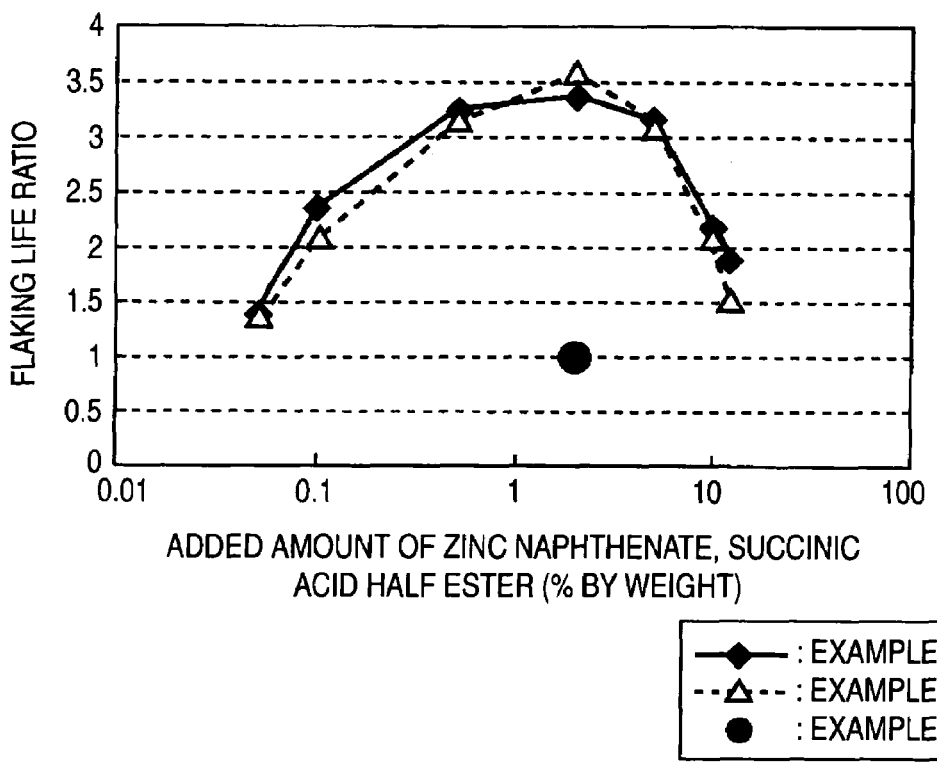
FIG. 27 is a graph illustrating the relationship between the added amount of zinc naphthenate and succinic acid half ester and the flaking life ratio obtained in examples.

FIG. 27 is a graph illustrating the flaking life of the test bearings of Examples 6-3 and 6-4 relative to that of the test bearing of Example 6-3'. As can be seen in FIG. 27, the encapsulation of the grease composition comprising zinc naphthenate or succinic acid half ester incorporated therein in an amount of from 0.1% to 10% by weight based on the (Test-I: Verification of Content of Urea Compound)

Figure 29:
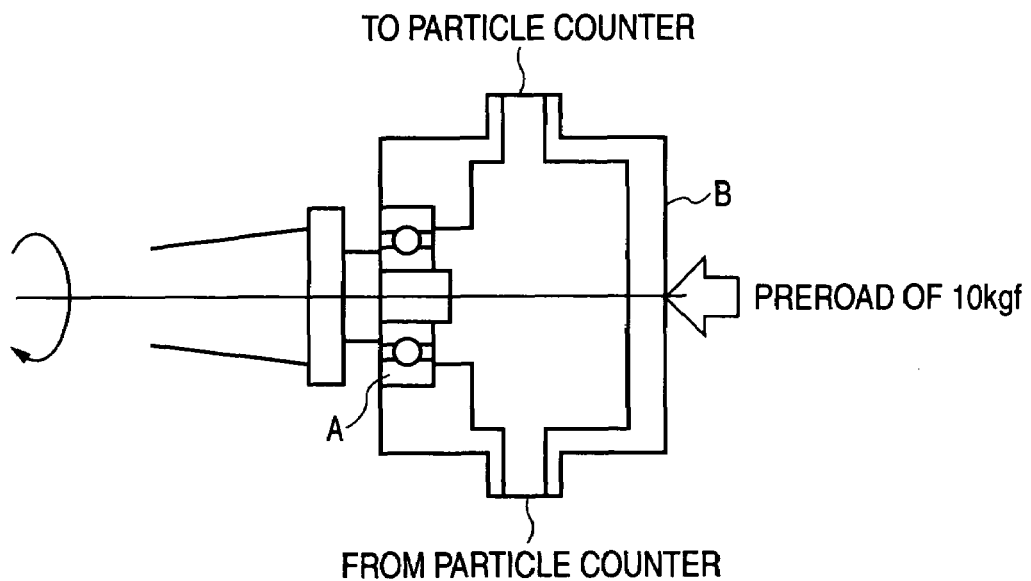
FIG. 29 is a schematic diagram illustrating a scattered amount measuring instrument.

A non-contact type deep groove ball bearing with rubber seal having an inner diameter of 5 mm, an outer diameter of 13 mm and a width of 4 mm was filled with 19 mg of each of greases A' to H' prepared according to the formulation set forth in Table 8 to prepare test bearings. The test bearing A was attached to a container B for a scattered amount measuring instrument shown in FIG. 29. The test bearing A was then rotated at an ambient temperature of 25° C., a pilot pressure of 15 N and an inner ring rotary speed of 2,000 min$^{-1}$ for 20 minutes. At the same time, purified air was passed through the container B. Using a particle counter (not shown) connected to the container B, the number of particles having a diameter of not smaller than 0.3 μm present in 0.01 cubic feet (CF) was then measured. The results are set forth in Table 8. Those having not greater than 500 particles/0.01 CF were accepted.

TABLE 8

| | Formulation of grease | | | | | | | |
|---|---|---|---|---|---|---|---|---|
| | Grease A' | Grease B' | Grease C' | Grease D' | Grease E' | Grease F' | Grease G' | Grease H' |
| Thickening agent | | | | Diurea compound | | | | |
| Amount of thickening agent (wt-%) | 15 | 20 | 25 | 30 | 35 | 40 | 13 | 43 |
| Base oil | | | | Ether oil | | | | |
| Kinetic viscosity of base oil | | | | 100 mm²/s, 40° C. | | | | |
| Worked penetration | 238 | 220 | 205 | 181 | 160 | 151 | 255 | 135 |
| Scattered amount (particles/0.01 CF) | 500 | 300 | 200 | 150 | 130 | 120 | 2,000 | 100 |

As can be seen in Table 8, when the content of the urea compound falls within the range of from 15% to 40% by weight based on the total amount of the grease, the scattered amount can be kept below 500 particles/0.01 CF.

(Test-II: Verification of Content of Additives)

To the greases A' to H' of Test-I were each added a dialkyldiphenylether (oxidation inhibitor) as an additive free of metal elements in an amount of 0.1%, 1% by and 4% by weight based on the total amount of the grease. These greases were each then subjected to measurement of scattered amount in the same manner as described above.

Figure 30:
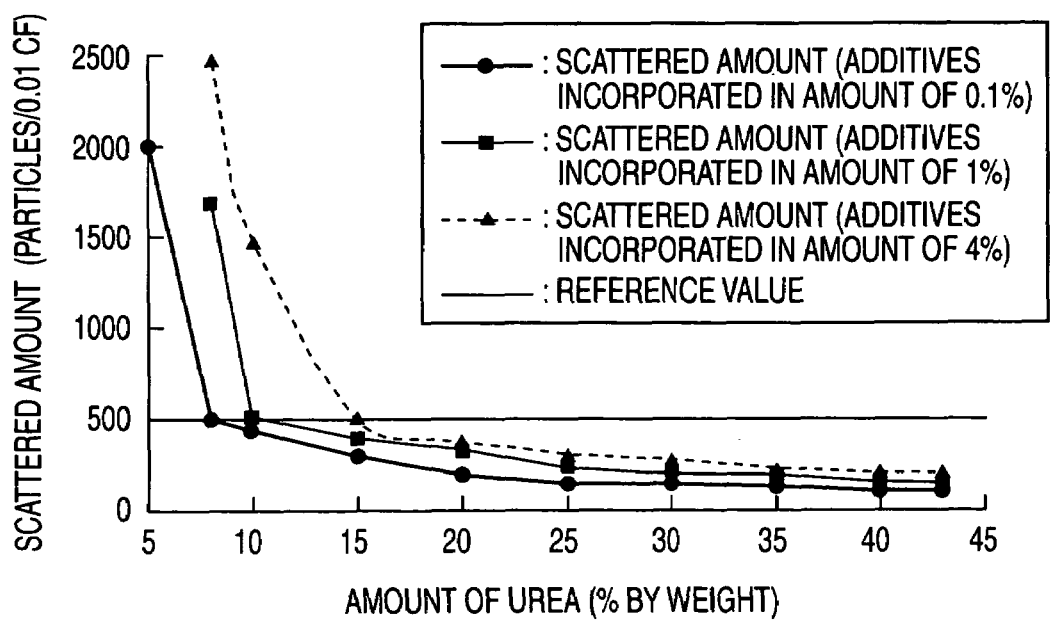
FIG. 30 is a graph illustrating the relationship between the content of urea compound and additive free of metal elements and the scattered amount obtained in examples.
Figure 31:
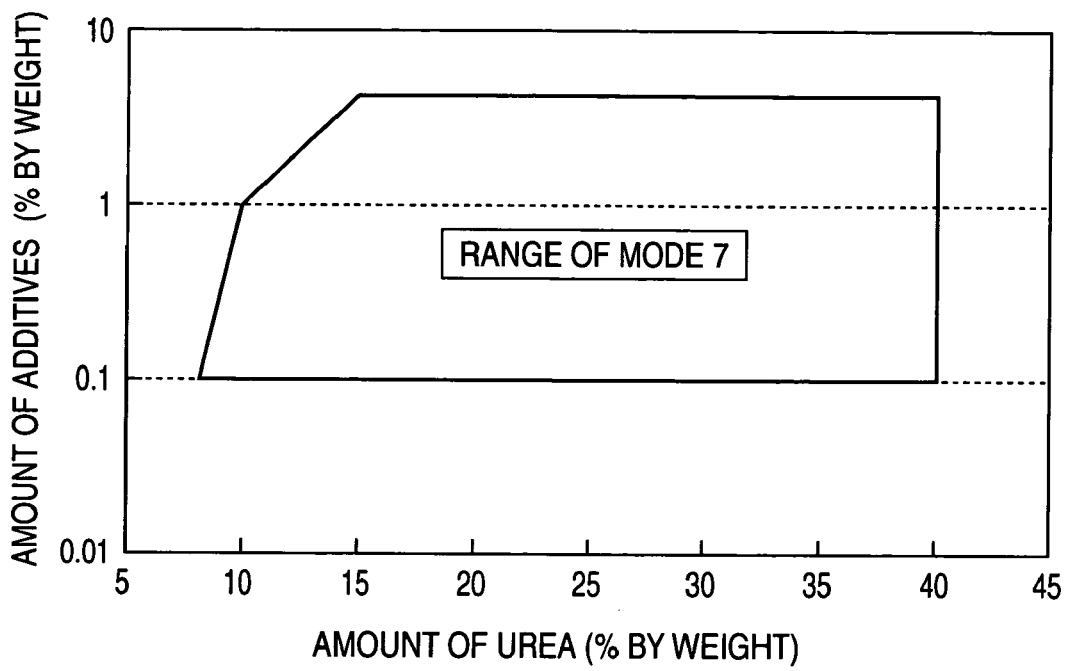
FIG. 31 is a graph illustrating the relationship between the content of urea compound and the content of additive free of metal elements obtained in examples.

The results are shown in FIG. 30. Even when the content of the urea compound is the same, the greater the added amount of additives is, the greater is the scattered amount. A range satisfying the scattered amount of not greater than 500 particles/0.01 CF is determined on the basis of these results. Within the frame shown in FIG. 31, i.e., when the content of the urea compound falls within the range of from 8% to 40% by weight and the content of the additives falls within the range of from 0.1% to 4% by weight, these requirements can be satisfied. The greater the content of the urea compound is, the greater can be the content of the additives.

(Test-α: Lithium Complex Soap-Based Grease)

Lithium complex soap-based greases A" to F" were prepared according to the formulation set forth in Table 9. These lithium complex soap-based greases were each then subjected to the following measurement of scattered amount (8-1) and seizing test (8-2).

(8-1) Measurement of Scattered Amount

A non-contact type deep groove ball bearing with rubber seal having an inner diameter of 5 mm, an outer diameter of 13 mm and a width of 4 mm was filled with 19 mg of each of the greases to prepare test bearings. The test bearing A was attached to a container B for a scattered amount measuring instrument shown in FIG. 29. The test bearing A was then rotated at an ambient temperature of 25° C., a pilot pressure of 15 N and an inner ring rotary speed of 3,600 min$^{-1}$ for 20 minutes. At the same time, purified air was passed through the container B. Using a particle counter (not shown) connected to the container B, the number of particles having a diameter of not smaller than 0.3 µm present in 0.01 cubic feet (CF) was then measured. The results are set forth in Table 9. Those having not greater than 500 particles/0.01 CF were accepted.

(8-2) Seizing Test

A contact type single-row deep groove ball bearing with rubber seal having an inner diameter of 17 mm, an outer diameter of 40 mm and a width of 12 mm was filled with 1.0 g of each of the greases to prepare test bearings. The test bearings were each then continuously rotated at an inner ring rotary speed of 6,000 min$^{-1}$, a radial load of 196 N and a bearing outer ring temperature of 140° C. The time required until the temperature of the outer ring of the bearing reaches 160° C. was then measured. The test was conducted four times each for the greases. The measurements were then averaged to determine the seizing life time. The results are set forth in Table 9 below. Those showing a seizing life time of not smaller than 1,000 hours were accepted.

TABLE 9

| | Lithium complex-based grease | | | | | |
|---|---|---|---|---|---|---|
| | Grease A" | Grease B" | Grease C" | Grease D" | Grease E" | Grease F" |
| Thickening agent | Lithium complex soap | | | | | |
| Amount of thickening agent (wt-%) | 20 | 25 | 30 | 35 | 18 | 38 |
| Base oil | Synthetic hydrocarbon oil | | | | | |
| Kinetic viscosity of base oil | 96 mm$^2$/s, 40° C. | | | | | |
| Initial worked penetration at 25° C. | 231 | 206 | 183 | 155 | 247 | 137 |
| Scattered amount (particles/0.01 CF) | 490 | 350 | 220 | 180 | 1,700 | 150 |
| Seizing life time (h) | 1,280 | 1,250 | 1,140 | 1,030 | 1,150 | 750 |

Figure 32:
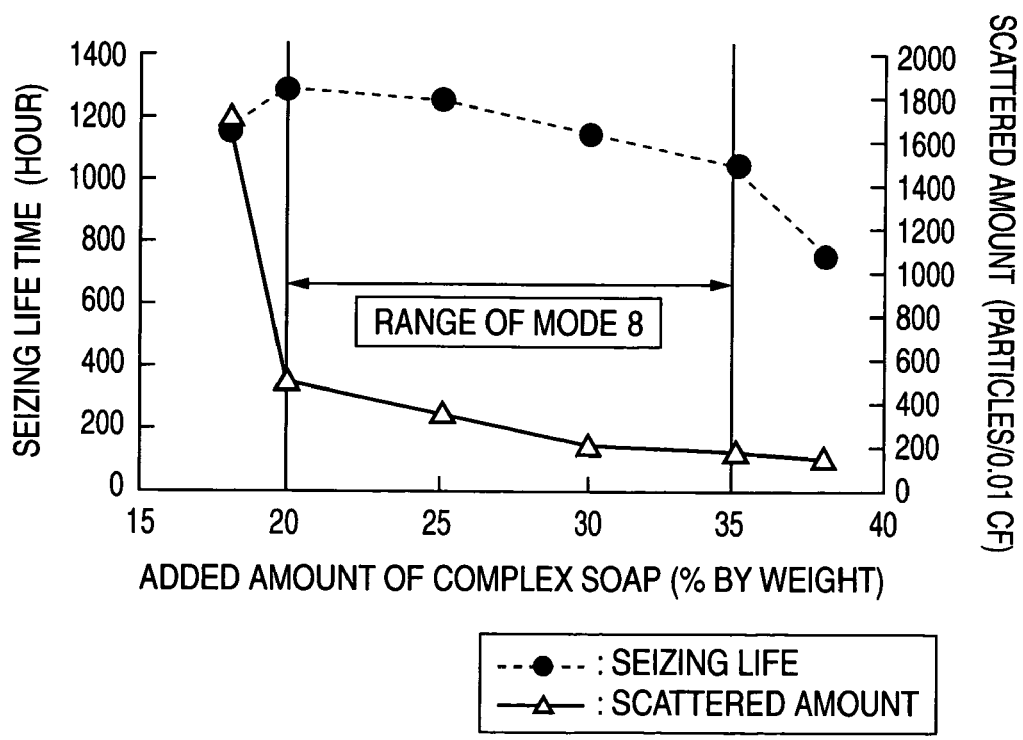
FIG. 32 is a graph illustrating the relationship between the added amount of lithium complex soap and the seizing life time and scattered amount obtained in examples.

The relationship between the added amount of lithium complex soap and the seizing life time and scattered amount is graphically shown in FIG. 32 on the basis of the results of Table 9 above. As can be seen in FIG. 32, when the added amount of lithium complex soap falls within the range of from 20% to 35% by weight, the seizing life is prolonged and the scattered amount is reduced.

(Test-β: Urea-Based Grease)

Figure 33:
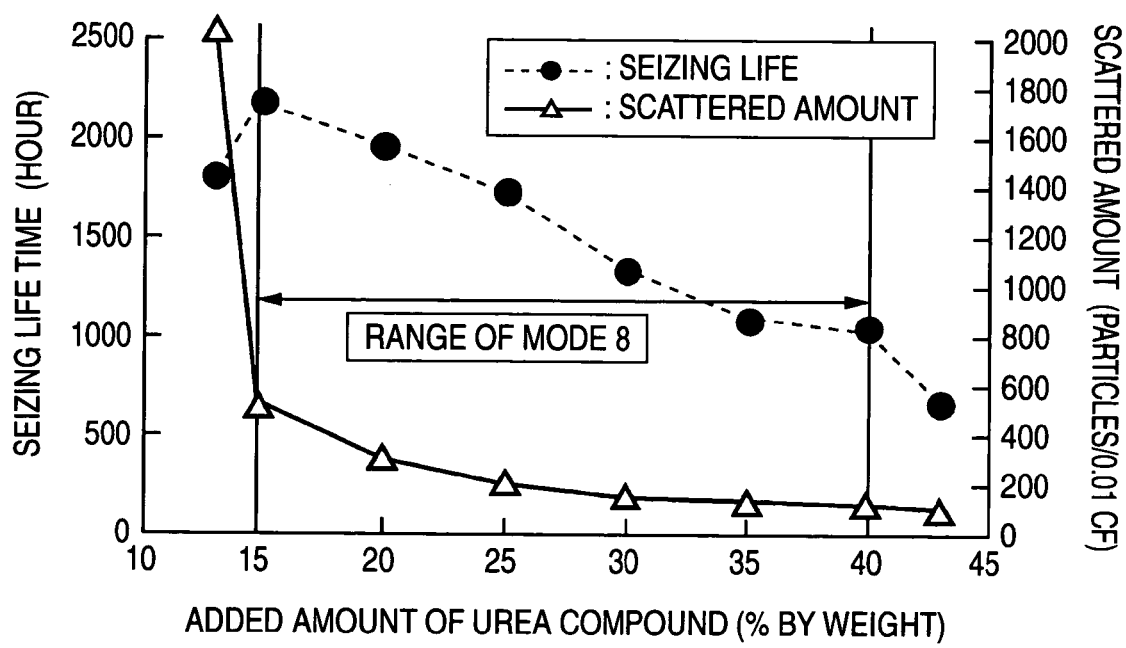
FIG. 33 is a graph illustrating the relationship between the added amount of urea compound and the seizing life time and scattered amount obtained in examples.

Urea-based greases G to N were prepared according to the formulation set forth in Table 10. These urea-based greases were each then subjected to the aforementioned measurement of scattered amount (8-1) and seizing test (8-2). The results are set forth in Table 10. The relationship between the added amount of urea compound and the seizing life time and scattered amount is graphically shown in FIG. 33. As shown in FIG. 33, when the added amount of the urea compound falls within the range of from 15% to 40% by weight, the seizing life is prolonged and the scattered amount is reduced.

TABLE 10

| | Urea-based grease | | | | | | | |
|---|---|---|---|---|---|---|---|---|
| | Grease G" | Grease H" | Grease I" | Grease J" | Grease K" | Grease L" | Grease M" | Grease N" |
| Thickening agent | | | | Diurea Compound | | | | |
| Amount of thickening agent (wt-%) | 15 | 20 | 25 | 30 | 35 | 40 | 13 | 43 |
| Base oil | | | | Ether oil | | | | |
| Kinetic viscosity of base oil | | | | 100 mm$^2$/s, 40° C. | | | | |
| Initial worked penetration at 25° C. | 238 | 220 | 205 | 181 | 160 | 151 | 255 | 135 |
| Scattered amount (particles/0.01 CF) | 500 | 300 | 200 | 150 | 130 | 120 | 2,000 | 100 |
| Seizing life time (h) | 2,130 | 1,920 | 1,690 | 1,310 | 1,080 | 1,010 | 1,770 | 650 |

Figure 34:
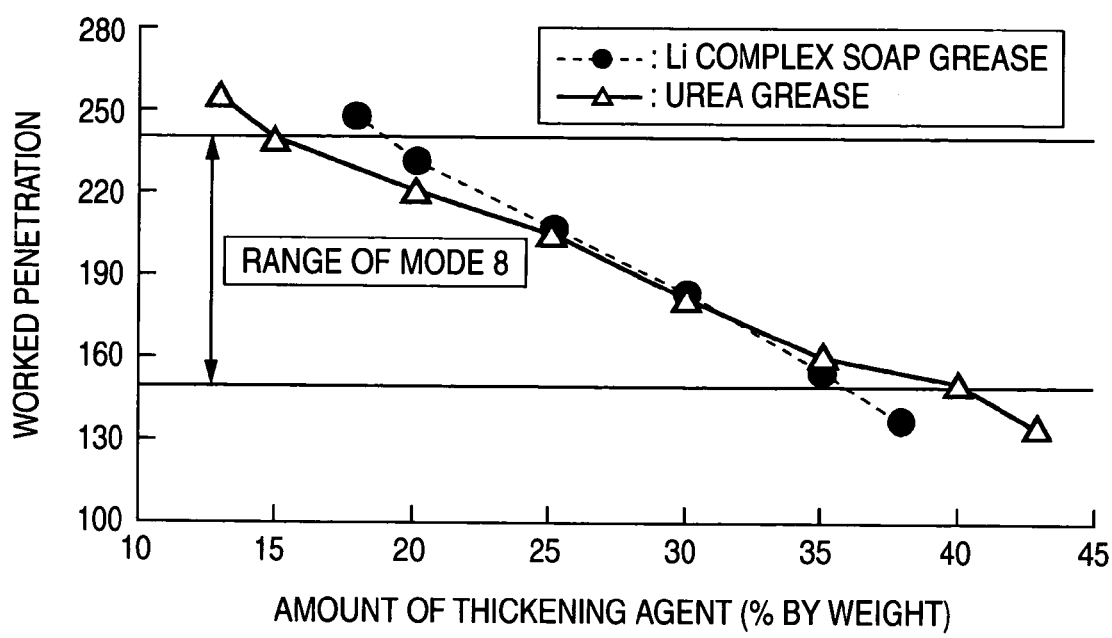
FIG. 34 is a graph illustrating the relationship between the amount of thickening agent and the worked penetration obtained in examples.

FIG. 34 is a graph illustrating the plot of the thickening agent content and the 25° C. initial worked penetration of the various greases prepared in the aforementioned test-α and test-β. The range within which both the requirements for scattered amount and seizing life can be satisfied was determined to be a 25° C. initial worked penetration of from 150 to 240, that is, range defined in the mode 8.

(Preparation of Test Greases)

As set forth in Table 11, base oils, thickening agents, metal deactivators and extreme pressure additives were mixed to prepare test greases. In Table 11, MoDTP (molybdenum dithiophosphate) is "SAKURA-LUBE 300", produced by ASAHI DENKA CO., LTD., MoDTC (molybdenum dithiocarbamate) is "SAKURA-LUBE 165", produced by ASAHI DENKA CO., LTD., ZnDTP is "KIKU-LUBE Z-112", produced by ASAHI DENKA CO., LTD., ZnDTC is "Vanlube AZ", produced by Vanderbuild Inc., and SbDTC is "Vanlube 73", produced by Vanderbuild Inc. All the test greases were adjusted to have a thickening agent content of 15% by weight based on the total amount of the grease and hence a worked penetration of 260.

(Bearing Durability Test)

A Type 6203DDU contact type single-row deep groove ball bearing with rubber seal having an inner diameter of 17 mm, an outer diameter of 40 mm and a width of 12 mm (produced by NSK Ltd.) (see FIG. 1) was filled with the test grease in an amount such that 40% of the space volume of the bearing was occupied to prepare a test bearing. The test bearing was then evaluated for seizing life using a testing machine shown in FIG. 16. The testing machine shown comprises a rotary shaft 360 supported by a pair of supporting bearings 362, 362. The test bearing 361 is mounted on the central part of the rotary shaft 360. The testing machine is entirely received in a constant temperature tank (not shown) so that it can be entirely kept at a predetermined temperature. For this test, the shaft 360 was rotated to rotate the test bearing 361 continuously at an inner ring rotary speed of 2,000 min$^{-1}$, an outer ring temperature of 120° C., a radial load of 1,000N and an axial load of 1,000 N. The time required until seizing occurs to raise the outer ring temperature to not lower than 130° C. (seizing life) was then measured. The results are set forth in Table 11 relative to that of Example 9-2 as 1.

(Rusting Test)

The test grease was spread over the surface of a wetting test specimen according to JIS K2246. Brine (NaCl: 5% by weight) was dropped onto the coated surface of the test specimen to prepare samples. These samples were each allowed to stand at 50° C. for 24 hours, and then visually observed for surface conditions. The rusting degree was then evaluated according to a 8-step criterion in which a score of 0 indicates rusting all over the surface of the sample and a score of 7 indicates no rusting. Scores of from 5 to 7 are considered no rusting and represented by ○ in Table 11 while scores of from 0 to 4 are considered rusting and represented by X in Table 11.

TABLE 11

| | Example 9-1 | Example 9-2 | Example 9-3 | Example 9-4 | Example 9-5 | Example 9-6 |
|---|---|---|---|---|---|---|
| Thickening agent | Alicyclic diurea | Alicyclic diurea | Alicyclic diurea | Alicyclic diurea | Alicyclic diurea | Alicyclic diurea |
| Base oil | Polyolester oil | Polyolester oil | Polyolester oil | Polyolester oil | Polyolester oil | Polyolester oil |
| Kinetic viscosity of base | 26 | 26 | 26 | 26 | 26 | 26 |
| Metal deactivator | Benzotriazole (1.0) | 2,5-Bis(n-dodecyl-dithio)-1,3,4-thiadiazole (0.1) | 2(n-Dodecyl-dithio) benzimidazole (0.5) | 2(n-Dodecyl-dithio) benoxazole (1.0) | 2(n-Dodecyl-dithio) benoxazole (1.5) | 2(n-Dodecyl-dithio) benoxazole (1.0) |
| Extreme pressure agent | MoDTP (2.0) | MoDTC (2.0) | ZnDTP (2.0) | ZnDTC (2.0) | SbDTC (2.0) | MoDTP (4.0) |
| Seizing life ratio | 1.5 | 1.0 | 1.3 | 1.4 | 1.5 | 1.4 |
| Results of rusting test | ○ | ○ | ○ | ○ | ○ | ○ |

TABLE 11-continued

|  | Example 9-1' | Example 9-2' | Example 9-3' | Example 9-4' |
|---|---|---|---|---|
| Thickening agent | Alicyclic diurea | Alicyclic diurea | Alicyclic diurea | Alicyclic diurea |
| Base oil | Polyolester oil | Polyolester oil | Polyolester oil | Polyolester oil |
| Kinetic viscosity of base | 26 | 26 | 26 | 26 |
| Metal deactivator | Benzo-triazole (0.01) | None | None | None |
| Extreme pressure agent | MoDTP (2.0) | MoDTC (2.0) | MoDTC (2.0) | ZnDTP (2.0) |
| Seizing life ratio | 0.8 | 0.7 | 0.7 | 0.6 |
| Results of rusting test | X | X | X | X |

Note 1)
Unit of kinetic viscosity of base oil: mm$^2$/s (40° C.)

Note 2)
The figure in the parenthesis in the column of metal deactivator and extreme pressure agent indicates added amount (% by weight based on the total amount of grease).

As can be seen in the results of Table 11, the test greases of Examples 9-1 to 9-6, which comprise a metal deactivator and a metal dithiocarbamate or a metal dithiophosphate incorporated therein in a predetermined amount, caused no rusting. The test bearings comprising these test greases encapsulated therein exhibited an enhanced abrasion resistance as well as an enhanced durability. On the contrary, the test grease of Example 9-1', which comprises a metal deactivator in an amount less than the predetermined value, caused some rusting. The test bearings comprising this test grease encapsulated therein exhibited a poor durability as compared with those of Examples 9-1 to 9-6. Further, the test greases of Examples 9-2' to 9-4', which comprise an extreme pressure agent alone incorporated therein, caused much rusting. The test bearings comprising these test greases encapsulated therein exhibited a drastically deteriorated durability.

(Verification of Added Amount of Metal Deactivator)

Figure 35:
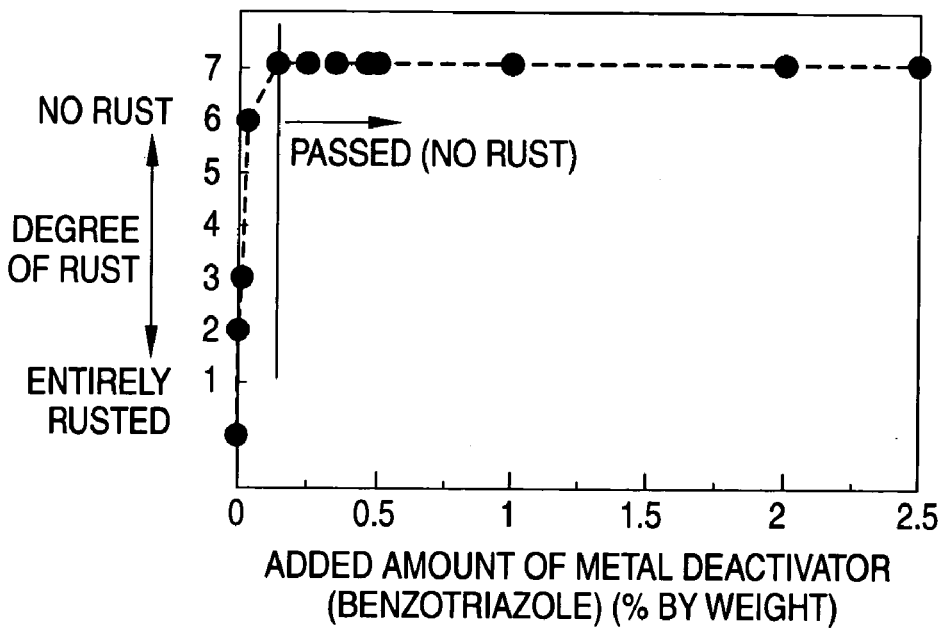
FIG. 35 is a graph illustrating the relationship between the added amount of metal deactivator and the occurrence of rust obtained in examples.
Figure 36:
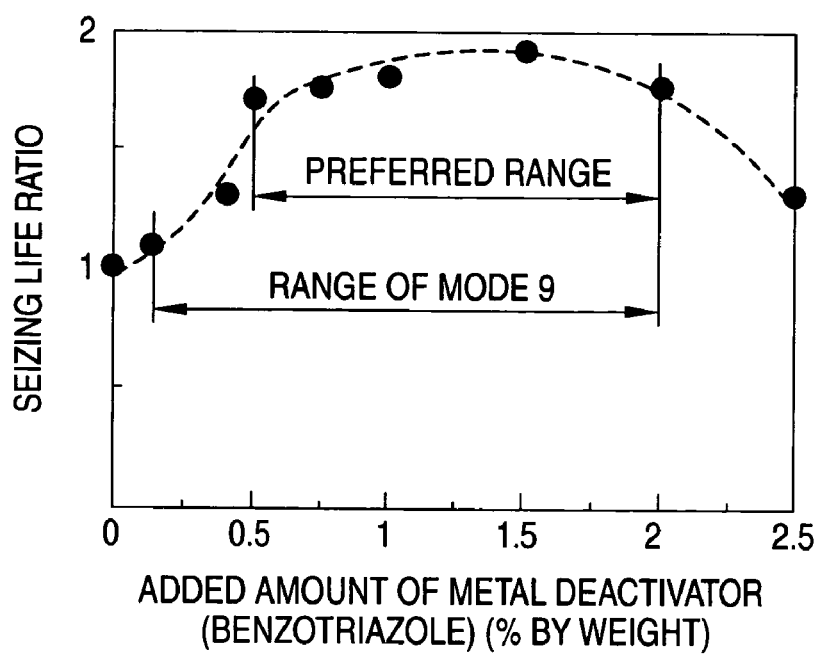
FIG. 36 is a graph illustrating the relationship between the added amount of metal deactivator and the seizing life obtained in examples.

To a base grease comprising 15% by weight of an alicyclic diurea and 2% by weight of ZnDTP incorporated in a polyolester oil (kinetic viscosity: 26 mm$^2$/s (40° C.)) was added benzotriazole in various amounts to prepare test greases. These test greases were each then subjected to rusting test and bearing durability test in the same manner as mentioned above. The results of rusting test are graphically shown in FIG. 35. The results of bearing durability test are graphically shown in FIG. 36. As can be seen in these results, when the added amount of benzotriazole falls within the range of from 0.2% to 2% by weight based on the total amount of the grease, the resulting greases exhibit an excellent rust preventing effect and the bearings comprising these greases encapsulated therein exhibit an enhanced durability.

(Verification of Added Amount of Extreme Pressure Additives)

Figure 37:
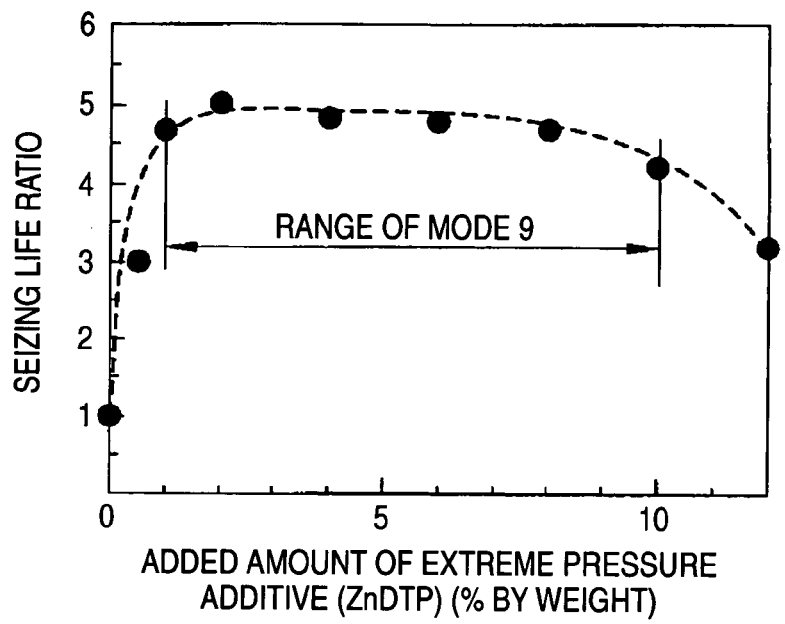
FIG. 37 is a graph illustrating the relationship between the added amount of extreme pressure additive and the seizing life obtained in examples.

To a base grease comprising 15% by weight of an alicyclic diurea and 1.5% by weight of benzotriazole incorporated in a polyolester oil (kinetic viscosity: 26 mm$^2$/s (40° C.)) was added ZnDTP in various amounts to prepare test greases. These test greases were each then subjected to bearing durability test in the same manner as mentioned above. The results are graphically shown in FIG. 37. As can be seen in these results, when the added amount of ZnDTP falls within the range of from 1% to 10% by weight based on the total amount of the grease, the resulting greases exert a great effect of improving durability.

As set forth in Table 12, base oils, thickening agents and additives were mixed to prepare various test greases. The worked penetration of these test greases are set forth in the same table. These values of worked penetration were obtained by adjusting the content of thickening agent. The pH value of these test greases are set forth in the same table. These test greases were each then subjected to the following moisture seizing durability test (10-1), rust prevention test (10-2) and rinsing water resistance test (10-3).

(10-1) Moisture Seizing Durability Test

A Type 6203 contact type ball bearing with seal having an inner diameter of 17 mm, an outer diameter of 40 mm and a width of 12 mm (produced by NSK Ltd.) (see FIG. 1) was filled with the test grease in an amount such that 40% of the space volume was occupied to prepare a test bearing. The test bearing was then subjected to moisture seizing durability test using a testing machine shown in FIG. 16. The testing machine shown comprises a rotary shaft 360 supported by a pair of supporting bearings 362, 362. The test bearing 361 is mounted on the central part of the rotary shaft 360. The testing machine is entirely received in a constant temperature and humidity tank (not shown) so that it can be entirely kept at a predetermined temperature. For this test, the test bearing 361 was continuously rotated at an outer ring temperature of 120° C., a radial load of 100 N, an axial load of 100 N and an inner ring rotary speed of 2,000 min$^{-1}$. Every 24 hours, rotation was suspended to inject 0.3 ml of water into the interior of the bearing through a syringe. The test bearing 361 was then again rotated under the same conditions. When any unusual noise occurred, the bearing was not able to be started or the motor current was excessive after 1 minute from starting, it was judged that the bearing had undergone seizing (torque rise). The rotation time thus elapsed was then determined. The test was conducted three times for each of the test greases. The measurements were then averaged to determine the seizing life. The results are set forth in Table 12 relative to that of Example 10-1' as 1.

(10-2) Rust Prevention Test

A Type 6303 contact type ball bearing with seal (produced by NSK Ltd.; inner diameter: 17 mm, outer diameter: 47 mm, width: 14 mm; see FIG. 1) was filled with the test grease in an amount such that 50% of the space volume was occupied to prepare a test bearing. The test bearing was then subjected to running-in at a rotary speed of 1,800 min$^{-1}$ for 30 seconds. A 0.5% brine was then injected into the interior of the bearing in an amount of 0.5 ml through a syringe. The test bearing was then again subjected to running-in at a rotary speed of 1,800 min$^{-1}$ for 30 seconds. Subsequently, the test bearing was allowed to stand in a constant temperature and humidity tank which had been kept at 80° C. and 100% RH for 24 hours, disassembled, and then visually observed for the occurrence of rust on the race. The occurrence of rust was judged according to from a score of 0 (no rusting) to a score of 7 (much rusting). The results are set forth in Table 12 with scores of from 0 to 4 being considered no rusting and scores of from 5 to 7 being considered rusting.

(10-3) Rinsing Water Resistance Test

Figure 38:
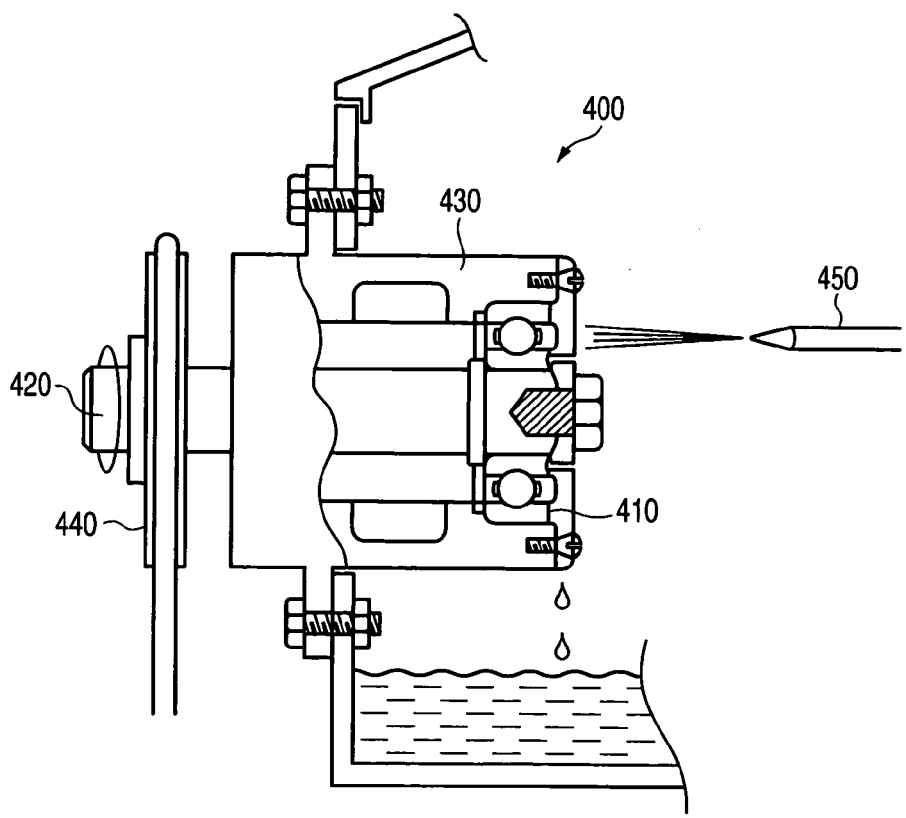
FIG. 38 is a graph illustrating a schematic diagram illustrating a testing machine used in rising water resistance test in examples.

A Type 6204 contact type sealed deep groove ball bearing with plastic retainer and rubber seal (inner diameter: 20 mm; outer diameter: 47 mm; width: 14 mm; see FIG. 1)(produced by NSK Ltd.) was filled with 4 g of the test grease to prepare a test bearing. Using a testing machine 400 shown in FIG. 38, the test was conducted according to JIS K2220 5.12. In some detail, the test bearing 410 attached to the shaft 420 was received in a housing 430. The shaft 420 was then continuously rotated at a rotary speed of 600 min$^{-1}$ via a pulley 440 for 1 hour. During this procedure, 79° C. distilled water was sprayed onto the test bearing 410 through a water spray nozzle 450 at a rate of 5 ml/sec. The difference in weight between from rotation and after rotation (rinsing water resistance) was then determined. The results are set forth in Table 12.

TABLE 12

| | Example 10-1 | Example 10-2 | Example 10-3 | Example 10-4 | Example 10-5 | Example 10-6 | Example 10-7 |
|---|---|---|---|---|---|---|---|
| Thickening agent | Diurea | Diurea | Diurea | Diurea | Diurea | Diurea | Diurea |
| Base oil | Ether oil | Ether oil | Synthetic hydrocarbon oil | Synthetic hydrocarbon oil | Synthetic hydrocarbon oil | Synthetic hydrocarbon oil | Ester oil |
| Kinetic viscosity of base oil (mm$^2$/s, 40° C.) | 100 | 100 | 68 | 68 | 68 | 68 | 33 |
| Additives  Alkylamine (1) | 1.0 | 1.0 | 1.0 | — | 1.0 | — | 1.0 |
| Alkylamine (2) | — | — | — | 1.0 | — | — | — |
| High basicity phenate | — | — | — | — | 0.5 | — | — |
| Basic salicylate | — | 0.5 | — | — | — | — | — |
| Sulfol Ca-45 | — | — | — | — | — | 1.0 | — |
| Metal sulfonate | — | — | — | — | — | — | — |
| Worked penetration (25° C.) | 250 | 250 | 255 | 255 | 255 | 250 | 250 |
| pH | 9.3 | 9.8 | 9.1 | 9.0 | 9.3 | 9.5 | 9.2 |
| Seizing durability life ratio | 2.5 | 2.0 | 2.5 | 2.5 | 2.5 | 2.0 | 2.0 |
| Rinsing water resistance (wt-%) | 1.4 | 1.4 | 0.4 | 0.4 | 0.3 | 0.4 | 1.5 |
| Rust prevention test | No rusting | No rusting | No rusting | No rusting | No rusting | No rusting | No rusting |

| | Example 10-1' | Example 10-2' | Example 10-3' |
|---|---|---|---|
| Thickening agent | Diurea | Diurea | Li soap |
| Base oil | Ether oil | Ether oil | Ester oil |
| Kinetic viscosity of base oil (mm$^2$/s, 40° C.) | 100 | 100 | 33 |
| Additives  Alkylamine (1) | — | — | — |
| Alkylamine (2) | — | — | — |
| High basicity phenate | — | — | — |
| Basic salicylate | — | — | — |
| Sulfol Ca-45 | — | — | — |
| Metal sulfonate | — | 1.0 | 1.0 |
| Worked penetration (25° C.) | 265 | 265 | 265 |
| pH | 5.2 | 5.1 | 10.1 |
| Seizing durability life ratio | 1.5 | 1.0 | 0.8 |
| Rinsing water resistance (wt-%) | 1.5 | 2.0 | 5.3 |
| Rust prevention test | Rusting | No rusting | No rusting |

Note 1)
Alkylamine (1): Alkylamine represented by the general formula (2)
Note 2)
Alkylamine (2): Alkylamine represented by the general formula (3)
Note 3)
Sulfol Ca-45: Basic metal sulfonate produced by MATSUMURA OIL RESEARCH CORP.

As can be seen in the results of Table 12 above, the test greases of Examples 10-1 to 10-7 are all basic. The test bearings comprising these test greases encapsulated therein exhibited a prolonged seizing durability life and excellent rust preventing effect and rinsing water resistance as compared with the test bearings of Examples 10-1' to 10-3'. On the contrary, the test bearings of Examples 10-2' and 10-3', which comprise test greases comprising an ordinary metal sulfonate incorporated as a rust preventive therein, exhibited some rust preventing effect but deteriorated seizing durability life and rinsing water resistance. In particular, the test grease of Example 10-3' exhibits some basicity but deteriorated seizing life and rinsing water resistance.

(4) Verification of Content of Basic Alkylamine

Test greases were prepared according to the formulation of Example 10-1 except that the content of alkylamine was changed. These greases were each then subjected to moisture seizing durability life test (10-1) and rinsing water resistance test (10-3) in the same manner as mentioned above. The results are graphically shown in FIG. 39.

Figure 39:
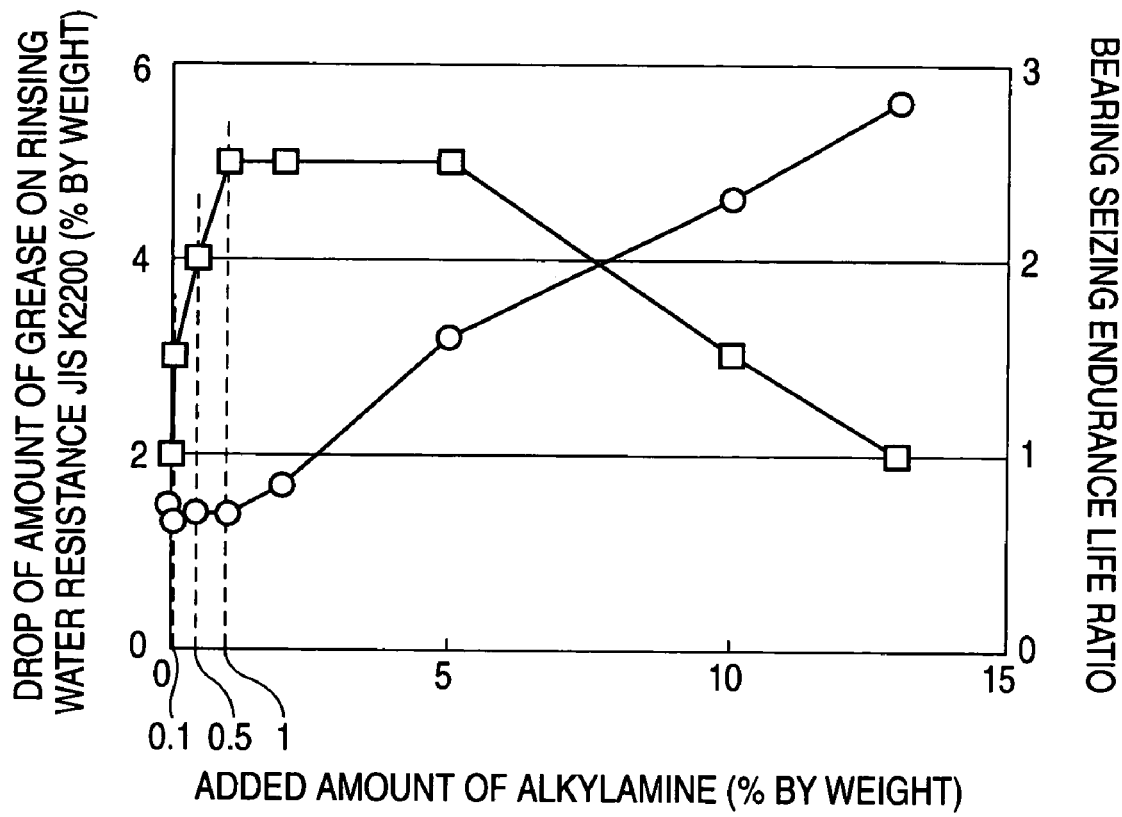
FIG. 39 is a graph illustrating the relationship between the added amount of alkylamine and the rinsing water resistance and seizing life ratio obtained in examples.

As can be seen in FIG. 39, the greater the content of alkylamine is, the lower is the rinsing water resistance. This is because the amine is hydrophilic and thus softens the grease when it absorbs water, causing the increase of leakage. When the content of alkylamine goes beyond a certain value, the grease leakage increases, deteriorating the seizing durability life. Accordingly, the content of the basic alkylamine is from 0.1% to 10% by weight, preferably from 0.5% to 5% by weight, particularly from 1% to 5% by weight. This can apply to organic metal salt and organic acid metal salt.

As mentioned above, in accordance with the rolling bearing of the invention comprising a specific grease encapsulated therein, grease leakage can be prevented. The incorporation of the rolling bearing of the invention in the compressor for fuel cell system makes it possible to prevent maloperation of the entire fuel cell system due to grease leakage. Thus, the rolling bearing of the invention is useful particularly for fuel cell system for automobile drive.

Further, in accordance with the invention, the encapsulation of a grease composition comprising a perfluoroalkylether oil as a base oil, a polytetrafluoroethylene as a thickening agent, and a magnesium compound or a vapor phase inhibitor incorporated therein makes it possible to obtain a rolling bearing having excellent heat resistance and rust preventing effect and a prolonged life. Further, a compressor for fuel cell system comprising this rolling bearing can operate in a stable manner even when water vapor penetrates thereinto. Accordingly, the fuel cell system comprising this compressor can make stable electricity generation over an extended period of time.

Moreover, in accordance with the invention, a rolling bearing having excellent rustproofness and seizing resistance which can be used in an atmosphere having an acidic matter present therein can be obtained. Further, a compressor for fuel cell system comprising this rolling bearing which can operate in a stable manner over an extended period of time and a fuel cell system comprising this compressor which can make stable electricity generation over an extended period of time can be obtained.

Further, in accordance with the invention, the heat resistance and water resistance of the rolling bearing can be enhanced. Thus, the incorporation of this rolling bearing in the compressor for fuel cell system makes it possible to prolong the life of the compressor for fuel cell system and even the fuel cell system.

Moreover, in accordance with the invention, the encapsulation of a grease comprising a base oil having a vapor pressure of not higher than $1.3 \times 10^{-1}$ Pa at 25° C. makes it possible to obtain a rolling bearing having little dusting. Thus, this rolling bearing can be used as a rolling bearing for fuel cell system to be incorporated in the compressor for fuel cell system.

Further, in accordance with the invention, the encapsulation of a grease comprising a urea compound incorporated in a base oil containing an alkyl-substituted diphenylsulfide in a proportion of 30% by weight makes it possible to obtain a rolling bearing which can operate in a stable manner over an extended period of time even under severe working conditions such as high temperature, high speed, high load and violent vibration and generates little unusual noise even when used at low temperatures. This rolling bearing is useful particularly for compressor for fuel cell system. The incorporation of this rolling bearing makes it possible to obtain a compressor for fuel cell system and a fuel cell system having a prolonged life.

Moreover, in accordance with the invention, the encapsulation of a grease composition containing an electrically-conductive material or a grease composition substantially free of sulfonate makes it possible to obtain a rolling bearing which is little subject to flaking and exhibits an excellent durability. This rolling bearing can be used as a rolling bearing for fuel cell system to be incorporated in the compressor for fuel cell system.

Further, in accordance with the invention, the encapsulation of a grease composition comprising a urea compound and additives free of metal elements incorporated therein in a predetermined amount makes it possible to obtain a rolling bearing for fuel cell having little dusting which doesn't deteriorate the reaction efficiency of fuel cell.

Moreover, in accordance with the invention, the encapsulation of a grease composition having an initial worked penetration of from 150 to 240 at 25° C. makes it possible to obtain a rolling bearing for fuel cell having little dusting which exhibits an excellent durability.

Further, in accordance with the invention, as the grease to be encapsulated in the rolling bearing there is used one comprising specific metal deactivator and extreme pressure additives incorporated therein in a predetermined amount. Thus, the rustproofness, corrosion resistance and abrasion resistance of the rolling bearing can be drastically enhanced, making it possible to obtain a rolling bearing useful particularly for compressor for fuel cell system. Moreover, a compressor for fuel cell system and a fuel cell system having a prolonged life can be obtained.

Further, in accordance with the invention, a rolling bearing suitable for use requiring acid resistance in addition to lubricating properties and water resistance such as rolling bearing for fuel cell to be incorporated in the compressor for fuel cell system having excellent lubricating properties and water resistance suitable for use in an atmosphere having an acidic matter present therein can be used. Moreover, a compressor for fuel cell system comprising this rolling bearing which can operate in a stable manner over an extended period of time and a fuel cell system comprising this compressor which can make stable electricity generation over an extended period of time can be obtained.

The invention claimed is:

1. A rolling bearing in combination with a fuel cell system, said rolling bearing having a fluorine-based grease containing a fluororesin and a fluorine-based oil, wherein the kinetic viscosity of the fluorine-based oil at 40° C. is from 20 mm²/s to 400 mm²/s, wherein there is encapsulated a grease, other than the fluorine-based grease, having a vapor pressure of not higher than $1.3 \times 10^{-1}$ Pa at 25° C. as a base oil, and wherein the fuel cell system comprises at least a stack of fuel cells and a compressor for transporting various fluids at the compressor.

2. The rolling bearing as defined in claim 1, wherein the fluorine-based grease is a grease composition comprising a perfluoroalkylether as a base oil, a polytetrafluoroethylene as a thickening agent and at least one of a magnesium compound and a vapor phase inhibitor as a rust preventive.

3. The rolling bearing as defined in claim 2, wherein the content of the magnesium compound in the grease composition is from 0.5 to 3.0% by weight based on the total amount of the grease.

4. The rolling bearing as defined in claim 2, wherein the content of the vapor phase inhibitor in the grease composition is from 0.05 to 1.0% by weight based on the total amount of the grease.

5. The rolling bearing as defined in claim 1, wherein the fluorine-based grease is a grease composition comprising a fluorine-based thickening agent and a fluorine-based surface active agent incorporated in a fluorine-based lubricant.

6. The rolling bearing as defined in claim 5, wherein the grease composition comprises a perfluoropolyether oil as a base oil and a polytetrafluoroethylene as a thickening agent and the fluorine-based surface active agent contains carbon atoms and fluorine atoms in its molecule at a ratio of 1:2 to 2:1 and is incorporated in an amount of from 0.2 to 10% by weight based on the total amount of the grease.

7. The rolling bearing as defined in claim 5, which is used in an atmosphere having an acidic material present therein.

8. The rolling bearing as defined in claim 1, wherein the fluorine-based grease is a fluorine-based grease comprising a fluorine-based oil as a base oil and a fluororesin as a thickening agent and a mixture of the fluorine-based grease and the grease other than the fluorine-based grease is encapsulated therein.

9. The rolling bearing as defined in claim 8, wherein the grease other than the fluorine-based grease in the mixed grease is at least one of a metal complex soap-based grease and a urea-based grease, the mixing ratio (by weight) of at least one of the metal complex soap-based grease and the urea-based grease to the fluorine-based grease is from 30 to 70:80 to 20 and the thickening agent is incorporated in a total amount of from 15 to 35% by weight based on the total amount of the mixed grease.

10. The rolling bearing as defined in claim 8, wherein the kinetic viscosity of the grease, other than the fluorine-based grease, at 40° C. is from 10 mm²/s to 400 mm²/s.

11. The rolling bearing as defined in claim 8, wherein the mixed grease comprises additives incorporated therein in an amount of not greater than 20% by weight based on the total amount of the mixed grease.

12. The rolling bearing as defined in claim 1, wherein the grease comprises at least one selected from the group consisting of benzotriazole or derivative thereof, indazole or derivative thereof, benzothiazole or derivative thereof, benzoxazole or derivative thereof, benzimidazole or derivative thereof and thiadiazole or derivative thereof and at least one selected from the group consisting of metal dithiophosphate and metal dithiocarbamate incorporated therein in an amount of from 0.2 to 2% by weight and from 1 to 10% by weight based on the total amount of the grease, respectively.

13. The rolling bearing as defined in claim 1, wherein the grease comprises a base oil and a thickening agent incorporated therein and comprises at least one selected from the group consisting of basic alkylamine compound, organic metal salt and metal salt of organic acid incorporated therein in an amount of from 0.1 to 10% by weight based on the total amount of the grease.

14. The rolling bearing as defined in claim 13, which is used in an atmosphere having an acidic material present therein.

15. The rolling bearing as defined in claim 1, wherein a plurality of rolling elements are rollably retained interposed between the inner ring and the outer ring.

16. The rolling bearing as defined in claim 1, wherein a plurality of rolling elements are rollably retained between the inner ring and the outer ring with a retainer provided interposed therebetween.

17. The rolling bearing as defined in claim 1, wherein is provided with a seal or shield.

18. The rolling bearing for fuel cell as defined in claim 1, wherein the fuel cell system comprises at least a fuel tank, a fuel evaporator, a modifying device, a CO remover, a stack of fuel cells and a compressor for transporting various fluids.

19. The rolling bearing for fuel cell as defined in claim 1, which is adapted to be incorporated in an impeller type compressor, a scroll type compressor, a swash plate compressor or a screw type compressor.

20. A compressor for fuel cell system provided with a rolling bearing for fuel cell as defined in claim 1.

21. A fuel cell system comprising a compressor as defined in claim 20 as a compressor for transporting various fluids.

22. The fuel cell system as defined in claim 21, which is provided with at least a stack of fuel cells.

23. The fuel cell system as defined in claim 22, which is further provided with at least a fuel tank, a fuel evaporator, a modifier and a CO remover.

24. The fuel cell system as defined in claim 21, which is adapted for driving automobile.

* * * * *